United States Patent [19]

Coats

[11] Patent Number: 5,177,800
[45] Date of Patent: Jan. 5, 1993

[54] BAR CODE ACTIVATED SPEECH SYNTHESIZER TEACHING DEVICE

[75] Inventor: William B. Coats, Plainfield, Ind.

[73] Assignee: Aisi, Inc., Indianapolis, Ind.

[21] Appl. No.: 534,738

[22] Filed: Jun. 7, 1990

[51] Int. Cl.$^5$ .............................................. G10L 3/00
[52] U.S. Cl. ............................................ 381/51; 381/52
[58] Field of Search ................................ 381/51–53; 364/513.5; 434/116, 176, 327, 335

[56] References Cited

U.S. PATENT DOCUMENTS

| | | | |
|---|---|---|---|
| 2,228,782 | 1/1941 | Sharples . | |
| 4,074,351 | 2/1978 | Boone et al. | 364/200 |
| 4,189,779 | 2/1980 | Brautingham | 381/52 |
| 4,209,781 | 6/1980 | Puri et al. | 340/347 M |
| 4,209,836 | 6/1980 | Wiggins, Jr. et al. | 179/1 SA |
| 4,209,844 | 6/1980 | Brantingham et al. | 179/1 SM |
| 4,234,761 | 11/1980 | Wiggins, Jr. et al. | 179/1 SM |
| 4,242,675 | 12/1980 | Boone et al. | 364/900 |
| 4,290,121 | 9/1981 | Boone et al. | 365/233 |
| 4,304,964 | 0/1981 | Wiggins, Jr. et al. | 179/1 SA |
| 4,308,017 | 12/1981 | Laughon et al. | 434/335 |
| 4,331,836 | 5/1982 | Wiggins, Jr. et al. | 179/1 SM |
| 4,335,275 | 6/1982 | Brantingham | 179/1 SM |
| 4,337,375 | 6/1982 | Freeman | 381/52 |
| 4,340,374 | 7/1982 | Cully | 434/335 |
| 4,342,094 | 7/1982 | Boone | 364/900 |
| 4,344,148 | 8/1982 | Brantingham et al. | 179/1 SM |
| 4,349,161 | 3/1982 | Wiggins et al. | 381/51 |
| 4,398,059 | 8/1983 | Lin et al. | 179/1 SM |
| 4,403,965 | 9/1983 | Hawkins | 434/327 |
| 4,411,628 | 10/1983 | Laughon et al. | 434/335 |
| 4,421,487 | 12/1983 | Laughon et al. | 434/327 |
| 4,425,099 | 1/1984 | Naden | 434/335 |
| 4,441,399 | 4/1984 | Wiggins et al. | 381/51 |
| 4,447,213 | 5/1984 | Culley | 434/201 |
| 4,449,233 | 5/1984 | Brantingham | 381/52 |
| 4,457,719 | 7/1984 | Dittakavi et al. | 381/52 |
| 4,464,118 | 8/1984 | Scott et al. | 434/335 |
| 4,466,801 | 8/1984 | Dittakavi et al. | 381/52 |
| 4,468,805 | 8/1984 | Wiggins, Jr. et al. | 381/51 |
| 4,471,460 | 9/1984 | Boone | 364/900 |
| 4,471,461 | 9/1984 | Boone | 364/900 |
| 4,476,541 | 10/1984 | Boone et al. | 364/900 |
| 4,479,124 | 10/1984 | Rodriguez et al. | 381/51 |
| 4,485,455 | 11/1984 | Boone et al. | 364/900 |
| 4,505,682 | 3/1985 | Thompson | 381/52 |
| 4,507,750 | 3/1985 | Frantz et al. | 381/41 |
| 4,516,260 | 5/1985 | Breedlove et al. | 381/51 |
| 4,549,867 | 10/1985 | Dittakavi | 381/52 |
| 4,602,152 | 7/1986 | Dittakavi | 235/463 |
| 4,631,748 | 12/1986 | Breedlove et al. | 381/51 |
| 4,635,211 | 1/1987 | Yoshida et al. | 381/51 |
| 4,797,930 | 1/1989 | Goudie | 381/52 |
| 4,884,974 | 12/1989 | DeSmet | 434/335 |

*Primary Examiner*—Dale M. Shaw
*Assistant Examiner*—Michelle Doerrler
*Attorney, Agent, or Firm*—Woodard, Emhardt, Naughton, Moriarty & McNett

[57] ABSTRACT

A bar code reading speech synthesis device is disclosed which includes means for reading a bar code and accessing internal or external memory to supply speech data to a speech synthesizer device based upon the bar code numerical value. Readily and easily changeable memory modules including synthesized speech data developed to accompany corresponding printed lesson plans are also disclosed. The lesson plans, coupled with the speech synthesizer data, provide audible voicing of words and/or audible spelling of the words from the lesson plan. Various other features included in the speech synthesizer device include automatic power down circuitry, self-diagnostics, volume control, and extended diagnostics for testing the functionality of the device. A base$_{32}$ addressing scheme is employed to verify memory data as corresponding with bar codes wanded into the device. An alternate embodiment of the speech synthesizer device includes a serial data link and the hardware capability for downloading serial data from an external source and storing the data in a nonvolatile memory, such as nonvolatile RAM (Random Access Memory) (NVRAM) (Non-Volatile Random Access Memory) or an EEPROM (Electrically Eraseable Programmable Read Only Memory), thus eliminating the need to change memory modules.

20 Claims, 9 Drawing Sheets

BAR CODE ACTIVATED SPEECH SYNTHESIZER TEACHING DEVICE

BACKGROUND OF THE INVENTION

1. Field of the Invention

This invention relates to the field of speech synthesizers and more specifically to speech synthesizers responsive to an input code from a code reading device.

2. Background of the Invention

Electronic speech synthesizers implemented in the form of a large scale integrated circuit (IC) are well known and commonly available. Such IC speech synthesis devices have recently become economically affordable in small volume applications. In addition, bar code and optical code reading technology have advanced to the point where inexpensive code readers are available which may be used in a multitude of portable battery powered applications.

In the entertainment and educational area, Texas Instruments Incorporated has secured patent protection for a variety of speed synthesis related devices including code readers. Examples of such devices are shown in the following U.S. Patents: U.S. Pat. No. 4,337,375 to Freeman; U.S. Pat. No. 4,189,779 to Brautingham; U.S. Pat. No. 4,466,801 to Dittakavi et al; U.S. Pat. No. 4,549,867 to Dittakavi; U.S. Pat. No. 4,505,682 to Thompson and U.S. Pat. No. 4,457,719 to Dittakavi et al.

A primary shortcoming of the devices disclosed in the above patents is the lack of flexibility and adaptability to the needs of the educational community with regard to implementing a speech synthesis device as a teaching aid. Freeman '375 suggests a speech synthesis device wherein a bar code or optical code representation supplies a code for identifying words or phrases by specifying the starting address in the vocabulary memory of the speech synthesis device of corresponding speech synthesis data. Such an addressing scheme reduces the amount of bar code information necessary for reproducing a relatively lengthy audible phase. However, given the limited density of today's electronic memories, such as system does not adequately address the difficulties in providing high quality speed reproduction by way of electronic speech synthesis, coupled with a variety of educational lesson planes. Additionally, a device which includes easily changeable memory components or electronic hardware facilitating reprogramming of memory devices in a speech synthesis device is not shown by the prior art. Thus, a hand-held portable speech synthesis device capable of reading bar codes to activate speech synthesis and having easily changeable memories or reprogrammable memories for use with educational lesson plans is needed.

SUMMARY OF THE INVENTION

In accordance with the present invention, an improved bar code reading speech synthesizer device according to one aspect of the invention includes speech synthesis means having a data input, the speech synthesis means producing synthesized speed in response to data supplied to the data input, code reading means for reading a code and producing a locator code signal, computer means connected to the code reading means and the speech synthesis means, the computer means including internal ROM, RAM and an external ROM connector including address bus, data bus, and control line signal connections, an external ROM module removably connected to the external ROM connector and containing a lesson plan identifier code, a plurality of first mode data sets and a plurality of second mode data sets wherein each of the first mode data sets contains a predetermined sequence of data for producing synthesized speech and each of the plurality of second mode data sets contains predetermined alphanumeric data, the computer means responding to the locator code in a first mode by reading one of the plurality of first mode data sets from the external ROM at a memory location defined by the locator code and supplying the data set at the memory location to the speed synthesis means data input, the computer means responding to the locator code in a second mode by reading one of the plurality of second mode data sets from a memory location in the external ROM module at a memory location defined by the locator code, the second mode data set including internal memory locator codes identifying locations in internal ROM wherein predetermined speech data is stored, the computer means supplying the predetermined speech data to the speech synthesis means data input for each internal memory locator code of the one of the second mode data sets.

In accordance with another aspect of the present invention, an improved bar code reading speech synthesis device is provided which includes: a battery powered speech synthesizer device adapted for use with lesson plans including a plurality of visual material segments and a bar code associated with each segment, the device comprising: a speech synthesis means for synthesizing audible human speed, the speech synthesis means having a data input and producing synthesized speech in response to data supplied to the data input, bar code reading means for reading a bar code and producing a locator code signal at an output of the code reading means, computer means for controlling functions of the speech synthesizer device, the computer means having an input connected to the code reading means output, a speech data output connected to the speech synthesis means data input, the computer means also including ROM, RAM, nonvolatile memory, and an external data interface, wherein a plurality of speech synthesis data sets are supplied to the external data interface and stored in the nonvolatile memory for subsequent recall by the computer means in response to receiving a locator code signal from the bar code reading means wherein the locator code signal corresponds to one of the plurality of speech synthesis data sets.

In accordance with yet another aspect of the present invention, a bar code reading speech synthesis device includes: a speech synthesizer device adapted for use with a predefined printed lesson plan wherein the lesson plan includes a plurality of bar codes, the speech synthesizer device comprising: speech synthesis means having a data input, the speech synthesis means producing synthesized speech in response to data supplied to the data input, code reading means for reading a code from the lesson plan and producing a locator code signal at an output of the code reading means, computer means connected to the code reading means output and the speech synthesis means data input, the computer means including internal ROM, RAM and an external ROM connector including address bus, data bus, and memory control signal connections, an external ROM module removably connected to the external ROM connector and containing a plurality of word data sets wherein each of the word data sets includes a predetermined sequence of data for producing synthesized speech corresponding to words printed in a lesson plan and associated with the code, and wherein the computer means responds to the locator code signal by reading one of the plurality of word data sets from the external ROM at a memory location defined by the locator code signal and supplies the word data set to the speech synthesis means data input.

It is an object of the present invention to provide an improved bar code reading speech synthesis device.

Another object of the present invention is to provide a bar code reading speech synthesis device having a readily changeable memories for changing speech synthesis data.

It is yet another object of the present invention to provide a speech synthesis device having bar code reading capabilities and speech synthesis data corresponding to pre-designed lesson plans useful in educational environments.

It is a further object of the present invention to provide a bar code reading speech synthesis device useful in translating one language to another, providing instructional information, or audibly sounding words connected with Braille symbols included in lesson plans for the non-sighted.

These and other objects of the present invention will become apparent from the following description of the preferred embodiment.

DESCRIPTION OF THE PREFERRED EMBODIMENT

Figure 1:
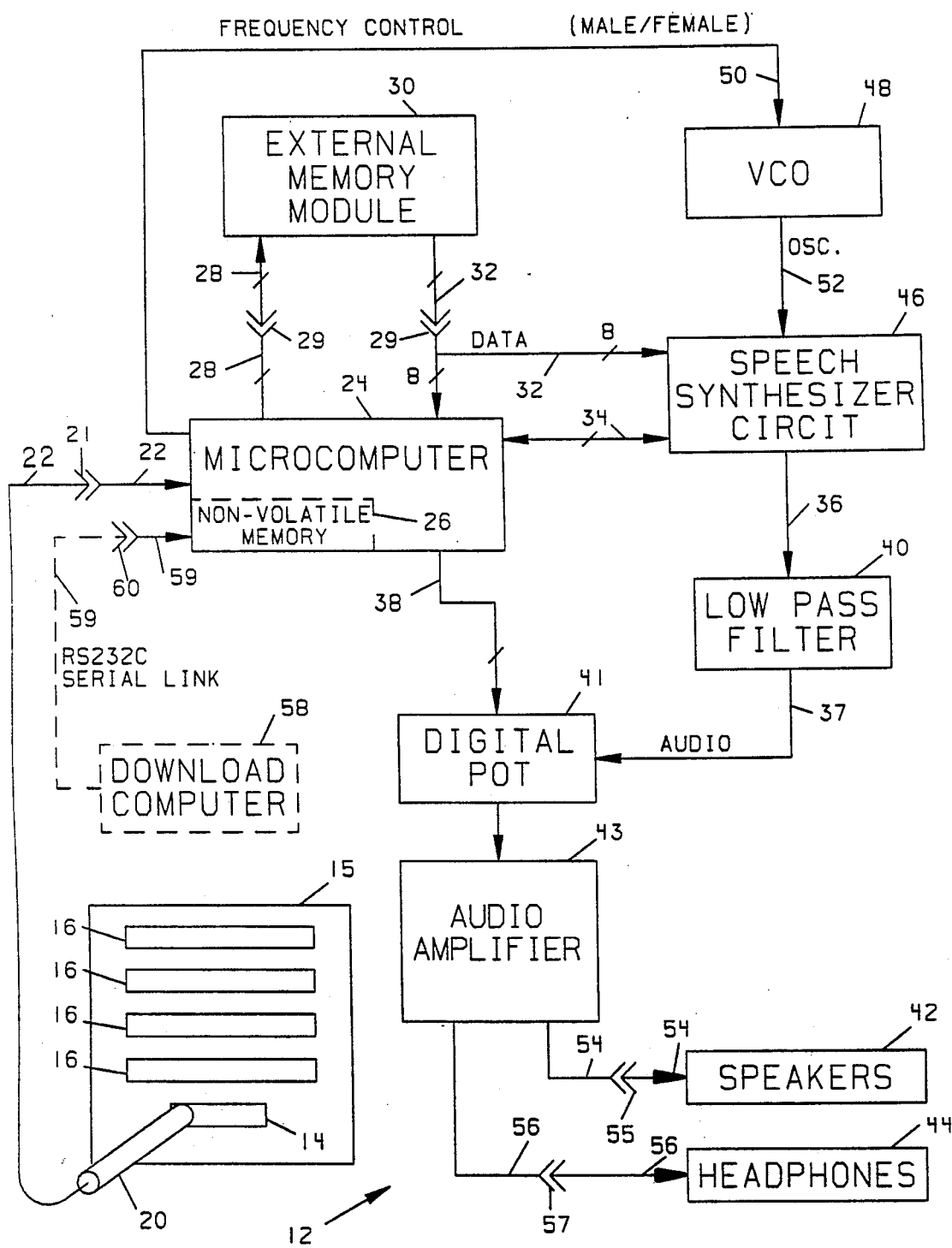
FIG. 1 is a block diagram of the improved bar code reading speech synthesis device according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a block diagram of the improved bar code reading speed synthesis device 12 according to the present invention is shown. A code reading wand 20 is shown connected to an input of microcomputer 24 via signal path 22. Connector 21 is used to detach code reader 20 from microcomputer 24. External memory module 30 is electrically connected to microcomputer 24 via signal paths 28 and 32. Signal path 28 is an address bus and control line signal bus for controlling the memory module 30. Signal path 32 is an 8 bit wide data bus for transfer of data from memory module 30 to microcomputer 24 and transfer of data from microcomputer 24 to speech synthesizer circuit 46. Signal path 32 may alternatively be 16 or 32 bits wide to accommodate increased data throughput rates. Connector 29 provides a convenient means by which external memory module 30 may be replaced by another memory module (not shown) electrically and plug compatible with the signals present at connector 29. Microcomputer 24 controls the frequency at the output of Voltage Control Oscillator (VCO) 48 via signal path 50. VCO 48 provides an oscillator frequency signal via signal path 52 to an input of speech synthesizer circuit 46. Signal path 34 is a control signal bus for several signals interfacing microcomputer 24 and speech synthesizer circuit 46 to accomplish hand-shaking and control signal exchange between the two devices. Synthesizer 46 supplies a pulse with modulated signal to signal path 36. The signal output from synthesizer 46 is a form of audible speech having an excess quantity of undesirable high frequency components. Low pass filter 40 filters the undesirable high frequency components from the synthesizer 46 output signal and supplies a filtered audio signal, via signal path 37, to digital potentiometer 41.

Digital potentiometer 41 provides an attenuation function for the audio signal from low pass filter 40 and supplies the attenuated audio signal to an input of audio amplifier 43. Control lines from microcomputer 24 supply a binary code to digital pot 41 thereby controlling the attenuation level of digital pot 41 in a binary scheme. Such a scheme may involve three binary signals, shown by signal path 38, thereby providing eight discrete attenuation control inputs to digital potentiometer 41. Audio amplifier 43 supplies high-power synthesized speech audio signals to speakers 42 and headphones 44 via signal paths 54 and 56 respectively. Connectors 55 and 57 provide a convenient means by which speakers 42 and headphones 44 may be detached or disconnected from the audio amplifier circuit 43. External memory module 30 provides speech synthesis and other data in byte-wide form necessary for reproducing audible synthesized speech from digital information.

An alternate embodiment employs three control signals; clock, direction, and an enable signal. These signals are also represented by signal path 38. The clock, direction and enable signals interface with an EEPROM controlled potentiometer, thus providing great increases in quantity of discrete attenuation steps available from the digital potentiometer 41.

In another embodiment of the present invention, external memory module 30 is not required, and data corresponding to the lesson plan 15 is stored in nonvolatile memory 26. Essentially, the data stored in external memory module 30 is stored instead in nonvolatile memory 26. The speech synthesis data is supplied to nonvolatile memory 26 via download computer 58 and a serial communications link signified by signal path 59. The nonvolatile memory 28 may be NVRAM, which typically utilizes lithium batteries as a back-up power source to maintain data in RAM during power loss, or Electrically Eraseable Read Only Memory Devices (EEPROMS). Both types of nonvolatile memory are well known in the art of computer electronics.

In the alternate embodiment, data for speech synthesis is supplied in a serial form from download computer 58 (shown by broken lines). RS232c serial communications link 59 and connector 60 provide hardware interfacing between microcomputer 24 and computer 58. Microcomputer 24, upon receiving data from download computer 58 stores the speech synthesis data in the nonvolatile memory 26 (shown by a broken line). The nonvolatile memory alternate embodiment according to the present invention provides a wholly self-contained system which does not require changeable memories, and may be reprogrammed via a central computer 58 thereby eliminating the need for multiple external memory modules 30 to change from a first to a second lesson plan data storage device or memory module.

Operationally speaking the speech synthesis device 12 is programmed for use in conjunction with lesson plan 15 which includes lines of text 16 and a bar code 14. Bar code wand or light pen 20 is moved by the user over bar code 14 to scan or input the data in the bar code. Signal path 22 connects bar code wand 20 to microcomputer 24. Signal path 22 carries several signals including power, ground, and a signal line indicative of whether the pen is currently disposed above light or dark areas of the bar code 14. Microcomputer 24 includes buffering and interface circuitry for transforming the signal from bar code wand 20 into binary representations of the code 14. Bar codes and bar code reading devices such as wand 20 and accompanying interface circuitry (not shown) are well known in the art and need not be fully discussed here.

Speech synthesis data stored in external memory module 30 or in internal memory of microcomputer 24 is supplied to the speech synthesizer circuit 46 in response to the numerical command codes contained in the bar code 14. The bar code 14 used in the preferred embodiment typically includes four digits of base$_{32}$ (number 0-9 and letters A-V for numbers 10 through 31) numbers. The four digits are coded in ASCII bar code data format. Decoding the bar code data into commands is a well known computer programmers techniques for transforming binary numbers into assorted instructions or commands to involve specific responses from the computer program. Microcomputers 24 controls the addressing of the memory devices in external memory module 30 via control line bus 28 which includes address control lines and chip enable and/or chip select control lines. Thus, microcomputer 24 controls the data present on signal path 32 supplied to the data input of speech synthesizer 46 from memory module 30. Microcomputer 24 can also supply speech synthesis data from internal ROM of microcomputer 24 to speech synthesizer 46. Bar code 14 includes sufficient binary digits to describe an address in memory within external memory module 30 wherein the speech synthesis digital data required to audibly reproduce text 16 in whole (spoken) word from or spelled out (character by character) form is stored.

Each module 30 includes, at a predetermined location in the memory module 30, a four digit, base 32, identifier code which is used to calculate a unique number from scanned bar code. The scanned bar code data is subtracted from the unique four digit (base 32) and the result is used to locate the speeds synthesis data in the module 30. If the result of the subtraction is not an address within the address space of the external memory module 30, the system will not produce synthesized speech. The above addressing scheme provides verification that the bar codes scanned in from the written materials correspond with the data in the memory module 30 currently connected to microcomputer 24. Such an addressing scheme prevents an operator from wandering or scanning bar codes for materials not associated with the module 30 which is presently removable connected to the microcomputer.

In a first mode of operation of device 12, a memory address defined by bar code 14 is input by microcomputer 24 through wand 20 as a user moves the wand over the bar code 14. Microcomputer 24 then accesses external memory module 30 at a memory location defined by the data in bar code 14 and supplies a plurality of speech synthesis data bytes to speech synthesizer circuit 46 to reproduce audio corresponding to the written text 16. Microcomputer 24 controls the pitch of the synthesized speech by way of signal path 50 wherein a logic 0 or a logic 1 placed on signal path 50 forces voltage control oscillator 48 to oscillate at one of two selectable frequencies. The first frequency corresponds to a male gender voice and the second frequency corresponds to a female gender voice. The oscillator signal from VCO 48 is supplied via signal path 52 to an input of speech synthesizer circuit 46. The output of synthesizer 46 is a pulse width modulated signal which is filtered by low pass filter 40. The output from filter 40 is supplied to an attenuator device or digital potentiometer 41. Digital output control lines from microcomputer 24 control the attenuation level of digital potentiometer 41, and synthesized speech in low-power form is supplied to an input of audio amplifier 43. Audio amplifier 43 supplies an amplified form of the signal from digital pot 41 to speakers 42 and head phones 44 to produce audible synthesized speech.

External memory module 30 includes sufficient memory to supply speech synthesis data for a plurality of lesson planes similar to lesson plan 15. The format of data in memory module 30 includes a plurality of word frames, each frame including numerous data bytes necessary to synthesize a phrase of audible speech, be it a phoneme, a word, or a multi-word phase. Each page of a lesson plan includes a corresponding bar code 14 which provides a locator code into the external memory module 30 for locating the digital data corresponding to the text 16 of the particular page viewed by the user of the device 12.

In a second mode of operation of device 12, the locator code derived from the bar code 14 provides an address location or pointer into memory module 30 to locate a string of ASCII characters which spell out text 16 in alphanumeric form. Using the locator code, the microcomputer, in the second mode of operation, takes the ASCII data string or data set from the memory module 30 and supplies character speech data to the speech synthesizer 46 via signal path 32. Data for speech synthesis of each character in the ASCII string is found in internal memory (ROM) of the microcomputer. The character speech data provides character by character synthesized speech spelling of the words in text 16. The second mode of operation is designed to teach and encourage proper spelling and to teach correlation between spelling and the sound of words. An alternate form of lesson plan 15 is composed of Braille characters 16 to provide a blind person with a character by character correspondence between the Braille characters in the text 16 and synthesized speech for the characters thereby teaching the student Braille character recognition.

It is contemplated that bar code wand 20 can be used to place the microcomputer 24 into various modes of operation which may be desired. One example of another mode of operation activated by a specific code includes a diagnostic mode for trouble shooting purposes or enabling debug of the device 12. In addition, the direction in which the bar code 14 is wanded (forwards or backwards) provides dual functionality for a single bar code. For example, a single bar code is used to control volume attenuation or volume levels, i.e., the increase/decrease in incremental attenuation steps depends upon the direction of wanding of a predetermined volume control bar code having a specific numerical value recognized by the microcomputer as the volume control code. It is also contemplated that multiple diagnostic modes may be activated or invoked by various predetermined codes arriving via signal path 22 at an input of microcomputer 24 from bar code wand 20.

Figure 2:
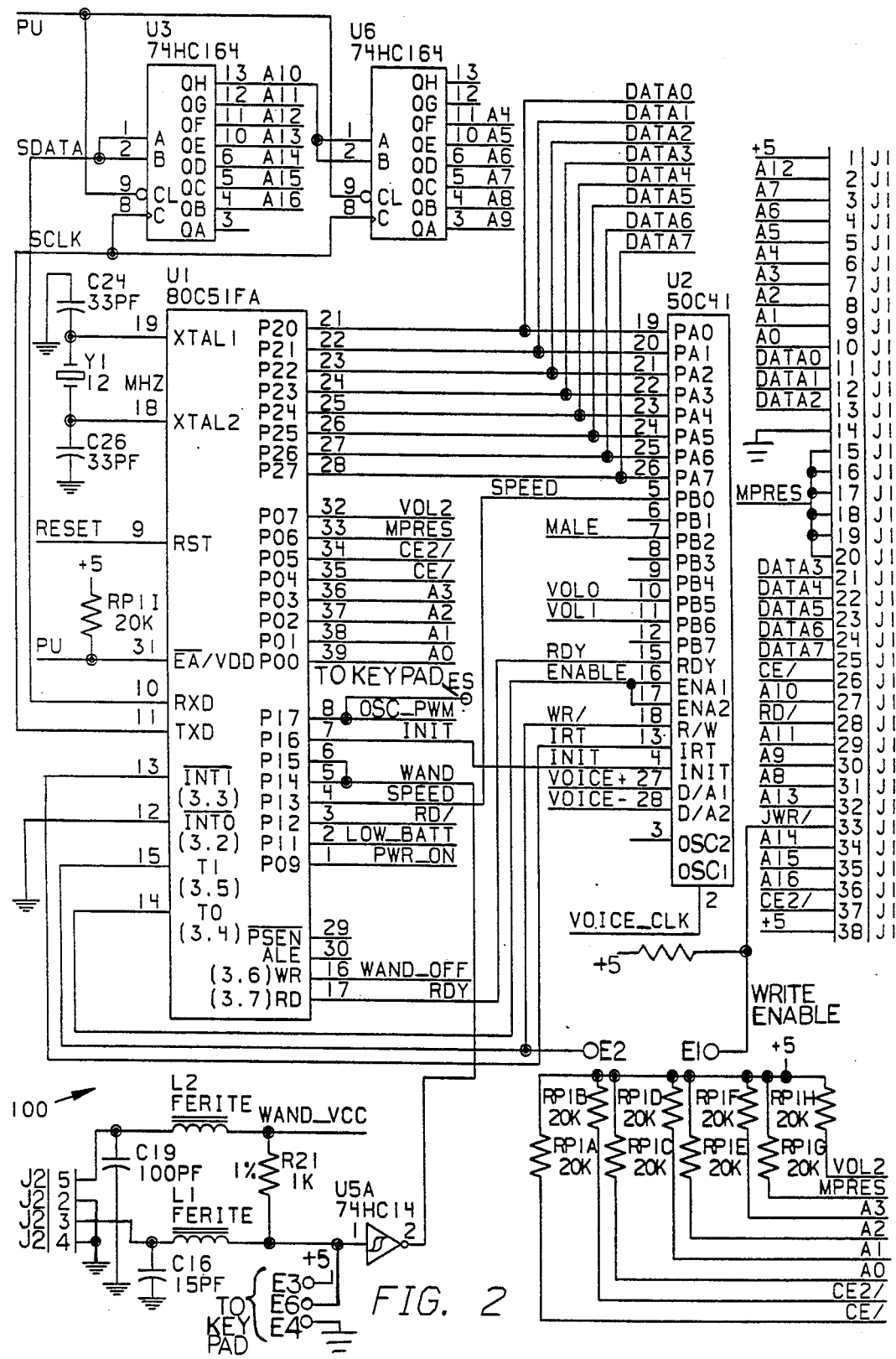
FIGS. 2-6 are electrical schematics of another embodiment of the bar code reading speech synthesis device according to the present invention.

Another embodiment of the speech synthesis device 100 according to the present invention is shown in FIGS. 2-6. Referring now to FIG. 2, a single chip microcomputer U1 corresponds to the microcomputer 24 of FIG. 1. Additionally, serial input latches U3 and U6 as well as Schmitt trigger inverting buffer U5A are part of microcomputer 24 of FIG. 1. Speech synthesizer circuit 46 of FIG. 1 corresponds with the U2 of FIG. 2. Bar code wand 20 of FIG. 1 connects to microcomputer U1 via the connection terminals labeled J2. External memory module 30 of FIG. 1 is connected to the circuitry of FIG. 2 via connector J1. Table 2, located near the end of the description of the preferred embodiment, provides source and part number information for all active and passive components shown in FIGS. 2-6. The bar code wand connected to connector J2 of FIG. 2 is a model 3050 available from Hewlett Packard Co.

Figure 3:
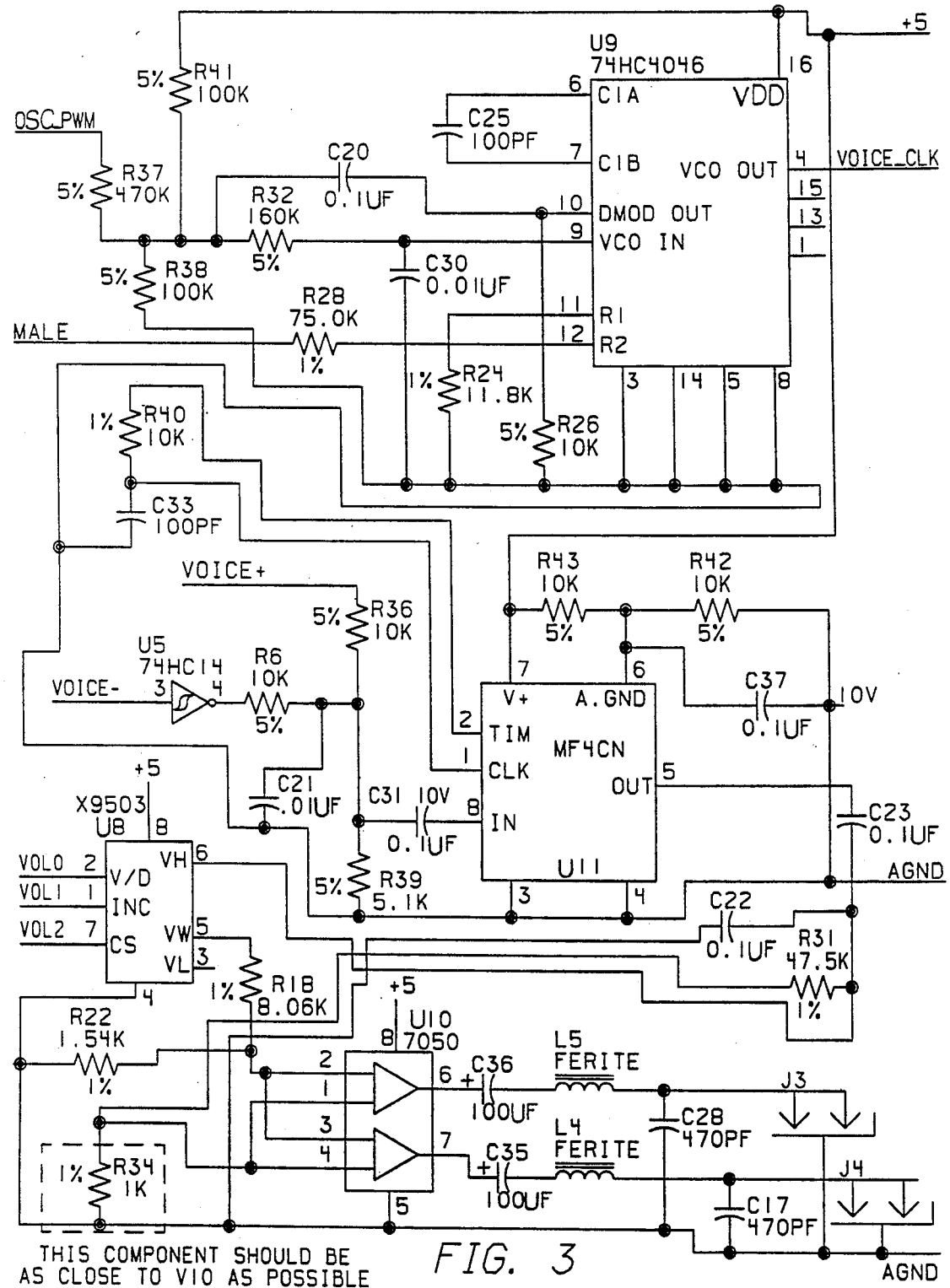

Device U2, the speech synthesis IC, is a model 50C41 linear predictive coding speech synthesizer device from Texas Instruments, Incorporated. The device includes an 8 bit microprocessor, an internal 16 kilobyte ROM, and interface inputs and outputs (I/O). To generate speech, device U2 uses speech data from either the internal 16 kilobyte ROM or an external speech ROM. Data from the external ROM appears on the signal paths DATA0 through DATA7. The data on these lines is supplied to pins 19 through 26 labelled "PA0 through PA7", respectively. A second 8-bit output port, pins 5 through 12 labelled PB0 through PB7, respectively, is used to handshake electrically with device U1 and control the speed of data supplied to device U2 from device U1. In addition, male versus female gender voice, and two of the three bits of logic information supplied to the digital potentiometer device U8 of FIG. 3 are controlled by Port B (PB01 ∝ PB7) of the device U2. Thus, the judicious use of output ports of the synthesizer device U2 in conjunction with the I/O available from device U1, extends the I/O control capability of the device 100.

Serial data from device U1 is supplied to devices U3 and U6 to set up individual address lines at the outputs of devices U3 and U6. The output signal paths from devices U3 and U6 labelled A4 through A16 are supplied to connector J1 and, in conjunction with output signals on signal paths A0 through A3, from pins 36 through 39 of device U1, provide a 17 bit address for the memory module connected to connector J1. In addition, chip enable signals CE/ and CE2/ from pins 35 and 34, respectively, of device U1 are supplied to connector J1 to provide further memory device selection signals for the external memory module connected to connector J1.

Terminals E1 and E2 are provided to allow the user to implement an optional read/write memory connected to connector J1. Such a memory may be a RAM, a nonvolatile RAM or EEPROM module (not shown) designed to interface with the control and data signals of connector J1. The nonvolatile memory module corresponds to nonvolatile memory 26 of FIG. 1. By shorting terminals E1 and E2 together, a write strobe signal is supplied to connector J1, thereby enabling the microcomputer U1 to write data present on the eight data bus lines DATA0 through DATA7 into a memory module connected to connector J1. Such memories are well known in the art and need not be further discussed here.

A third bit (logic level signal) used for control of the digital potentiometer device U8 of FIG. 3 is found at pin 32 of device U1, or signal path VOL2. Volume control is achieved by varying the logic signals present on pin 32 of device U1 and pins 10 and 11 of device U2 in various binary combinations.

Interface circuitry between devices U1 and U2, including signal paths labelled RRDY, ENABLE, WR/, IRRT, and SPEED provide for the hand-shaking logic signals necessary for data exchange, hand-shaking, and coordinating of operational functionality between devices U1 and U2.

Terminals E3 through E6 are provided for connecting an external keypad to the circuitry of FIG. 2. An external keypad (not shown) enables manual entry of data to device U1.

Figure 6:
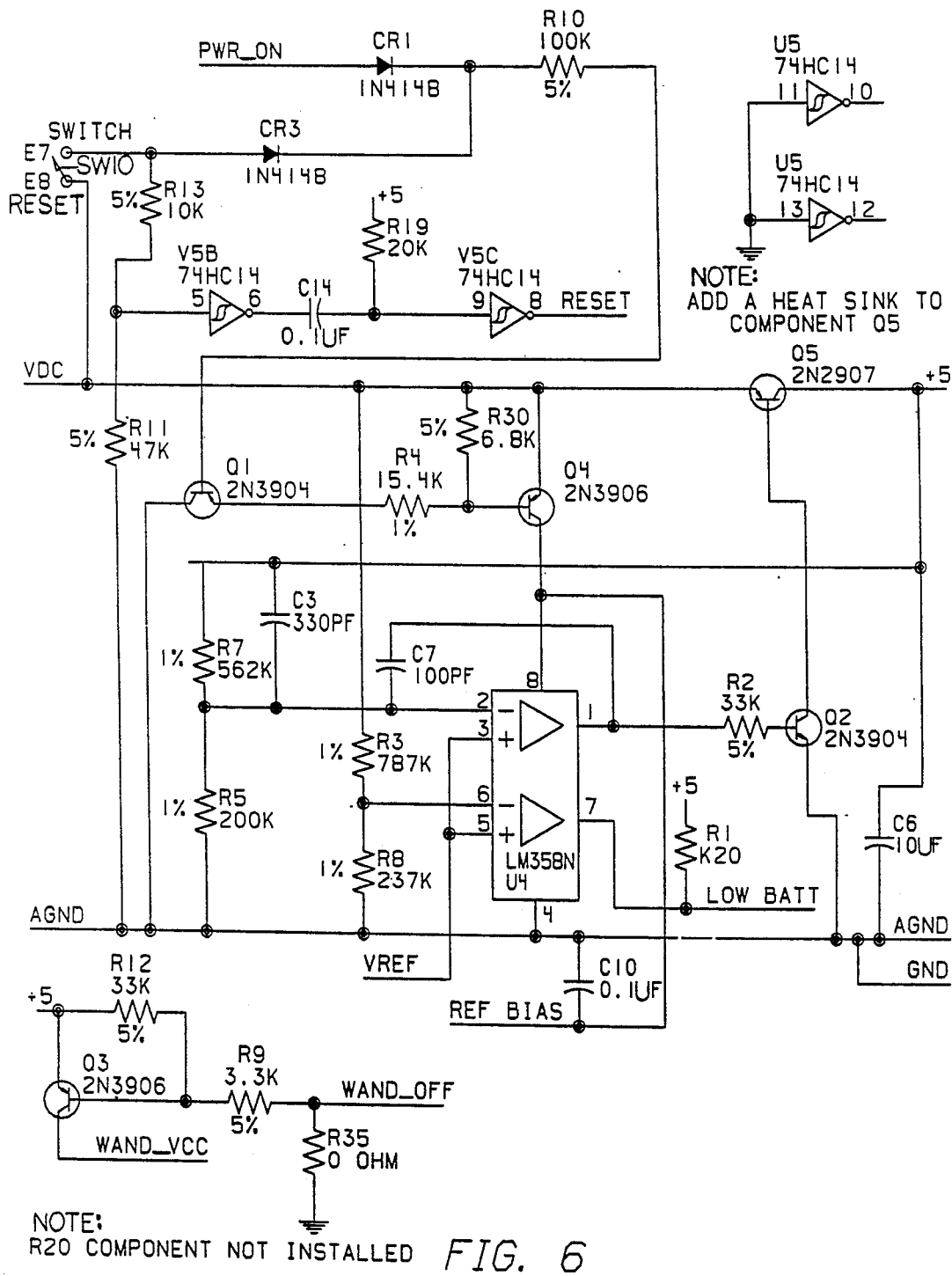

A signal path from the circuitry of FIG. 6 labelled LOW_BATT connects to pin 2 of device U1. The signal on signal path LOW_BATT is supplied to an input bit of microcomputer U1 and indicates to the microcomputer when the battery output voltage is below a predetermined voltage. When this state occurs, the microcomputer U1 responds by instructing speech synthesizer device U2 to output the audible message "battery low". The data for synthesizing the "battery low" message can be stored in the internal memory of devices U1 or U2, whichever is most convenient.

Referring now to FIG. 3, device U9 is a phase locked loop device which provides an oscillator signal output and corresponds to VCO 48 of FIG. 1. Device U11 is a low pass filter and corresponds to low pass filter 40 of FIG. 1. Signal path OSC_PWM carries a 16 kilohertz signal supplied from the microcomputer U1 of FIG. 2, as a reference oscillator for the VCO U9. Device U8 is a digitally controlled potentiometer and corresponds to digital potentiometer 41 of FIG. 1. Audio amplifier devices contained within device U10 correspond to amplifier 43 and provide amplification of the low-level audio signal, found at pins 1-4, to a high power audio level. The high power audio signals are supplied to connectors J3 and J4, which are stereo jacks for head phones or speakers.

Figure 4:
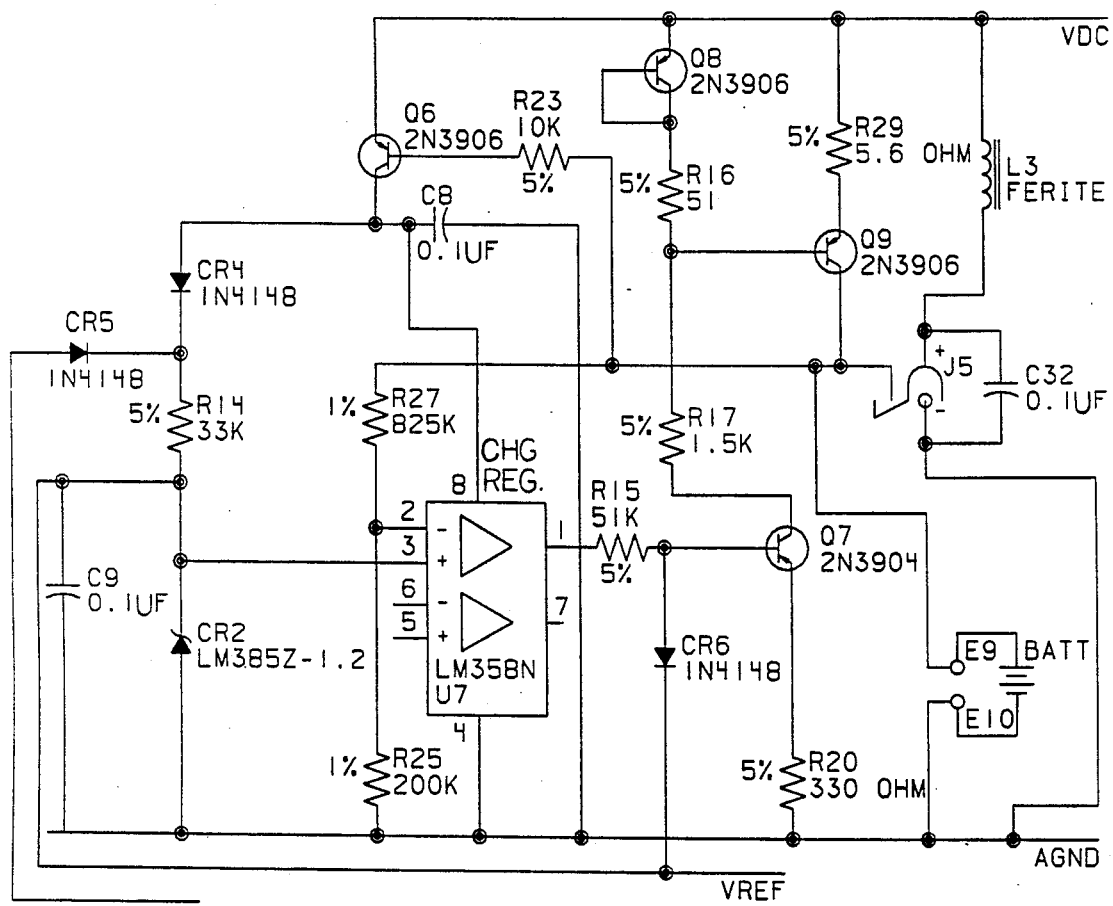
Figure 4:
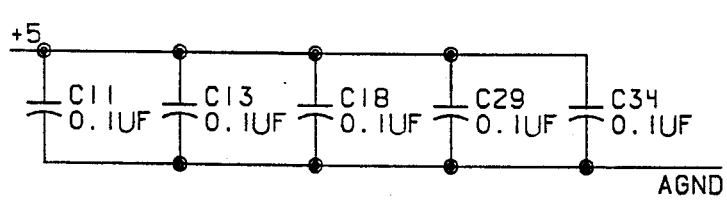
Figure 4:
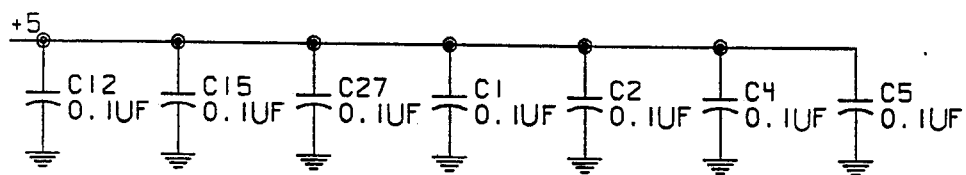

Referring now to FIGS. 4 and 6, power and reset circuitry for the speech synthesis device 100 according to the present invention is shown. An external plug-in power adapter (not shown) or power source may be connected to connector J5 of FIG. 4. A battery BATT is connected to terminals E9 and E10 of the circuit of FIG. 4. Rechargeable batteries are contemplated, and the circuit including devices U7, Q7, Q8, and Q9 and associated passive circuit components regulates current to the battery BATT for recharging the batteries when an external power source or power adaptor (not shown) is connected to connector J5.

When an external power source is connected to connector J5, the positive terminal of connector J5 is disconnected from the signal path VDAT. Conversely, upon disconnecting the external power source from connector J5, the positive terminal of connector J5 is shorted to the VDAT signal path, thereby supplying power through inductor L3 to the signal path VDC from battery BATT. Such a scheme is commonly implemented when an external power source is connected to a portable device. The external power source, when connected, is the primary power source to the circuitry. When an external power source is connected to J5, the batteries are disconnected from the main power source, and recharged through a trickle charge circuit as described above.

The circuitry of FIG. 6 switches and controls power to the circuitry of FIGS. 2-6 and provides a signal to the microcomputer of FIG. 2 when the battery voltage drops below a predetermined level, thereby indicating low voltage. A normally open switch SW10 is connected to terminals E7 and E8. Closing the switch contacts and shorting terminals E7 and E8, causes a power signal to be supplied to the circuitry of FIGS. 2-6.

The power signal on signal path VDC, which originates on FIG. 4 and is connected to the positive terminal of the battery or the optional input power adaptor, is supplied through diode CR3 and resistor R10 to the base of transistor Q1 when switch SW10 is closed or actuated. Once switched into the "on" state, transistor Q1 allows current to pass through transistor Q4, thereby supplying a power signal to pin 8 of device U4, a dual operational amplifier IC, and to signal path REF BIAS.

The REF BIAS signal path supplies a signal through diode CR5 of FIG. 4 and through resistor R14 to input pin 3 of device U7, or signal path VREF. Signal path VREF is connected to input pin 3 of device U4 of FIG. 6. When the input voltage at pin 3 of device U4 is greater than the input voltage at pin 2 of device U4, the output voltage of the opamp U4, pin 1, begins to rise thereby causing the voltage at the base of transistor Q2 to rise. Once transistor Q2 is turned on, transistor Q5, connected to transistor Q2, is turned on, and power from signal path VDC is supplied through a transistor Q5 to signal path +5.

Once power appears at the signal path +5, then power is supplied to devices U5B and U5C, both of which are inverting logic signal buffers. A logic high voltage supplied to the input of device U5B will case a pulse to appear at the input of inverter device U5C, thereby causing a reset pulse to appear at pin 8 of device U5C. The pulse is supplied to the reset input pin of the microcomputer U1 of FIG. 2, pin 9. Thereafter, the software of the microcomputer supplies a logic signal to the signal path PWR-ON at pin 1 of device U1, which logic signal is also supplied to the signal path PWR-ON of FIG. 6, thereby continually activating transistor Q1 to maintain transistor Q4 in an on state and keep the device 100 and all its circuitry powered up. The microcomputer may also power down itself by placing the power PWR-ON signal path at a logic low state, thereby turning off transistors and Q1 and turning off transistor Q4, which in turn results in transistor Q5 being turned off and power to the signal path labelled "+5" is cut off. The microcomputer may only turn power to itself off when the switch SW10 connected to terminals E7 and E8 is open.

Additional circuit shown on FIG. 6 includes transistor Q3 which provides a means by which the microcomputer device U1 of FIG. 2 can regulate the power supplied to the wand which is connected to connector J2 of FIG. 2. By forcing the output pin 16 of device U1 high, the microcomputer can disconnect the power signal supplied to the signal path WAND_VCC which originates on FIG. 6 and is connected with the signal path WAND_VCC of FIG. 2.

Figure 5:
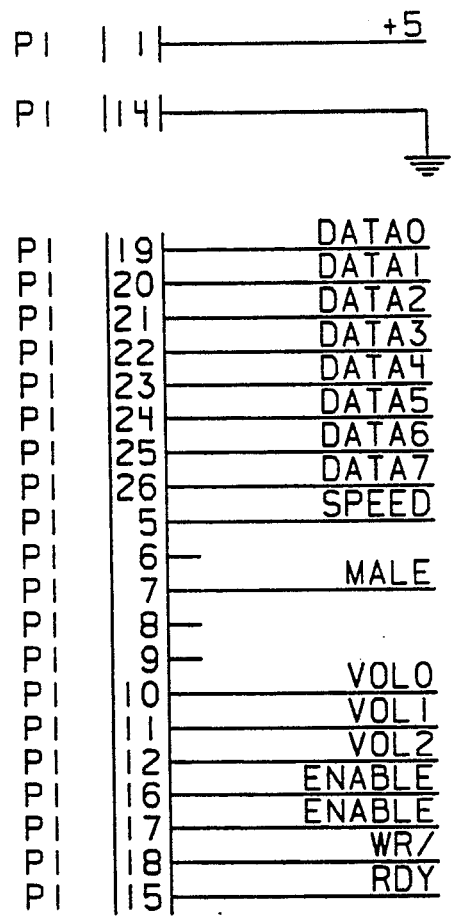
Figure 5:
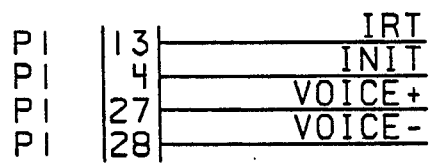

Referring now to FIG. 5, connected P1 provides user access to the pins of the speech synthesis device U2 of FIG. 2. This connector is provided for diagnostic purposes as well as debugging purposes.

Figure 7:
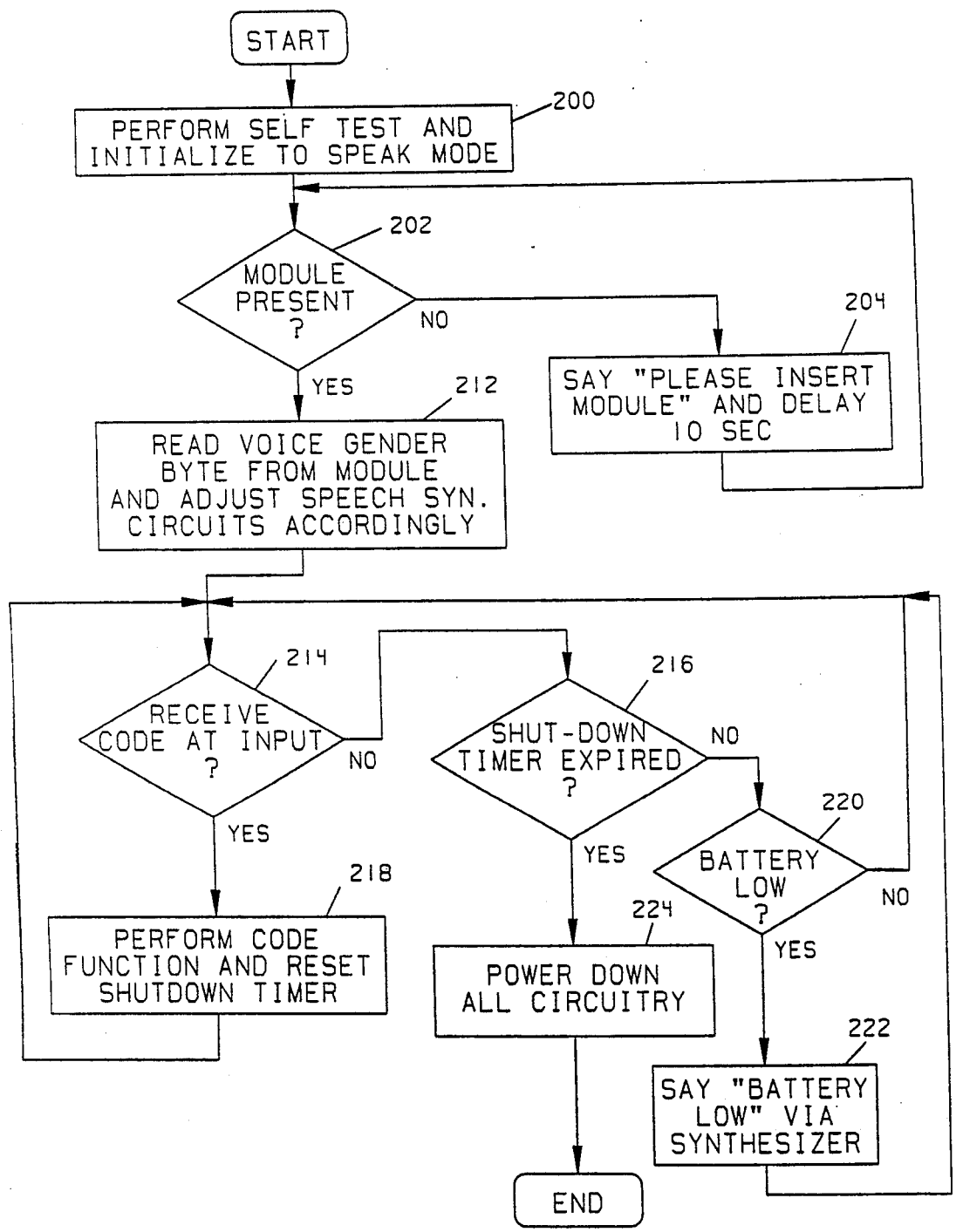
FIG. 7 is a flowchart for a program executable by the embodiment of FIGS. 2-6.

Referring now to FIG. 7, a flowchart for the program executed by the Intel 8051 microcomputer, device U1, is shown. Upon receiving a power signal and a reset signal, the microcomputer, at step 200, performs a self-test and initializes the mode of the device 100 into the speak mode. The microcomputer tests for the presence of an external memory module at step 202, and if no module is present, instructs the user at step 204 via synthesized speeds to "please insert module". Thereafter, a ten second delay occurs at step 204. When a memory module is detected, program execution continues at step 212. The embodiment of FIGS. 2 through 6 includes circuitry for switching the oscillation frequency of the phase locked loop device U9 running in open loop mode to one of two oscillation frequencies. The two oscillation frequencies are used by the speech synthesizer U2 to synthesize male and female gender voice synthesized speech. At step 212, a gender byte or bit is read from a predetermined address of the external memory module indicative of the desired voice gender for a speech phrase. Accordingly, the microcomputer U1 responds by instructing the speech synthesizer to switch the oscillator device U9 into the gender mode called for by the external memory module voice gender byte via a logic signal present at pin 7 of device U2.

The main operating loop of the program is shown by steps 214 through step 222. At step 214, the microcomputer tests a "locator code received" flag set in memory by a routine activated by logic signals from the bar code wand at input pins 5 and 6 of device U1. The "locator code received" flag indicates whether a bar code has been wanded and a locator code received and stored in memory. At step 218, the locator code received from the wand is used to determine what function is called for by the code input at step 214. After the function has been executed at step 218, program execution returns to step 214. If at step 214 no code has been received, i.e., the "locator code received" flag is not set, program execution continues at step 216 where the microcomputer tests the shut-down timer to determine whether or not a fixed period of time has expired since a locator code has been received at step 214. The shut-down timer is set to a time period between three minutes and ten minutes. If the shut-down time period has not expired, program execution continues at step 220 where the microcomputer tests an input signal (pin 2 of device U1) indicative of whether the output voltage of the battery has dropped below a predetermined voltage. If the batteries are low, then at step 222 the microcomputer 41 supplies data to the speech synthesizer 42 to produce the audible message "battery low". Thereafter, program execution return to step 214. If the battery voltage is not below the low-voltage threshold, then program execution continues at step 214 directly from step 220. If at step 216 the shut-down timer has expired, then program execution continues at step 224, where the microcomputer powers down all circuitry and the program ends. The shut-down timer is reset in step 218 upon completion of the function requested via the locator code input at step 214. Each time a bar code is wanded and a locator code received or input at step 214, the corresponding function determined by the locator code value is executed or performed by the microcomputer. The shut-down timer is reset to the initial time span which must totally expire before shut-down of the device 100 occurs each time a locator code is input at step 214.

Figure 8:
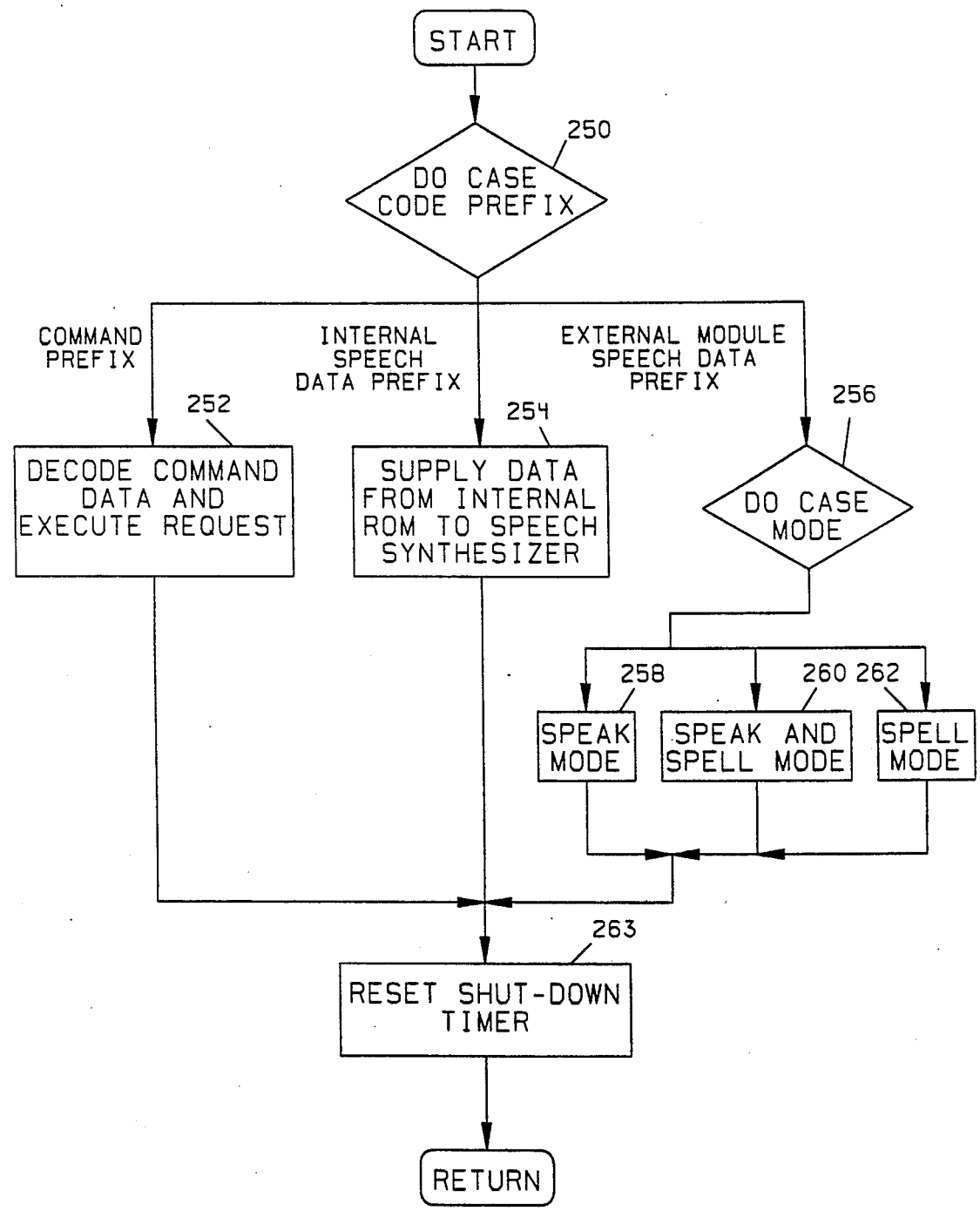
FIG. 8 is a flowchart for step 218 of FIG. 7.

Referring now to FIG. 8, a flow-chart for step 218 of FIG. 7 is shown. At step 250, the prefix of the code received at step 214 is examined and a DO CASE function based upon the code prefix is encountered. If a "command" prefix is detected in the locator code, program execution continues at step 252 where the microcomputer masks off the locator code suffix to determine which command has been requested. Table 1 provides a list of recognized commands for controlling the various functions of the speech synthesis device 100 of FIGS. 2 through 6. The leading ASCH "Z" of the locator codes listed in Table 1 is the "command" prefix and the locator code suffix, or three least significant ASCII characters or digits, determines which command is requested. For example, if the code received at step 214 is Z021, then the unit will turn power to itself off. All of the codes listed in Table 1 are in base$_{32}$ notation. Likewise, a leading "Y" character indicates the speech data is found in internal ROM.

Since the direction of scanning of a bar code can be determined and is stored in memory along with the locator code, a single bar code can be wanded in either direction to provide two different responses for a particular locator code command or function. This is exemplified by the volume control mode and the control code Z010. If wanded in a first direction (forwards), the volume control can be increased incrementally one step. If the same bar code is wanted in the opposite direction (backwards), the volume of the speakers will be decreased incrementally by one step. Device U8 of FIG. 3 is controlled by the logic signals present on the signal paths labelled VOL0, VOL1, and VOL2 of FIGS. 2 and 3.

TABLE 1

| Z001 | Speak mode. System software shall speak the phrases that correspond to the entered numbers. |
|---|---|
| Z002 | Speak and spell mode. System software shall speak the phrases that correspond to the entered numbers |
| Z003 | Spell mode. Only the spelling for a given phrase will be spoken. |
| Z004 | Reserve for future use. |
| Z005H | Reserve for future use. |
| Z01X | Volume control mode |
| Z010 | If read in the forward direction, increase the volume one step. If read in the reverse direction, decrease the volume one step. |
| Z011 | Increase volume one step |
| Z012 | Decrease volume one step |
| Z02X | Other control functions |
| Z021 | Turn off unit power. |
| Z022 | Execute extended diagnostics |
| Z023 | Generate internal square wave |
| Z024 | Generate "male" sine wave |
| Z025 | Generate "female" sine wave |

Speak mode, step 258, for the speech synthesizer device 100 is involved when a Z001 code is received. Speak mode instructs the microcomputer to supply data to the TI speech synthesizer from the external memory module. The speak and spell mode is invoked at step 260 when a Z002 code is received by the microcomputer 41 via the bar code wand (not shown in FIG. 2). In speak and spell mode, the microcomputer supplies data to the speech synthesizer to voice or speak the words and spell, character by character, the words shown on the lesson plan material corresponding to the wanded bar code. This is accomplished by reading speech data or word frames from the external memory module and supplying the speed data to the TI speech synthesizer. Subsequently, each word of the lesson plan is spelled out by accessing a different section of the external memory and retrieving ASCII data representing the spelling of the words for the lesson plan page, as previously described. The microcomputer then uses the ASCII data in accessing internal memory of the microcomputer wherein the speech synthesis data or word frames for each letter of the ASCII data is found. Additionally, if the lesson plan includes numbers, each individual numerical digit is voiced according to the ASCII data from the external memory module.

In a third mode of operation, mode Z003, the words 16 from the lesson plan 15 are spelled out. This mode is executed at step 262. The microcomputer, in spell mode, reads the ASCII data corresponding to the spelling of the words from the external memory module and then accesses internal memory (ROM) for speech synthesis data supplied to the TI speech synthesizer to synthesize speech and spell each character of each word.

Other functions which are implemented via a command code are diagnostics, generation of internal square waves at microcomputer outputs, generation of a male sine wave, and generation of a female sine wave at the audio output of device U10.

Referring again to FIG. 8, if the prefix for the locator code from step 214 is determined at step 250 to call for internal speech data, the microcomputer will continue execution at step 254 and cause the data from the internal ROM of the microcomputer U1 or speech synthesizer U2 to be used by the TI speech synthesizer. The data string (or group of data bytes) in memory is selected by the suffix of the locator code. Synthesized speech without an external memory module connected to connector J1 is accomplished by using internal microcomputer data or data in the ROM of device U2 or U1. Such phrases may include diagnostic messages, a wake up message wherein the synthesizer produces a "hello" message, or the "battery low" message. In addition, the data for synthesizing speech for the characters of the alphabet is stored in internal memory. The TI speech synthesizer device is also a microcomputer and is used to store internal speech data for subsequent recall and synthesis of speech. Thus, the microcomputer and the TI speech synthesizer can both be used as internal memory storage devices for storing data which may be recalled to produce synthesized speech without an external memory module installed.

If at step 250 the code prefix calls for data from the external memory module, then program execution continues at step 256. At step 256, the microcomputer checks a mode control byte and determines whether the microcomputer is to function in a speak mode, a speak and spell mode, or a spell mode. If in a first mode, hereafter referred to as speak mode, then program execution continues at step 258 where the locator code input at step 214 is used to directly access a string of data or word frames in the external memory module. The string of data bytes corresponds to the data required to synthesize speech corresponding to the words 16 printed on the lesson plan 15. Typically the data is accessed by one of two techniques. The code input at step 214 can contain the actual memory address of the data to be supplied to the speech synthesizer, and alternatively, the code from step 214 can supply an address or pointer into a table in the external memory module which contains the start (and optionally the end) address and/or quantity of data to be supplied to the speech synthesizer. Other schemes can also be implemented to indicate the end of a word frames, such as the byte value OFFH.

If at step 256 the microcomputer determines the mode of operation is a second mode, hereinafter referred to as speak and spell mode, then the words of the lesson plan are synthesized in the same fashion as in speak mode of step 258, and additionally, a table is accessed in the external memory module which provides the ASCII data for the spelling of the word or words of the lesson plan. The ASCII data is used to access internal memory of the microcomputer or speech synthesizer device to audibly synthesize speech of the spelling for the words of the lesson plan.

In a third mode of operation, or spell mode, the microcomputer, at step 262, accesses the external memory module to obtain only the ASCII spelling of the words 16 from the lesson plan 15. The ASCII data is used to access the spell mode data in internal memory for verbally synthesizing speech to spell each character of the lesson plan words 16.

Each external memory module contains information in fixed memory positions regarding identification of the module, two bytes for pointing to a word table, two bytes for pointing to a spelling table, two bytes for a voice look-up table, two bytes for power off time (shut-down timer delay time), and two bytes for wand off time. The word table will contain two bytes per word to give the paragraph address in memory of the framed word data. The word data is stored as consecutive frames of word data, and the last frame of data has zero energy. Each group of data bytes corresponding to a speech phrases stored in memory also includes a bit of information to select the gender voice associated with synthesis of the speech. The gender bit is used as a flag to produce the desired gender voice by way of a high or low logic signal present on the MALE signal path input to device U9. The high and low signals supplied to the MALE signal path by the TI processor U2, change the output of the VCO from a male to a female frequency, or vice versa.

The spelling table contains two bytes per word to provide the paragraph address of the spelling for the desired word. Spelling data is stored as one byte per letter for the speak mode data. Each string of ASCII characters is terminated with the byte value OFFH. The mode of operation (speak, speak and spell, or spell mode) can alternatively be supplied from a fixed location in the external memory module, and tested at step 256 to determine operational response required by the device 100 at step 256.

Following steps 258, 260, or 262, step 263 is executed and the shut-down timer is reset. Upon return to step 214 of FIG. 7, the shut-down timer monitored in software at step 216, provides a renewed time-out period for receipt of a new locator code. It should be recognized that the shut-down timer may also be implemented using hardware timers well known in the art.

Figure 9:
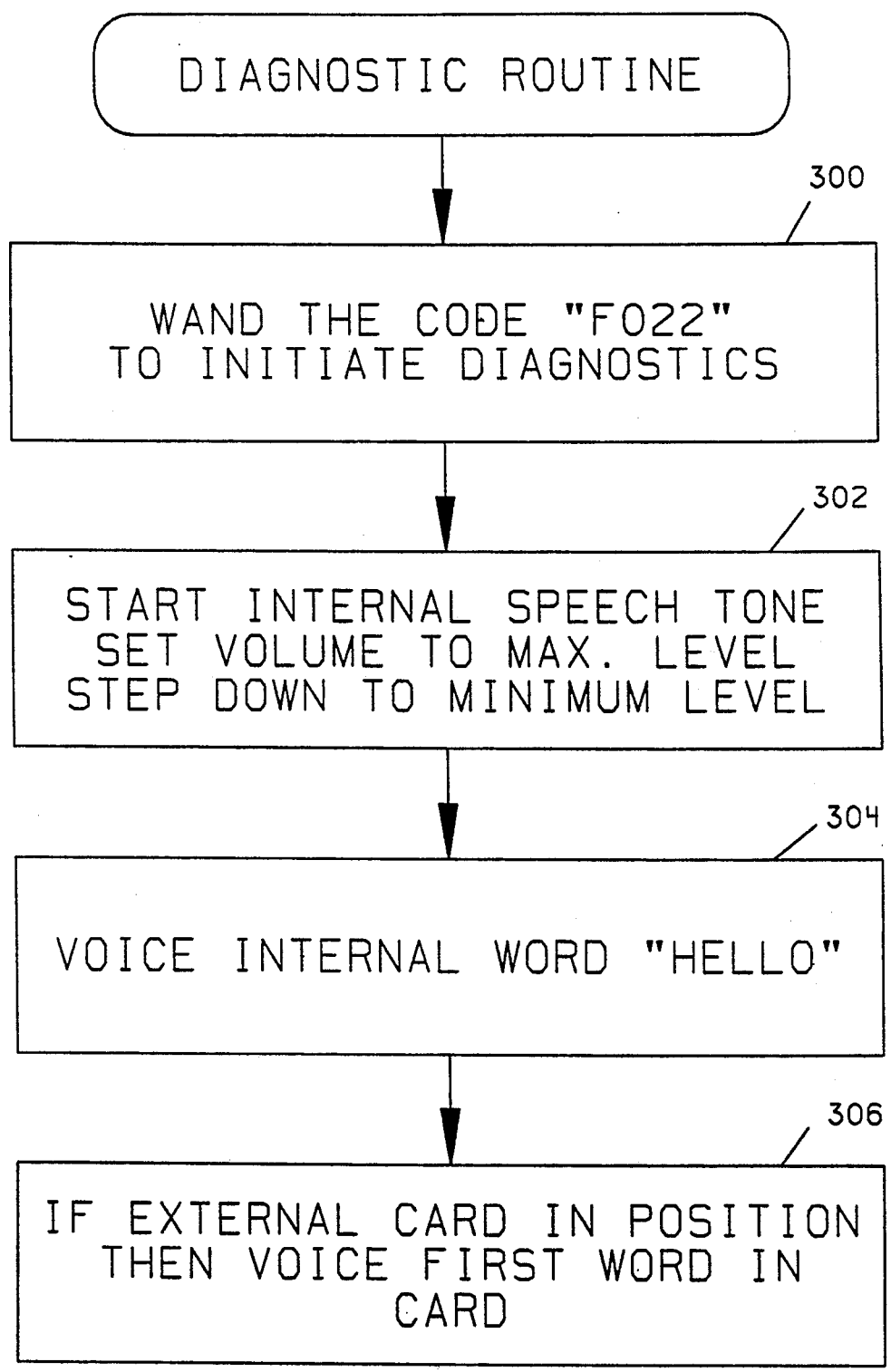
FIG. 9 is a flowchart for the extended diagnostics performed at step 252 of FIG. 8 in response to code F022H.

Referring now to FIG. 9, a flow chart for the diagnostic routine activated in response to receipt, via the wand, of a code Z022 at step 252 is shown. At step 300, the locator code Z022 is received by the microcomputer from the wand and the diagnostics routine is initiated. At step 302, an internal speech tone is initiated and the volume level is set to maximum and stepped down slowly in even timed increments to a minimum level. Eight (8) distinct volume levels should be audibly detectible during this period of time. The audible response indicates that the circuitry between the microcomputer and the TI chip device U2 is functioning normally. Also, the audio volume control circuitry (digital potentiometer U8) and audio amplifiers U10 are determined to be functioning normally by way of the audio tone and changing volume level results. Subsequently, at step 304, the data for the word "hello" is supplied to the synthesizer and the device 100 synthesizes or speaks the word "hello". This response verifies the speech synthesizer and microcomputer are properly communicating via the data paths and handshake lines interconnecting the two. At step 306, if an external memory module or card is in position at connector J1, then the microcomputer U1 accesses the external memory card and supplies the speech synthesis data or word frame data for the first word stored in the memory of the external memory module to the TI speech synthesizer U2. Successful speech synthesis of the first word or phrases from the external memory indicates that the interface between the external memory card and the microcomputer is performing correctly and that access to the data in the external memory card is properly occurring.

Table 2 provides a complete list of all the parts for a bill of materials for the speech synthesizer device of FIGS. 2 through 6. Devices U5, U3, and U6 are standard logic devices available from assorted manufacturers. CR2 is a 1.2 volt Zener. U11 is an MF4CN-100 filter from National Semiconductor, Inc. U9 is a 4046 phase-locked-loop IC, available from RCA, Texas Instruments, Signetics, and other well known sources. Device U10 is available from Signetics. Device U2 is a Texas Instruments Inc. speech synthesis device. Devices U4 and U7 are available from National Semiconductor, Inc. Device U8 is a product of Xicor Inc. Device U1 is an eight (8) bit microcontroller or microcomputer manufactured by Intel Inc.

TABLE 2

| DESCRIPTION | REFERENCE DESIGNATION |
|---|---|
| CAPACITOR, 0.1 UF | C1, C11, C12, C13, C15, C18, C2, C27, C29, C34, C4, C5 |
| RESISTOR, 20K | R1, R19, R33 |
| WIRE WRAP POST .025 | E1, E10, E2, E3, E4 |
| CONNECTOR | J1, J2, P1 |
| AC ADAPTER CONNECTOR, CENTER NEGATIVE | J5 |
| CONNECTOR, STEREO HEADPHONE | J3, J4 |
| CAPACITOR, .01 UF | C14, C21, C22 |
| CAPACITOR, 0.1 UF | C10, C23, C31, C32 |
| CAPACITOR, 100 PF | C19, C7 |
| CAPACITOR, 330 PF | C3 |
| CAPACITOR, 0.01 UF, 10% | C30 |
| CAPACITOR, 0.1 UF, 10% | C20 |
| CAPACITOR, 10 UF, ALUMINUM ELECTROLYTIC | C6 |
| CAPACITOR, 15 PF | C16 |
| CAPACITOR, 33 PF | C24, C26 |

TABLE 2-continued

| DESCRIPTION | REFERENCE DESIGNATION |
|---|---|
| CAPACITOR, 470 PF | C17, C28 |
| CAPACITOR, 100 PF, NPO 5% | C25, C33 |
| CAPACITOR, 100 UF, ALUMINUM ELECTROLYTIC | C35, C36 |
| CHOKE, FERITE | L1, L2, L3, L4, L5 |
| CRYSTAL, 12 MHZ | Y1 |
| DIODE, 1N4148 | CR1, CR3, CR4, CR5, CR6 |
| NPN TRANSISTOR, 2N3904 | Q1, Q2, Q7 |
| PNP TRANSISTOR, 2N2907 | Q5 |
| PNP TRANSITOR, 2B3906 | Q3, Q4, Q6, Q8, Q9 |
| RESISTOR, 0 OHM | R35 |
| RESISTOR, 1.5K, 5% | R17 |
| RESISTOR, 100K, 5% | R10, R38, R41 |
| RESISTOR, 10K, 5% | R13, R23, R26, R36, R42, R43, R6 |
| RESISTOR, 10K, 1% | R40 |
| RESISTOR, 160K, 5% | R32 |
| RESISTOR, 1K, 1% | R21 |
| RESISTOR, 1K, 1% | R34 |
| RESISTOR, 200K, 1% | R25, R5 |
| RESISTOR, 3.3K, 5% | R9 |
| RESISTOR, 15.4K, 1% | R4 |
| RESISTOR, 300 OHM, 5% | R20 |
| RESISTOR, 33K, 5% | R12, R14, R2 |
| RESISTOR, 470K, 5% | R37 |
| RESISTOR, 47K, 5% | R11 |
| RESISTOR, 5.1K, 5% | R39 |
| RESISTOR, 5.6 OHM, 5% | R29 |
| RESISTOR, 51, 5% | R16 |
| RESISTOR, 51K, 5% | R15 |
| RESISTOR, 6.8K, 5% | R30 |
| RESISTOR, 787K, 1% | R3 |
| RESISTOR, 75.0K, 1% | R28 |
| RESISTOR, 11.8K, 1% | R24 |
| RESISTOR, 8.06K, 1% | R18 |
| RESISTOR, 1.54K, 1% | R22 |
| RESISTOR, 825K, 1% | R27 |
| RESISTOR, 562K, 1% | R7 |
| RESISTOR, 237K, 1% | R8 |
| RESISTOR, 47.5K, 1% | R31 |
| RESISTOR, 20K1 | RP1, RP1B, RP1C, RP1D, RP1E, RP1F, RP1G, RP1H, RP1I |
| 74HC14 - H-CMOS HEX INVERTER WITH SCHMITT TRIGGER | U5 |
| 74HC164 - H-CMOS 8 BIT SERIAL TO PARALLEL SHIFT REG. | U3, U6 |
| ZENER, LM385Z-1.2 | CR2 |
| MF4CN-100 NATIONAL SEMICONDUCTOR 4th ORDER LOWPASS FILTER | U11 |
| NM74HC4046N - VOLTAGE CONTROLLED OSCILLATOR | U9 |
| TDA7050T - SIGNETICS STEREO AMP | U10 |
| 50C41 - TI SPEECH INTERFACE | U2 |
| LM358N - DUAL OP AMP, NATIONAL SEMICONDUCTOR | U4, U7 |
| XICOR E2POT X9503P | U8 |
| INTEL 80C51FA - 8 BIT MICROCONTROLLER | U1 |

Attached to the end of the description of the preferred embodiment are two program listings. The first program is a PL/M-51 listing of the program executed by the 80C51FA. Intel microcontroller. PL/M-51 is a high-level language developed by Intel Inc. The second program listing attached is the code executed by the TI 50C41 synthesizer U2 and was developed using an assembly level language designed by Texas Instruments for the TI 50c4x speech synthesizer devices sold by TI.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

LATTICE PRINT UTILITY  May 14, 1990  11:57 AM
AISI41.P51  54071 bytes 01/01/80 08:55:40

```
aisi: do;
snolist
$include(rg51fa.dcl)
$list
DECLARE TWENTY_SECONDS        LITERALLY '305';      /* adjust to fit */
DECLARE FIFTYFIVE_SECONDS     LITERALLY '839';      /* adjust to fit */
DECLARE SIXTY_SECONDS         LITERALLY '915';      /* adjust to fit */
DECLARE THREE_MINUTES         LITERALLY '2747';     /* adjust to fit */
DECLARE THIRTY_MINUTES        LITERALLY '27466';    /* adjust to fit */
DECLARE TRUE                  LITERALLY '1';
DECLARE FALSE                 LITERALLY '0';
DECLARE MALE                  LITERALLY '1';
DECLARE FEMALE                LITERALLY '0';

DECLARE TI_D6                 LITERALLY '0';
DECLARE TI_5220               LITERALLY '1';
DECLARE STOP_CODE             LITERALLY 'OFH';
DECLARE SILENT_CODE           LITERALLY 'OH';
DECLARE UNVOICED_CODE         LITERALLY 'OH';
        /* DEFINE bit field widths for D6 coding */
DECLARE D6_ENERGY             LITERALLY '4';
DECLARE D6_REPEAT             LITERALLY '1';
```

LATTICE PRINT UTILITY  May 14, 1990  11:58 AM
AISI41.P51  54071 bytes 01/01/80 08:55:40

```
aisi: do;
snolist
$include(rg51fa.dcl)
$list
DECLARE TWENTY_SECONDS        LITERALLY '305';      /* adjust to fit */
DECLARE FIFTYFIVE_SECONDS     LITERALLY '839';      /* adjust to fit */
DECLARE SIXTY_SECONDS         LITERALLY '915';      /* adjust to fit */
DECLARE THREE_MINUTES         LITERALLY '2747';     /* adjust to fit */
DECLARE THIRTY_MINUTES        LITERALLY '27466';    /* adjust to fit */
DECLARE TRUE                  LITERALLY '1';
DECLARE FALSE                 LITERALLY '0';
DECLARE MALE                  LITERALLY '1';
DECLARE FEMALE                LITERALLY '0';

DECLARE TI_D6                 LITERALLY '0';
DECLARE TI_5220               LITERALLY '1';
DECLARE STOP_CODE             LITERALLY 'OFH';
DECLARE SILENT_CODE           LITERALLY 'OH';
DECLARE UNVOICED_CODE         LITERALLY 'OH';
```

```
/* DEFINE bit field widths for D6 coding */

DECLARE D6_ENERGY              LITERALLY '4';
DECLARE D6_REPEAT              LITERALLY '1';
DECLARE D6_PITCH               LITERALLY '7';
DECLARE D6_K1                  LITERALLY '6';
DECLARE D6_K2                  LITERALLY '6';
DECLARE D6_K3                  LITERALLY '5';
DECLARE D6_K4                  LITERALLY '5';
DECLARE D6_K5                  LITERALLY '4';
DECLARE D6_K6                  LITERALLY '4';
DECLARE D6_K7                  LITERALLY '4';
DECLARE D6_K8                  LITERALLY '3';
DECLARE D6_K9                  LITERALLY '3';
DECLARE D6_K10                 LITERALLY '3';

/* DEFINE bit field widths for 5220 coding */

DECLARE T52_ENERGY             LITERALLY '4';
DECLARE T52_REPEAT             LITERALLY '1';
DECLARE T52_PITCH              LITERALLY '6';
DECLARE T52_K1                 LITERALLY '5';
DECLARE T52_K2                 LITERALLY '5';
DECLARE T52_K3                 LITERALLY '4';
DECLARE T52_K4                 LITERALLY '4';
DECLARE T52_K5                 LITERALLY '4';
DECLARE T52_K6                 LITERALLY '4';
DECLARE T52_K7                 LITERALLY '4';
DECLARE T52_K8                 LITERALLY '3';
DECLARE T52_K9                 LITERALLY '3';
DECLARE T52_K10                LITERALLY '3';
$eject    /* define some bar code commands */

LATTICE PRINT UTILITY May 14, 1990  11:58 AM
AISI41.P51  54071 bytes 01/01/80 08:55:40

DECLARE CHANGE_VOLUME          LITERALLY '0F010H';
DECLARE INCREASE_VOLUME        LITERALLY '0F011H';
DECLARE DECREASE_VOLUME        LITERALLY '0F012H';
DECLARE TURN_OFF               LITERALLY '0F021H';
DECLARE DIAGNOSTICS            LITERALLY '0F022H';
DECLARE SQUARE_WAVE            LITERALLY '0F023H';
DECLARE MSINE_WAVE             LITERALLY '0F024H';
DECLARE FSINE_WAVE             LITERALLY '0F025H';
DECLARE NO_MODULE_OPERATION    LITERALLY '0F026H';
         /* define the TI command set */
```

```
DECLARE SHUT_DOWN                              LITERALLY '1H';
DECLARE SEND_VFRAME                            LITERALLY '2H';
DECLARE SEND_UVFRAME                           LITERALLY '3H';
DECLARE SAY_INTERNAL                           LITERALLY '4H';
DECLARE SET_B_PORT                             LITERALLY '5H';
DECLARE STOP_SPEECH                            LITERALLY '6H';
DECLARE GET_STATUS                             LITERALLY '7H';
DECLARE GEN_SINE                               LITERALLY '8H';
DECLARE GEN_SQUARE                             LITERALLY '9H';
DECLARE PULSE_VOLUME                           LITERALLY '0AH';
DECLARE MSG                                    LITERALLY '0F0FFH';

/* define some usefull phrases */

DECLARE PHRASE_INSERT_MODULE                   LITERALLY '0H';
DECLARE PHRASE_BATTERY_LOW                     LITERALLY '1H';
DECLARE PHRASE_CANT_SPELL                      LITERALLY '2H';
DECLARE PHRASE_HELLO                           LITERALLY '2H';

DECLARE SDELAY_1        LITERALLY '0'; /* silent time between internal words */
DECLARE SDELAY_2        LITERALLY '5'; /* time between word & 1st letter */
DECLARE SDELAY_3        LITERALLY '0'; /* time between letters */

/* 'A' is used as the base, other letters are calculated by addition */
DECLARE PHRASE_A                               LITERALLY '8H';
seject;
/* declare the bar code shared data */

DECLARE RS STRUCTURE ((
    GOODRD,
    BADRD,
    FORWARD,
    NOTCODE,
    INCODE,
    GOT_FIRST,
    DUMMY,
    RPROC    ) BIT) AT(.RS);

DECLARE RSTATS                BYTE AT(28H);
DECLARE READ_BUFFER (4) BYTE AT(29H);

LATTICE PRINT UTILITY May 14, 1990   11:58 AM
AISI41.P51  54071 bytes 01/01/80 08:55:40

DECLARE READ_POINTER          BYTE AT(.DS);
DECLARE DATA_ACQ (118) BYTE AT(70H) IDATA;
/* stack is from 0E8H to 0FFH */
/* end of shared data */
/* declare I/O ports */
```

```
DECLARE PWR_ON                   BIT AT(090H) REG;    /* wand power control */
DECLARE BATTERY_LOW              BIT AT(091H) REG;    /* battery low input */
DECLARE RD_ROM                   BIT AT(092H) REG;    /* read rom control */
DECLARE TI_INIT                  BIT AT(096H) REG;    /* low to reset speech chip */
DECLARE TI_ENAB                  BIT AT(0B4H) REG;    /* enable speech chip */
DECLARE WR_ROM                   BIT AT(0B5H) REG;    /* write to rom */
DECLARE WR_TI                    BIT AT(0B5H) REG;    /* write to speech chip */
DECLARE WAND_OFF                 BIT AT(0B6H) REG;    /* high to kill wand power */
DECLARE TI_RDY                   BIT AT(0B7H) REG;    /* ready line from speech chip */
DECLARE TI_IRT                   BIT AT(0B3H) REG;    /* TI interrupt */
DECLARE module_absent  BIT AT(086H) REG;              /* speech module present bit */
DECLARE ADR0                     BIT AT(080H) REG;    /* rom address bits 0 -3 */
DECLARE ADR1                     BIT AT(081H) REG;
DECLARE ADR2                     BIT AT(082H) REG;
DECLARE ADR3                     BIT AT(083H) REG;
DECLARE CE1                      BIT AT(084H) REG;
DECLARE CE2                      BIT AT(085H) REG;
DECLARE PIN_07                   BIT AT(087H) REG;
DECLARE P3_2                     BIT AT(0B2H) REG;

/* ram usage by this module */
DECLARE ti_talking               BIT;
DECLARE ti_status                BIT;
DECLARE stop_flag                BIT;
DECLARE read_rvs                 BIT;
DECLARE new_module               BIT;
DECLARE ti_pending               BIT;
DECLARE speech_done              BIT;
DECLARE set_port                 BIT;
DECLARE ti_off                   BIT;
DECLARE voiced                   BIT;
DECLARE start_sine               BIT;
DECLARE start_square             BIT;
DECLARE external_talking         BIT;
DECLARE next_frame_exists        BIT;
DECLARE spell_next               BIT;
DECLARE no_module                BIT;
DECLARE chg_vol                  BIT;
DECLARE card_voice               BIT;
DECLARE first_read               BIT;
DECLARE first_internal           BIT;
DECLARE diagnostic_card          BIT;
DECLARE voice_per_phrase         BIT;
Select
DECLARE coding_type              BIT;    /* 0 = D6, 1 = 5220 */

LATTICE PRINT UTILITY May 14, 1990  11:58 AM
AISI41.P51  54071 bytes 01/01/80 08:55:40

DECLARE silent_delay             BYTE at (3bh);
```

```
DECLARE out_byte                BYTE;
DECLARE module_timer            WORD;
DECLARE next_ti_data            BYTE;
DECLARE next_phrase             WORD;
DECLARE current_phrase          WORD;
DECLARE ROM_pointer             WORD;
DECLARE ROM_pointer_l           BYTE AT(.ROM_pointer+1);
DECLARE ROM_pointer_h           BYTE AT(.ROM_pointer);
DECLARE bit_pointer             WORD;
DECLARE bit_count               BYTE;
DECLARE time_count              WORD;          /* can we use timer ???*/
DECLARE short_timeout           WORD;
DECLARE long_timeout            WORD;
DECLARE source                  BYTE;
DECLARE dest                    BYTE;

/* declare at a specific address to fill in holes in the memory map */
DECLARE PWM_male                BYTE AT(3DH);
DECLARE PWM_female              BYTE AT(3EH);
DECLARE ROM_page                BYTE AT(3FH);
DECLARE frame (14)              BYTE AT(02DH);
                                                /*  0 = pitch            */
                                                /*  1 = energy           */
                                                /*  2 = K1               */
                                                /*  3 = K2               */
                                                /*  4 = K3               */
                                                /*  5 = K4               */
                                                /*  6 = K5               */
                                                /*  7 = K6               */
                                                /*  8 = K7               */
                                                /*  9 = K8               */
                                                /* 10 = K9               */
                                                /* 11 = K10              */
                                                /* 12 = <FP>,<FE>        */
                                                /* 13 = <FK1><FK2>       */
                                                /*      <FK3><FK4>, these two are always */
                                                /*      <FK5><FK6>, zero, don't save them */

DECLARE max_phrase              WORD at (26h);
DECLARE max_phrase_h            BYTE AT(.max_phrase);
DECLARE max_phrase_l            BYTE AT(.max_phrase+1);
DECLARE bar_code_hi             BYTE;
DECLARE bar_code_data           WORD AT(24H);
DECLARE word_table_ptr          WORD;
DECLARE word_table_ptr_h        BYTE AT(.word_table_ptr);
DECLARE word_table_ptr_l        BYTE AT(.word_table_ptr+1);
DECLARE rom_base_hi             BYTE;
DECLARE rom_base                WORD;
DECLARE rom_base_h              BYTE AT(.rom_base);
DECLARE rom_base_l              BYTE AT(.rom_base+1);
$eject
```

LATTICE PRINT UTILITY  May 14, 1990  11:58 AM
AISI41.P51  54071 bytes 01/01/80 08:55:40

```
$nolist
$include(lutab.inc)
$list reader_init:     PROCEDURE EXTERNAL;
end reader_init;

start_reader:    PROCEDURE EXTERNAL;
end start_reader;

process_read_data:    PROCEDURE EXTERNAL;
end process_read_data;

/* set up the vector for the PCA interrupt */

DECLARE         JMP          LITERALLY       '02H';
DECLARE         PCA_HI       LITERALLY       '01H';
DECLARE         PCA_LO       LITERALLY       '32H';

DECLARE VECTOR(3) BYTE AT(33H) CONSTANT( JMP, PCA_HI, PCA_LO );
DECLARE VECTOR2(3) BYTE AT(2BH) CONSTANT( JMP, 0, 51h );

$eject
/*
** speech code handler
*/ send_byte:   PROCEDURE USING 2;

declare i byte;

/* send a byte to the speech chip */
    /* called by interrupt code */

CE1 = 1;
    CE2 = 1;                              /* disable the external rom */

/* shake hands with the speech chip */ p2 = out_byte;                        /* set up the data */
    do while ( TI_RDY = 1 );              /* hang out till chip is ready */
        if ( not TI_IRT ) then
            return;
    end;
disable;                                  /* don't let any body screw up the timing */
    P3_2 = 1;
    WR_TI = 0;                            /* low to write */
    TI_ENAB = 0;                          /* low to enable */
```

```
              do i = 1 to 5;
              end;
          do while ( TI_RDY = 0 );     /* hang out til' he's got it */
          end;
          TI_ENAB = 1;                 /* turn off enable */

LATTICE PRINT UTILITY  May 14, 1990  11:58 AM
AISI41.P51  54071 bytes  01/01/80 08:55:40 enable;
          P3_2 = 0;
          do i = 1 to 2;
          end;
          return;

END send_byte;
sejeCT
/*
** speech code handler
*/ send_bytex:    PROCEDURE USING 2;
          declare 1 byte;

/* send a byte to the speech chip */
          /* called by interrupt code */

CE1 = 1;
          CE2 = 1;                     /* disable the external rom */
          /* shake hands with the speech chip */ p2 = out_byte;               /* set up the data */
          do while ( TI_RDY = 1 );     /* hang out til' chip is ready */
              if ( not TI_IRT ) then
              return;
          end;

WR_TI = 1;                   /* low to write */
          WR_TI = 1;                   /* low to write */

WR_TI = 0;                   /* low to write */
          TI_ENAB = 0;                 /* low to enable */ do i = 1 to 10;
          end;

TI_ENAB = 1;                 /* turn off enable */
          WR_TI = 1;                   /* turn off write */
```

```
        do i = 1 to 20;                    /* wait for rdy recovery */
        end;

return;
END send_bytex;
select
get_byte:       PROCEDURE USING 2;

DECLARE tmp     BYTE;

/* get a byte from the speech chip */
```

LATTICE PRINT UTILITY  May 14, 1990  11:58 AM
AISI41.P51  54071 bytes  01/01/80 08:55:40

```
     /* called by the speech interrupt code */

CE1 = 1;
     CE2 = 1;                              /* disable the external rom */
     /* shake hands with the speech chip */ p2 = 0FFH;                            /* float the data bus */
     WR_TI = 1;                            /* high to read */
     disable;
     P3_2 = 1;
     TI_ENAB = 0;                          /* low to enable */
     do while ( TI_IRT = 0 );              /* hang out til' he's ready */
     end;
     tmp = p2;                             /* get the data */
     TI_ENAB = 1;                          /* turn off enable */
     enable;                               /* just leave write turned off */
     P3_2 = 0;
     if (( tmp AND 02H ) <> 0 ) then
        do;
           TI_ENAB = 1;
        end;
     return;
END get_byte;
Select
get_bits:       PROCEDURE USING 2;

/*
** ROM address is determined by:
**
** ROM page controls the bank select logic
```

```
** ROM_pointer is sent to the shift register for the middle address bits
** bit_pointer contains A3, A2, A1, and A0 in its high nibble
** bit_pointer contains the address of the bit in the byte in its low nibble
*/
      dest = 0;
      do while ( bit_count > 0 );
           dest = SHL( dest, 1 );
           if (( bit_pointer AND 0FH ) = 0 ) then
                do;
                     if (( bit_pointer AND 030H ) = 030H ) then
                          do;
                               /* increment the address in the shift register and get */
                               /* byte 0 */
                               ROM_pointer = ROM_pointer + 1;
                               sbuf = LOW( ROM_pointer );
                               if (( ROM_pointer AND 02H ) <> 0 ) then
                                    do;
                                         ADR3 = 1;
                                         bit_pointer = 88H;

end;
                               else
                                    do;
                                         ADR3 = 0;
                                         bit_pointer = 8;
                                    end;
                     if (( ROM_pointer AND 01H ) <> 0 ) then
                          do;
                               ADR2 = 1;
                               bit_pointer = bit_pointer OR 40H;
                          end;
                     else
                          do;
                               ADR2 = 0;
                          end;
                     ADR1 = 0;
                     ADR0 = 0;
                     ADR0 = 0;
                     ADR0 = 0;                  /* kill 8 us for sbuf */
                     ADR0 = 0;                  /* kill 8 us for sbuf */
                     sbuf = HIGH( ROM_pointer );
```

LATTICE PRINT UTILITY  May 14, 1990  11:58 AM
AISI41.P51  54071 bytes  01/01/80  08:55:40

```
            ADR0 = 0;
            ADR0 = 0;
            ADR0 = 0;
            ADR0 = 0;
            ADR0 = 0;
            ADR0 = 0;
            ADR0 = 0;
            ADR0 = 0;            /* kill 8 uS for sbuf */
         disable;
         P3_2 = 1;
         p2 = 0FFH;        /* ??? if readrom address 512 then enable ce2 disable ce1
                              .... DO THIS IN GET_LETTER ROUTINE ... */

/*       CHK CHIP ENABLE */

IF ((ROM_pointer AND 4000h) = 0) THEN
            DO;
               CE1 = 0;
            END;
         ELSE
            DO;
               CE2 = 0;
            END;

RD_ROM = 0;
         RD_ROM = 0;        /* kill more time */
         source = p2;
         RD_ROM = 1;
         CE1 = 1;
```

LATTICE PRINT UTILITY May 14, 1990   11:58 AM
AISI41.P51  54071 bytes. 01/01/80 08:55:40

```
               CE2 = 1;
               P3_2 = 0;
            enable;
         end;
      else
         do;
            /* just read the next byte, the shift register is OK */
            bit_pointer = bit_pointer + 18H;
            if (( bit_pointer AND 080H ) <> 0 ) then
               ADR3 = 1;
            else
               ADR3 = 0;

if (( bit_pointer AND 040H ) <> 0 ) then
               ADR2 = 1;
            else
               ADR2 = 0;
```

```
                    if (( bit_pointer AND 020H ) <> 0 ) then
                        ADR1 = 1;
                    else
                        ADR1 = 0;
                    if (( bit_pointer AND 010H ) <> 0 ) then
                        ADR0 = 1;
                    else
                        ADR0 = 0;
                    disable;
                    P3_2 = 1;
                    p2 = 0FFH;
                    /*    CHK CHIP ENABLE */
                    IF ((ROM_pointer AND 4000h) = 0) THEN
                        DO;
                            CE1 = 0;
                        END;
                    ELSE
                        DO;
                            CE2 = 0;         /* kill more time */
                        END;
                    RD_ROM = 0;
                    RD_ROM = 0;
                    source = p2;
                    RD_ROM = 1;
                    CE1 = 1;
                    CE2 = 1;
                    P3_2 = 0;
                    enable;
                end;

LATTICE PRINT UTILITY  May 14, 1990   11:58 AM
AISI41.P51  54071 bytes 01/01/80 08:55:40

/* we have data to shift, so shift out the right of source, */
            /* into the right of destination                             */
            if (( source AND 1 ) <> 0 ) then
                dest = dest OR 1;
            source = SHR(source, 1 );
            bit_count = bit_count - 1;
            bit_pointer = bit_pointer - 1;
        end;
    return;
end get_bits;
select
```

```
get_letter:    PROCEDURE USING 2;

/*
**    LETTER address is determined by:
**
**    ROM page controls the bank select logic
**    ROM_pointer is sent to the shift register for the middle address bits
**    bit_pointer contains A3, A2, A1, and A0 in its low nibble
**    bit_pointer contains zero in its low nibble
*/ if ( bit_pointer = 3 ) then
            do;
            /* increment the address in the shift register and get byte 0 */
            ROM_pointer = ROM_pointer + 1;
            bit_pointer = 0;
            sbuf = LOW( ROM_pointer );

if (( ROM_pointer AND 02H ) <> 0 ) then
                do;
                ADR3 = 1;
                end;
            else
                do;
                ADR3 = 0;
                end;

if (( ROM_pointer AND 01H ) <> 0 ) then
                do;
                ADR2 = 1;
                end;
            else
                do;
                ADR2 = 0;
                end;

end;
        else
            do;
            bit_pointer = bit_pointer + 1;
            end;

LATTICE PRINT UTILITY  May 14, 1990   11:58 AM
AISI41.P51  54071 bytes 01/01/80 08:55:40 if (( bit_pointer AND 2 ) <> 0 ) then
            ADR1 = 1;
        else
            ADR1 = 0;

if (( bit_pointer AND 1 ) <> 0 ) then
```

```
              ADR0 = 1;
    else      ADR0 = 0;

if (( bit_pointer AND 1 ) <> 0 ) then
              ADR0 = 1;
    else      ADR0 = 0;

if (( bit_pointer AND 1 ) <> 0 ) then
              ADR0 = 1;
    else      ADR0 = 0;

sbuf = HIGH( ROM_pointer );

if (( bit_pointer AND 1 ) <> 0 ) then
              ADR0 = 1;
    else      ADR0 = 0;

if (( bit_pointer AND 1 ) <> 0 ) then
              ADR0 = 1;
    else      ADR0 = 0;

if (( bit_pointer AND 1 ) <> 0 ) then
              ADR0 = 1;
    else      ADR0 = 0;

if (( bit_pointer AND 1 ) <> 0 ) then
              ADR0 = 1;
    else      ADR0 = 0;

disable;
    P3_2 = 1;
    p2 = 0FFH;

/*     CHK CHIP ENABLE */

IF ((ROM_pointer AND 4000h) = 0) THEN
       DO;
          CE1 = 0;
       END;
    ELSE
       DO;
```

```
LATTICE PRINT UTILITY   May 14, 1990   11:58 AM
AISI41.P51  54071 bytes  01/01/80 08:55:40

CE2 = 0;
          END;

RD_ROM = 0;
          RD_ROM = 0;        /* kill more time */
          source = p2;
          RD_ROM = 1;
          CE1 = 1;
          CE2 = 1;
          P3_2 = 0;
          enable;
          return;

end get_letter;
$eject
get_ROM_pointer:      PROCEDURE USING 2;

DECLARE       adr_word          WORD;

adr_word = word_table_ptr + SHR(( next_phrase AND 0FFFH ), 1);
          sbuf = LOW( adr_word );
                    /* kill 8 us for sbuf */
          if (( adr_word AND 02h ) <> 0 ) then
              ADR3 = 1;
          else
              ADR3 = 0;
          if (( adr_word AND 01h ) <> 0 ) then
              ADR2 = 1;
          else
              ADR2 = 0;
          if (( next_phrase AND 01 ) <> 0 ) then
              ADR1 = 1;
          else
              ADR1 = 0;
          sbuf = HIGH( adr_word );
          ADR0 = 0;             /* kill 8 us for sbuf */
          ADR0 = 0;
          ADR0 = 0;
          ADR0 = 0;
          ADR0 = 0;
          ADR0 = 0;
          ADR0 = 0;
          ADR0 = 0;
          disable;
```

```
                P3_2 = 1;
                p2 = 0FFH;
                IF ((adr_word AND 4000h) = 0) THEN
                    DO;
                        CE1 = 0;
                    END;
                ELSE
                    DO;
                        CE2 = 0;
                    END;
                RD_ROM = 0;
                RD_ROM = 0;                /* kill more time */
                ROM_pointer_l = p2;
                RD_ROM = 1;
                CE1 = 1;
                CE2 = 1;
                P3_2 = 0;
            enable:
            ADR0 = 1;
            disable;
                P3_2 = 1;
                p2 = 0FFH;
                IF ((adr_word AND 4000h) = 0) THEN
                    DO;
                        CE1 = 0;
                    END;
                ELSE
                    DO;
                        CE2 = 0;
                    END;
                RD_ROM = 0;
                RD_ROM = 0;                /* kill more time */
                ROM_pointer_h = p2;
                RD_ROM = 1;
                CE1 = 1;
                CE2 = 1;
                P3_2 = 0;
            enable:                        /* get the first byte */ bit_pointer = 0;

sbuf = LOW( ROM_pointer );
```

LATTICE PRINT UTILITY  May 14, 1990   11:58 AM
AISI41.P51  54071 bytes 01/01/80 08:55:40

```
            if (( ROM_pointer AND 02H ) <> 0 ) then
                do;
                    ADR3 = 1;
                    bit_pointer = 88H;
                end;
            else
                do;
                    ADR3 = 0;
                    bit_pointer = 8;
                end;

if (( ROM_pointer AND 01H ) <> 0 ) then
```

LATTICE PRINT UTILITY  May 14, 1990  11:58 AM
AISI41.P51  54071 bytes  01/01/80 08:55:40

```
                do;
                    ADR2 = 1;
                    bit_pointer = bit_pointer OR 40H;
                end;
            else
                do;
                    ADR2 = 0;
                end;

ADR1 = 0;
            ADR0 = 0;
            ADR0 = 0;
            ADR0 = 0;              /* kill 8 uS for sbuf */
            ADR0 = 0;
            ADR0 = 0;              /* kill 8 uS for sbuf */
            sbuf = HIGH( ROM_pointer );
            ADR0 = 0;
            ADR0 = 0;
            ADR0 = 0;
            ADR0 = 0;
            ADR0 = 0;
            ADR0 = 0;
            ADR0 = 0;              /* kill 8 uS for sbuf */
            disable;
            P3_2 = 1;
            p2 = 0FFH;
            IF ((ROM_pointer AND 4000h) = 0) THEN
                DO;
                    CE1 = 0;
                END;
            ELSE
                DO;
```

```
            CE2 = 0;
         END;
         RD_ROM = 0;
         RD_ROM = 0;          /* kill more time */
         source = p2;
         RD_ROM = 1;
         CE1 = 1;
         CE2 = -1;
         P3_2 = 0;
         enable;
      return;
end get_ROM_pointer;

$eject
send_frame:     PROCEDURE USING 2;
     DECLARE      i     BYTE;
         do_i = 0 to 13;
            out_byte = frame(i);
            call send_byte;
         end;
         out_byte = 0;
         call send_byte;
         out_byte = 0;
         call send_byte;
      return;
end send_frame;

calculate_frame:     PROCEDURE USING 2;
     DECLARE      i     BYTE;
         /* calculate the frame from data at phrase_pointer, bit_pointer */
         if ( coding_type = TI_D6 ) then
            do;
               /* get the energy */
               bit_count = D6_ENERGY;
               call get_bits;
```

LATTICE PRINT UTILITY May 14, 1990   11:58 AM
AISI41.P51  54071 bytes 01/01/80 08:55:40

/* K3 and K4 fractions are zero */
/* K5 and K6 fractions are zero */

```
if ( dest = STOP_CODE ) then
    do;
        stop_flag = TRUE;
        return;
    end;

if ( dest = SILENT_CODE ) then
    do;
        voiced = TRUE;
        frame(0) = 0CH;
        do i = 1 to 13;
            frame(i) = 0;
        end;
        return;
    end;

disable;
frame(1) = look_up_table1.TABEN( dest );
enable;

bit_count = D6_REPEAT;
call get_bits;

if ( dest = 1 ) then
    do;
        /* repeat = TRUE; */
        /* get the pitch */
        bit_count = D6_PITCH;
        call get_bits;
```

LATTICE PRINT UTILITY  May 14, 1990   11:58 AM
AISI41.P51  54071 bytes 01/01/80 08:55:40

```
        if ( dest = UNVOICED_CODE ) then
            voiced = FALSE;
        else
            voiced = TRUE;

disable;
        frame(0) = look_up_table1.TABPI( dest );
        frame(12) = look_up_table1.TABPIF( dest );
        enable;
        return;
    end;

/* get the pitch */
bit_count = D6_PITCH;
call get_bits;
```

```
if ( dest = UNVOICED CODE ) then
        voiced = FALSE;
else
        voiced = TRUE;

disable;
frame(0) = look_up_table1.TABPI( dest );
frame(12) = look_up_table1.TABPIF( dest );
enable;

bit_count = D6_K1;
call get_bits;
disable;
frame(2) = look_up_table1.TABK1( dest );
frame(13) = look_up_table1.TABK1F( dest );
enable;

bit_count = D6_K2;
call get_bits;
disable;
frame(3) = look_up_table1.TABK2( dest );
frame(13) = frame(13) OR look_up_table1.TABK2F( dest );
enable;

bit_count = D6_K3;
call get_bits;
disable;
frame(4) = look_up_table1.TABK3( dest );
enable;

bit_count = D6_K4;
call get_bits;
disable;
frame(5) = look_up_table1.TABK4( dest );
enable;

dest = 0;
if ( voiced ) then
        do;
        bit_count = D6_K5;
        call get_bits;
        disable;
        frame(6) = look_up_table1.TABK5( dest );
        enable;
        end;
else
        do;
        frame(6) = 0;
        end;

dest = 0;
```

```
if ( voiced ) then
    do;
        bit_count = D6_K6;
        call get_bits;
        disable;
        frame(7) = look_up_table1.TABK6( dest );
        enable;
    end;
else
    do;
        frame(7) = 0;
    end;

dest = 0;
if ( voiced ) then
    do;
        bit_count = D6_K7;
        call get_bits;
        disable;
        frame(8) = look_up_table1.TABK7( dest );
        enable;
    end;
else
    do;
        frame(8) = 0;
    end;

dest = 0;
if ( voiced ) then
    do;
        bit_count = D6_K8;
        call get_bits;
        disable;
        frame(9) = look_up_table1.TABK8( dest );
        enable;
    end;
else
    do;
        frame(9) = 0;
    end;

dest = 0;
if ( voiced ) then
    do;
        bit_count = D6_K9;
        call get_bits;
        disable;
        frame(10) = look_up_table1.TABK9( dest );
        enable;
    end;
else
    do;
```

```
                    frame(10) = 0;
                    end;

dest = 0;
            if ( voiced ) then
                do;
                    bit_count = D6_K10;
                    call get_bits;
                    disable;
                    frame(11) = look_up_table1.TABK10( dest );
                    enable;
                    end;
            else
                do;
                    frame(11) = 0;
                    end;

end;

if ( coding_type = TI_5220 ) then
        do;
            /* get the energy */
            bit_count = T52_ENERGY;
            call get_bits;

if ( dest = STOP_CODE ) then
                do;
                    stop_flag = TRUE;
                    return;
                    end;

if ( dest = SILENT_CODE ) then
                do;
                    voiced = TRUE;
                    frame(0) = 0CH;
                    do i = 1 to 13;
                        frame(i) = 0;
                        end;

return;
                    end;

disable;
            frame(1) = look_up_table2.TABEN( dest );
            frame(12) = look_up_table2.TABEF( dest );
            enable;
            bit_count = T52_REPEAT;
            call get_bits;

if ( dest = 1 ) then
                do;
```

```
                                    /* repeat = TRUE; */
                                    /* get the pitch */
                    bit_count = T52_PITCH;
                    call get_bits;

if ( dest = UNVOICED_CODE ) then
                        voiced = FALSE;
                    else
                        voiced = TRUE;

disable;
                    frame(0) = look_up_table2.TABPI( dest );
                    enable;
                    return;
                    end;

/* get the pitch */
                    bit_count = T52_PITCH;
                    call get_bits;

if ( dest = UNVOICED_CODE ) then
                        voiced = FALSE;
                    else
                        voiced = TRUE;

disable;
                    frame(0) = look_up_table2.TABPI( dest );
                    enable;

bit_count = T52_K1;
                    call get_bits;
                    disable;
                    frame(2) = look_up_table2.TABK1( dest );
                    frame(13) = look_up_table2.TABK1F( dest );
                    enable;

bit_count = T52_K2;
                    call get_bits;
                    disable;
                    frame(3) = look_up_table2.TABK2( dest );
                    frame(13) = frame(13) OR look_up_table2.TABK2F( dest );
                    enable;
                    call get_bits;
                    disable;
                    frame(4) = look_up_table2.TABK3( dest );
                    enable;
                    bit_count = T52_K4;
```

```
                call get_bits;
                disable;
                frame(5) = look_up_table2.TABK4( dest );
                enable;
                dest = 0;
                if ( voiced ) then
                    do;
                        bit_count = T52_K5;
                        call get_bits;
                        disable;
                        frame(6) = look_up_table2.TABK5( dest );
                        enable;
                    end;
                else
                    do;
                        frame(6) = 0;
                    end;
                dest = 0;
                if ( voiced ) then
                    do;
                        bit_count = T52_K6;
                        call get_bits;
                        disable;
                        frame(7) = look_up_table2.TABK6( dest );
                        enable;
                    end;
                else
                    do;
                        frame(7) = 0;
                    end;
                dest = 0;
                if ( voiced ) then
                    do;
                        bit_count = T52_K7;
                        call get_bits;
                        disable;
                        frame(8) = look_up_table2.TABK7( dest );
                        enable;
                    end;
                else
                    do;
                        frame(8) = 0;
                    end;
                if ( voiced ) then
                    do;
                        bit_count = T52_K8;
```

```
                    call get_bits;
                    disable;
                    frame(9) = look_up_table2.TABK8( dest );
                    enable;
                end;
          else
                do;
                    frame(9) = 0;
                end;
          dest = 0;
          if ( voiced ) then
                do;
                    bit_count = T52_K9;
                    call get_bits;
                    disable;
                    frame(10) = look_up_table2.TABK9( dest );
                    enable;
                end;
          else
                do;
                    frame(10) = 0;
                end;
          dest = 0;
          if ( voiced ) then
                do;
                    bit_count = T52_K10;
                    call get_bits;
                    disable;
                    frame(11) = look_up_table2.TABK10( dest );
                    enable;
                end;
          else
                do;
                    frame(11) = 0;
                end;
     end;
     return;
end calculate_frame;
seject
pspt_port:   PROCEDURE USING 2;

DECLARE tmp    BYTE;

out_byte = SET_B_PORT;
```

```
            call send_byte;
            set_port = FALSE;
                    /* wait for the next interrupt */
            do while ( TI_IRT );
                end;
            call get_byte;

return;

END pset_port;
$eject
        /* speech chip done interrupt */
speech_int:     PROCEDURE INTERRUPT 2 USING 2;

DECLARE         1       BYTE;

if ( word_table_ptr <> 6 ) then
                do;
                P3_2 = 0;
                end;

if ( TF2 ) then
                do;
                if ( not TI_IRT ) then
                        call get_byte;

TF2 = 0;
                end;
        else if ( not TI_IRT ) then
                call get_byte;

else
                do;
                return;
                end;

ti_status = FALSE;

if ( start_square ) then
                do;
                out_byte = GEN_SQUARE;
                call send_byte;
                ti_off = TRUE;              /* TI must be reset before next use */
                ti_talking = FALSE;
                start_square = FALSE;
                enable;
                return;
                end;
```

```
        if ( set_port ) then
            DO;
                /* set 'B' port ) */
                out_byte = SET_B_PORT;
                call send byte;
            out_byte = next_t1_data OR 80h;
            call send_byte;
            set port = FALSE;
            do while( TI_IRT ); /* wait for the next interrupt */
                end;
            call get_byte;
            if ( chg_vol ) then
                do;
/*
                    out_byte = PULSE VOLUME;
                    call send byte;
                    out_byte = next_t1_data;
                    call send_byte;
                    set port = FALSE;
                    do while ( TI_IRT ); /* wait for the next interrupt **
                        end;
                    call get_byte;
*/
                    PIN_07 = 0;

next t1 data = next_t1_data AND 0BFH;
                    call pset port;
                    next t1 data = next_t1_data OR 040H;
                    call pset port;

next_t1_data = next_t1_data AND 0BFH;
                    call pset port;
                    next_t1_data = next_t1_data OR 040H;
                    call pset port;

next t1 data = next_t1_data AND 0BFH;
                    call pset_port;
                    next t1 data = next_t1_data OR 040H;
                    call pset port;

next t1 data = next_t1_data AND 0BFH;
                    call pset port;
                    next_t1_data = next_t1_data OR 040H;
                    call pset port;

next_t1_data = next_t1_data AND 0BFH;
```

```
                    call pset_port;
                    next_ti_data = next_ti_data OR 040H;
                    call pset_port;

next_ti_data = next_ti_data AND OBFH;
                    call pset_port;
                    next_ti_data = next_ti_data OR 040H;
                    call pset_port;
                    next_ti_data = next_ti_data OR 040H;
                    call pset_port;

next_ti_data = next_ti_data AND OBFH;
                    call pset_port;
                    next_ti_data = next_ti_data OR 040H;
                    call pset_port;

next_ti_data = next_ti_data AND OBFH;
                    call pset_port;
                    next_ti_data = next_ti_data OR 040H;
                    call pset_port;

next_ti_data = next_ti_data AND OBFH;
                    call pset_port;
                    next_ti_data = next_ti_data OR 040H;
                    call pset_port;

next_ti_data = next_ti_data OR 080H;
                    call pset_port;

PIN_07 = 1;
                end;
            END;

if ( start sine ) then
            do;
                out_byte = GEN_SINE;
                call send_byte;
                ti_off = TRUE;                    /* TI must be reset before next use */
                ti_talking = FALSE;
                start_sine = FALSE;
                enable;
                return;
            end;

select
    if ( external_talking ) then
        DO;
            if ( stop_flag or module_absent ) then
```

```
/*
          do;
          /* send stop */
          ET2 = 0;
          TR2 = 0;*/
          out_byte =         STOP_SPEECH;
          call send_byte;
          do while ( TI_IRT );
          end;
          call get_byte;
          stop_flag = FALSE;
          ti_talking = FALSE;
          external_talking = FALSE;
          EX1 = TRUE;              ** allow speech interrupts */
          end;
/*
     else do;
          if ( voiced ) then
               do;
               out_byte = SEND_VFRAME;
               call send_byte;
               end;
          else
               do;
               out_byte = SEND_UVFRAME;
               call send_byte;
               end;

/* send out the rest of the frame */ out_byte = frame(0);
          call send_byte;

out_byte = frame(1);
          call send_byte;

out_byte = frame(2);
          call send_byte;

out_byte = frame(3);
          call send_byte;

out_byte = frame(4);
          call send_byte;

out_byte = frame(5);
          call send_byte;

out_byte = frame(6);
          call send_byte;
```

```
                    out_byte = frame(7);
                    call send_byte;

out_byte = frame(8);
                    call send_byte;

out_byte = frame(9);
                    call send_byte;

out_byte = frame(10);
                    call send_byte;

out_byte = frame(11);
                    call send_byte;
                    out_byte = frame(13);
                    call send_byte;

/*          disable;
                    do i = 4 to 13;
                       out_byte = frame(i);
                       call send_byte;
                    end;
    */          out_byte = 0;              /* K3 and K4 fractions are zero */
                    call send_byte;
                    out_byte = 0;              /* K5 and K6 fractions are zero */
                    call send_byte;
                    P3_2 = 0;
                    enable;
                                             /* calculate the next frame */
                    call calculate_frame;
                END;  /* else */ select
    if ( NOT external_talking ) then
        DO;
            /* assert - current phrase is done */
            /* If there is a next phrase */
            /* start it up */ select_internal: if ( next_phrase <> 0FFFFH ) then
            do;
                /* there is a phrase pending, send it out */
                if ( ( next_phrase AND 0F000H ) = 0 ) then
```

```
             do;
                 /* this is an internal frame */
                 /* internal_phrase are always male */
                 CCAP4H = PWM_male;                          /* MALE voice */  /* set duty cycle */
                 next_ti_data = next_ti_data OR 4H;
                 call pset_port;

out_byte = SAY_INTERNAL;
                 call send_byte;
                 out_byte = next_phrase;
                 call send_byte;
                 ti_talking = TRUE;
                 current_phrase = next_phrase;
                 next_phrase = 0FFFFH;
                 P3_2 = 0;
                 enable;
                 return;
             else
                 do;
                     /* this is an external phrase */
                     /* set up the ROM pointer */
                     goto start_external;
                 end; /* else */
             end; /* if ( next_phrase <> 0FFFFH ) */ else
             do;
                 /* speech is done and there is not another phrase */
                 speech_done = TRUE;
                 ti_talking = FALSE;
             end;
        end; /* else */ enable;
    ce2 = 1;
    return;
seject
start_external:
    if ( ( next_phrase AND 0FFFH ) > max_phrase ) then
        do;
            /* this is not a valid phrase! */
            speech_done = TRUE;
            ti_talking = FALSE;
            next_phrase = 0FFFFH;
            P3_2 = 0;
            enable;
            return;
        end;
```

```
     call get_ROM_pointer;
     if ( ROM_pointer = 0 ) then
       do;
         /* this is not a valid phrase!! */
         speech_done = TRUE;
         t1_talking = FALSE;
         next_phrase = 0FFFFH;
         P3_2 = 0;
         enable;
         return;
       end;

stop_flag = FALSE;

/* calculate the first frame */
     if ( voice_per_phrase ) then
       do;
         /* get the voice */
         bit_count = 8;
         call get bits;

if (((voice_per_phrase ) AND (( dest AND 080H) = 80h ))
         OR ( NOT voice_per_phrase AND (card_voice = MALE))) then
       do; /* set to male */
         CCAP4H = PWM_male;                              /* MALE voice */
         next_t1_data = next_t1_data OR 4H;
         call pset_port;
       end;
     else
       do;
         CCAP4H = PWM_female;                            /* set duty cycle */
         next_t1_data = next_t1_data AND 0FBH;           /* FEMALE voice */
         call pset_port;
       end;

call calculate_frame;
     if ( voiced ) then
       do;
         out_byte = SEND_VFRAME;
         call send_bytex;
       end;
     else
       do;
         out_byte = SEND_UVFRAME;
         call send_bytex;
       end;

/* send out the rest of the frame */
     do i = 0 to 13;
```

```
               out_byte = frame(1);
               call send_bytex;
               end;

out_byte = 0;                  /* K3 and K4 fractions are zero */
          call send_bytex;
          out_byte = 0;                  /* K5 and K6 fractions are zero */
          call send_bytex;

external_talking = TRUE;

/* calculate the next frame */
          call calculate_frame;
          ti_talking = TRUE;
          current_phrase = next_phrase;
          next_phrase = 0FFFFH;
          P3_2 = 0;
          enable;
          return;

END speech_int;
$eject
** non-speech interrupt handlers
*/

/* external interrupt 0, wake up interrupt */
          /* the user pressed the wake up button while the power was */
          /* still on. Zero the timeout counter, and make sure the wand */
          /* is turned on. */ wake_up:  PROCEDURE INTERRUPT 0 USING 2;
          DECLARE I BYTE;

return;

END wake_up;
$eject read_ROM_header1: PROCEDURE USING 2;

/* send zeros to the address shift register */
          sbuf = 0;
          ADR0 = 0;            /* kill 8 us for sbuf */
          ADR0 = 0;
          ADR0 = 0;
```

```
ADR0 = 0;
ADR0 = 0;
ADR0 = 0;
ADR0 = 0;
sbuf = 0;
ADR0 = 0;           /* kill 8 us for sbuf */
ADR0 = 0;
ADR0 = 0;
ADR0 = 0;
ADR0 = 0;
ADR1 = 0;
ADR2 = 0;
ADR3 = 0;
disable;
p2 = OFFH;
CE1 = 0;
RD_ROM = 0;
RD_ROM = 0;         /* kill more time */
/* ROM_size = p2; */
RD_ROM = 1;
ADR0 = 1;
disable;
p2 = OFFH;
CE1 = 0;
RD_ROM = 0;
RD_ROM = 0;         /* kill more time */
if ( (p2 AND 3FH ) = 1 ) then
     coding_type = TI_D6;
if ( (p2 AND 3FH ) = 2 ) then
     coding_type = TI_5220;
if (( p2 AND 40H ) = 40H ) then
     card_voice = FEMALE;
else card_voice = MALE;
if (( p2 AND 80H ) = 80H ) then
     voice_per_phrase = TRUE;
else voice_per_phrase = FALSE;
RD_ROM = 1;
CE1 = 1;
CE2 = 1;
enable;
ADR1 = 1;
ADR0 = 0;
```

```
        disable;
        p2 = 0FFH;
        CE1 = 0;
        RD_ROM = 0;        /* kill more time */
        /* Module Revision number = p2; */
        RD_ROM = 1;
        CE1 = 1;
        CE2 = 1;
        enable;

ADR3 = 0;
        ADR2 = 1;
        ADR1 = 0;
        ADR0 = 0;
        disable;
        p2 = 0FFH;
        CE1 = 0;
        RD_ROM = 0;        /* kill more time */
        /* Get status bits = p2; */
        if (( p2 AND 2H ) = 2H ) then
               diagnostic_card = TRUE;
        else   diagnostic_card = FALSE;

RD_ROM = 1;
        CE1 = 1;
        CE2 = 1;
        enable;

ADR3 = 0;
        ADR2 = 0;
        ADR1 = 1;
        ADR0 = 1;
        disable;
        p2 = 0FFH;
        CE1 = 0;
        RD_ROM = 0;        /* kill more time */
        RD_ROM = 0;
        rom_base_hi = p2;
        RD_ROM = 1;
        CE1 = 1;
        CE2 = 1;
        enable;

ADR3 = 0;
        ADR2 = 1;
        ADR1 = 1;
        ADR0 = 0;
        disable;
```

```
p2 = 0FFH;
CE1 = 0;
RD_ROM = 0;     /* kill more time */
RD_ROM = 0;
word_table_ptr_l = p2;
RD_ROM = 1;
CE1 = 1;
CE2 = 1;
enable;

ADR0 = 1;
disable;
p2 = 0FFH;
CE1 = 0;
RD_ROM = 0;     /* kill more time */
RD_ROM = 0;
word_table_ptr_h = p2;
RD_ROM = 1;
CE1 = 1;
CE2 = 1;
enable;

ADR3 = 1;
ADR2 = 0;
ADR1 = 0;
ADR0 = 0;
disable;
p2 = 0FFH;
CE1 = 0;
RD_ROM = 0;
RD_ROM = 1;
CE1 = 1;
CE2 = 1;
enable;

ADR0 = 1;
disable;
p2 = 0FFH;
CE1 = 0;
RD_ROM = 0;     /* kill more time */
RD_ROM = 0;
rom_base_h = p2;
RD_ROM = 1;
CE1 = 1;
CE2 = 1;
enable;

/* send 04 to the address shift register */
```

```
    sbuf = 4;
    ADR0 = 0;          /* kill 8 us for sbuf */
    ADR0 = 0;
    ADR0 = 0;
    ADR0 = 0;
    ADR0 = 0;
    ADR0 = 0;
    sbuf = 0;
    ADR0 = 0;          /* kill 8 us for sbuf */
    ADR0 = 0;
    ADR0 = 0;
    ADR0 = 0;
    ADR0 = 0;
    ADR0 = 0;
    ADR1 = 0;
    ADR2 = 0;
    ADR3 = 0;
    disable;
    p2 = 0FFH;
    CE1 = 0;
    RD_ROM = 0;
    RD_ROM = 0;         /* kill more time */
    max_phrase_h = p2;
    RD_ROM = 1;
    CE1 = 1;
    CE2 = 1;
    enable;

ADR0 = 1;
    ADR1 = 0;
    ...
    ADR3 = 0;
    disable;
    p2 = 0FFH;
    CE1 = 0;
    RD_ROM = 0;
    RD_ROM = 0;         /* kill more time */
    max_phrase_l = p2;  /* recieve high byte of max phrase from rom card */
    RD_ROM = 1;
    CE1 = 1;
    CE2 = 1;
    enable;

return;

_end read_ROM_header1;
```

```
$eject
         /* timer 1 overflow interrupt */
t1_overflow:    PROCEDURE INTERRUPT 3 USING 2;

time_count = time_count + 1;

if ( time_count > short_timeout ) then
        do;
            WAND_OFF = TRUE;                             /* turn wand off */
            if ( not t1_off ) then
                do;
                    out_byte = SHUT_DOWN;                /* and the speech chip */
                    call send_byte;
                    t1_off = TRUE;
                end;
        end;

if ( time_count > long_timeout ) then
        do;
            PWR_ON = 0;                                  /* commit suicide */
            PCON = 2;         /*  shut down ocs to prevent restarts */
        end;
    if ( read_rom_delay <> 0 ) then
        do;
            read_rom_delay = read_rom_delay - 1;
            if ( read_rom_delay = 0 ) then
                call read_rom_header1;
        end;

module_timer = module_timer + 1;
    return;

END t1_overflow;
$eject
/*
** subroutines called by the mainline code
*/
kick_talker:    PROCEDURE USING 0;

declare i byte;

/* send a request status command to the speech chip, to generate */
        /* an interrupt.  Called by mainline code */ if ( t1_talking OR t1_status ) then
        return;
```

```
if ( ti off) then
    do;
        /* reset the speech chip */
        TI_INIT = 0;
        TI_INIT = 1;
        ti_off = FALSE;
        set_port = TRUE;
    end;

/* shake hands with the speech chip */
    do while ( TI_RDY = 1 );     /* hang out til' chip is ready */
    end;
    disable;                     /* don't let interrupts disturb us */
    P3_2 = 1;
    CE1 = 1;
    CE2 = 1;                     /* disable the external rom */
    p2 = GET_STATUS;             /* set up the command byte */
    WR_TI = 0;                   /* low to write */
    TI_ENAB = 0;                 /* low to enable */
    do_i = 1 to 5;
    end;
    do while ( TI_RDY = 0 );     /* hang out til' he's got it */
    end;
    TI_ENAB = 1;                 /* turn off enable */
    WR_TI = 1;                   /* turn off write */
    EX1 = 1;                     /* speech interrupts ok now */
    ti_status = TRUE;
    P3_2 = 0;
    enable;

return;

END kick_talker;
eject
inc_volume: PROCEDURE;

chg_vol = TRUE;
                                 /* clear direction bit */
    next_ti_data = next_ti_data AND 0DFH;
    set_port = TRUE;
    if (( not ti_talking ) or ((current_phrase AND 0F000h) = 0 )) then
        do;
            /* repeat last spoken phrase */
            next_phrase = current_phrase;
            call kick_talker;
        end;
```

```
                return;

end inc_volume;
            dec_volume: PROCEDURE;

chg_vol = TRUE;
                        /* set direction bit */
                next_ti_data = next_ti_data OR 020H;
                set_port = TRUE;

if (( not ti_talking ) or ((current_phrase AND 0F000h) = 0 )) then
                    do;
                        /* repeat last spoken phrase */
                        next_phrase = current_phrase;
                        call kick_talker;
                    end;

return;

end dec_volume;
        select
        vol_ramp: PROCEDURE;

declare i word;
            declare j byte;

WAND_OFF = TRUE;                                    /* turn wand off */ start_sine = TRUE;
            call kick_talker;
            do while( start_sine = TRUE );
            end;
            /* set to maximum volume */
            do i = 0 to 10;
                chg_vol = TRUE;
                        /* clear direction bit */
                next_ti_data = next_ti_data AND 0DFH;
                set_port = TRUE;

call kick_talker;
                do while( set_port = TRUE );
                end;
            end;

/* step down */
            do j = 0 to 10;

start_sine = TRUE;
```

```
        call kick_talker;
        do while( start_sine = TRUE );
        end;

do i = 0 to 20000;
        end;
        chg_vol = TRUE;
                   /* set direction bit */
        next_t1_data = next_t1_data OR 020H;
        set_port = TRUE;
        call kick_talker;
        do while( set_port = TRUE );
        end;
        WAND_OFF = NOT WAND_OFF;              /* toggle wand power */
        end;

/* step up */
    do j = 0 to 10;
        start_sine = TRUE;
        call kick_talker;
        do while( start_sine = TRUE );
        end;

do i = 0 to 20000;
        end;
        chg_vol = TRUE;
                   /* clear direction bit */
        next_t1_data = next_t1_data AND 0DFH;
        set_port = TRUE;
        call kick_talker;
        do while( set_port = TRUE );
        end;
        WAND_OFF = NOT WAND_OFF;              /* toggle wand power */
        end;

/* leave at max volume */
    WAND_OFF = FALSE;                         /* turn wand off */ return;

end vol_ramp;
```

```
        next_phrase = PHRASE_HELLO;
        call kick_talker;
        do while ( next_phrase = PHRASE_HELLO );
                end;

return;

end int_test;

ext_test: PROCEDURE;

next_phrase = 1000H;
        call kick_talker;
        do while ( next_phrase = 1000H );
                end;

return;

end ext_test;

do_diagnostics: PROCEDURE;
        /* perform extensive diagnostics */

/* volume ramp */
        call vol_ramp;

/* internal speech */
        call int_test;

/* external speech */
        call ext_test;

return;
end do_diagnostics;

start_sine_wave: PROCEDURE;

start_sine = TRUE;
        call kick_talker;
        return;

end start_sine_wave;

start_square_wave: PROCEDURE;

start_square = TRUE;
        call kick_talker;
        return;
```

```
end start_square_wave;
 eject
read_ROM_header: PROCEDURE;
    /* send zeros to the address shift register */ sbuf = 0;
    ADR0 = 0;        /* kill 8 uS for sbuf */
    ADR0 = 0;
    ADR0 = 0;
    ADR0 = 0;
    ADR0 = 0;
    ADR0 = 0;
    ADR0 = 0;
    sbuf = 0;
    ADR0 = 0;        /* kill 8 uS for sbuf */
    ADR0 = 0;
    ADR0 = 0;
    ADR0 = 0;
    ADR0 = 0;
    ADR0 = 0;
    ADR0 = 0;
    ADR1 = 0;
    ADR2 = 0;
    ADR3 = 0;
    disable;
    p2 = 0FFH;
    CE1 = 0;
    RD_ROM = 0;
    RD_ROM = 0;      /* kill more time */
    /* ROM size = p2; */
    RD_ROM = 1;
    CE1 = 1;
    CE2 = 1;
    enable;

disable;
    p2 = 0FFH;
    CE1 = 0;
    RD_ROM = 0;
    RD_ROM = 0;      /* kill more time */
    /* ROM size = p2; */
    RD_ROM = 1;
    CE1 = 1;
    CE2 = 1;
    enable;
```

```
        ADR0 = 1;
        disable;
        p2 = 0FFH;
        CE1 = 0;
        RD_ROM = 0;
        RD_ROM = 0;         /* kill more time */
              coding_type = TI_D6;
        if ( (p2 AND 03FH ) = 2 ) then
              coding_type = TI 5220;
        if (( p2 AND 40H ) = 40H ) then
              card_voice = FEMALE;
        else
              card_voice = MALE;
        if (( p2 AND 80H ) = 80H ) then
              voice_per_phrase = TRUE;
        else
              voice_per_phrase = FALSE;
        RD_ROM = 1;
        CE1 = 1;
        CE2 = 1;
        enable;

ADR1 = 1;
        ADR0 = 0;
        disable;
        p2 = 0FFH;
        CE1 = 0;
        RD_ROM = 0;         /* kill more time */
        RD_ROM = 0;
        /* Module Revision number = p2; */
        RD_ROM = 1;
        CE1 = 1;
        CE2 = 1;
        enable;

ADR3 = 0;
        ADR2 = 1;
        ADR1 = 0;
        ADR0 = 0;
        disable;
        p2 = 0FFH;
        CE1 = 0;
        RD_ROM = 0;
        RD_ROM = 0;         /* kill more time */
        /* Get status bits = p2; */
        if (( p2 AND 2H ) = 2H ) then
              diagnostic_card = TRUE;
        else
              diagnostic_card = FALSE;
```

```
RD_ROM = 1;
CE1 = 1;
CE2 = 1;
enable;

ADR3 = 0;
ADR2 = 0;
ADR1 = 1;
ADR0 = 1;
disable;
p2 = 0FFH;
CE1 = 0;
RD_ROM = 0;
RD_ROM = 0;           /* kill more time */
rom_base_hi = p2;
RD_ROM = 1;
CE1 = 1;
CE2 = 1;
enable;

ADR3 = 0;
ADR2 = 1;
ADR1 = 1;
ADR0 = 0;
disable;
p2 = 0FFH;
CE1 = 0;
RD_ROM = 0;
RD_ROM = 0;           /* kill more time */
word_table_ptr_l = p2;
RD_ROM = 1;
CE1 = 1;
CE2 = 1;
enable;

ADR0 = 1;
disable;
p2 = 0FFH;
CE1 = 0;
RD_ROM = 0;
RD_ROM = 0;           /* kill more time */
word_table_ptr_h = p2;
RD_ROM = 1;
CE1 = 1;
CE2 = 1;
enable;

ADR3 = 1;
ADR2 = 0;
ADR1 = 0;
```

```
ADR0 = 0;
disable;
p2 = 0FFH;
CE1 = 0;
RD_ROM = 0;
RD_ROM = 0;        /* kill more time */
rom_base_l = p2;
RD_ROM = 1;
CE1 = 1;
CE2 = 1;
enable;

ADR0 = 1;
disable;
CE1 = 0;
RD_ROM = 0;
RD_ROM = 0;        /* kill more time */
rom_base_h = p2;
RD_ROM = 1;
CE1 = 1;
CE2 = 1;
enable;

/* send 01 to the address shift register */
sbuf = 4;
ADR0 = 0;          /* kill 8 uS for sbuf */
ADR0 = 0;
ADR0 = 0;
ADR0 = 0;
ADR0 = 0;
ADR0 = 0;
ADR0 = 0;
ADR0 = 0;
sbuf = 0;
ADR0 = 0;          /* kill 8 uS for sbuf */
ADR0 = 0;
ADR0 = 0;
ADR0 = 0;
ADR0 = 0;
ADR0 = 0;
ADR0 = 0;
ADR1 = 0;
ADR2 = 0;
ADR3 = 0;
disable;
p2 = 0FFH;
```

```
            CE1 = 0;
            RD_ROM = 0;
            RD_ROM = 0;      /* kill more time */
            max_phrase_h = p2;   /* recieve low byte of max phrase from rom card */
            RD_ROM = 1;
            CE1 = 1;
            ce2 = 1;
            enable;

ADR0 = 1;
            disable;
            p2 = OFFH;
            CE1 = 0;
            RD_ROM = 0;      /* kill more time */
            max_phrase_l = p2;   /* recieve high byte of max phrase from rom card */
            RD_ROM = 1;
            CE1 = 1;
            CE2 = 1;
            return;
end read_ROM_header;
seject
/*
** convert bar code data from ASCII to binary
*/
atobin: PROCEDURE (ascii) BYTE;
DECLARE ascii BYTE;
        if ( ascii >= '0' AND ascii <= '9' ) then
                return ( ascii - '0' );
        else if ( ascii >= 'A' AND ascii <= 'V' ) then
                return ( ascii - 55 );
        else
                return ( OFFH );
end atobin;

convert_code: PROCEDURE;
        if ( read_pointer - 29h = 1 ) then
        do;
                bar_code_data = CHANGE_VOLUME;
                read_buffer(0) = 'F';
                return;
        end;
```

```
if ( 2Ch - read_pointer = 1 ) then
    do;
        bar_code_data = CHANGE_VOLUME;
        read_buffer(0) = 'F';
        return;
    end;

if ( read_buffer(0) = '1' ) then
    do;
        /* map characters under old scheme */
        bar_code_data = 1000H;
        goto atohex;
    end;

else if ( read_buffer(0) = 'Z' ) then
    do;
        /* map command character */
        bar_code_data = 0F000H;
        read_buffer(0) = 'F';
        goto atohex;
    end;

else
    do;
        /* map under new conversion scheme */
        bar_code_hi = atobin(read_buffer(0));
        bar_code_data = atobin(read_buffer(3)) +
            ( atobin(read_buffer(2)) * 32 ) +
            ( atobin(read_buffer(1)) * 1024 ) ;

if (( bar_code_hi = rom_base_hi ) AND ( bar_code_data >= rom_base )) then
            do;
                bar_code_data = bar_code_data - rom_base;
                bar_code_data = bar_code_data + 1000H;
                read_buffer(0) = '1';
                return;
            end;
        else if (( bar_code_hi = 0ffh ) AND ( bar_code_data < 73 )) then
            do;
                /* internal phrase */
                /* just pass back the bar_code_data */
                read_buffer(0) = '0';
                return;
            end;
        else
            do;
                rs.goodrd = FALSE;
                rs.badrd = TRUE;
                return;
            end;
    end;
```

```
atohex:
        if ( read_buffer(3) >= '0' AND read_buffer(3) <= '9' ) then
            bar_code_data = bar_code_data + read_buffer(3) - 30H;
        else if ( read_buffer(3) >= 'A' AND read_buffer(3) <= 'F' ) then
            bar_code_data = bar_code_data + read_buffer(3) - 55;
        else
            do;
                rs.goodrd = FALSE;
                rs.badrd = TRUE;
                return;
            end;

if ( read_buffer(2) >= '0' AND read_buffer(2) <= '9' ) then
            bar_code_data = bar_code_data + ( read_buffer(2) - 30H ) * 16;
        else if ( read_buffer(2) >= 'A' AND read_buffer(2) <= 'F' ) then
            bar_code_data = bar_code_data + ( read_buffer(2) - 55) * 16;
        else
            do;
                rs.goodrd = FALSE;
                rs.badrd = TRUE;
                return;
            end;

if ( read_buffer(1) >= '0' AND read_buffer(1) <= '9' ) then
            bar_code_data = bar_code_data + ( read_buffer(1) - 30H ) * 256;
        else if ( read_buffer(1) >= 'A' AND read_buffer(1) <= 'F' ) then
            bar_code_data = bar_code_data + ( read_buffer(1) - 55 ) * 256;
        else
            do;
                rs.goodrd = FALSE;
                rs.badrd = TRUE;
                return;
            end;

return;

end convert_code;

$eject

/* enter here any time power is applied, or reset happens */ disable;        /* turn of interrupts */

/*#### POWER ON DIAGNOSTICS GO HERE ####*/

/* hold the speech chip in reset for a while */
pwr_on = 1;
TI_INIT = 0;
```

```c
PIN_07 = 1;
ce2 = 1;                            /* disable e2pot */
module_absent = 1;

WAND_OFF = FALSE;                   /* turn the wand on */

/* perform the reader init function here so we can set some bits of our own */

CMOD = 04H;                         /* count timer 0 overflows, about 250kHz */
CMOD = 02H;                         /* count osc / 12, about 4MHz */
CCON = 40H;
CCAPM1 = 10H;                       /* wand falling edge */
CCAPM2 = 20H;                       /* wand rising edge */
CCAPM3 = 08H;                       /* wand timer */
CCAPM4 = 42H;                       /* PWM for TI clock speed control */

CCAP3L = 34H;
CCAP3H = 12H;
CCAP4H = 01H;                       /* DUTY CYCLE */

TMOD = 12H;                         /* timer 0 = 8 bit auto reload */
                                    /* timer 1 = 16 bit timer */
                                    /* TIMER 0 STARTS AT -8 */
TH0 = 0F8H;                         /* start timer 0 and timer 1 */
TCON = 50H;                         /* disable timer 1 overflow interrupt */
ET1 = true;                         /* clear the bar code status bits */
RSTATS = 0;

/* end of reader init code */

/* program the serial port for mode 0 ( shift register ) */
SCON = 0;

/* set up interrupt priorities */
/* possible interrupts are:
/*  CEX1 - wand interrupt                                                */
/*  CEX2 - wand interrupt                                                */
/*  CEX3 - wand timeout                                                  */
/*  int1 - Speech chip interrupt                                         */
/*  int0 - external wakeup                                               */
/*  T1 overflow - time keeper                                            */
/*
/*  CEX1, CEX2, and CEX3 are handled by the bar code module              */
/*  CEX0 (speed measurement) and CEX4 (PWM) are non-interrupt            */
/*  int0, int1, and timer 1 overflow are handled in this module         */
/*  timer 0 drives the PCA clock                                         */
/*  timer 2 is used as a data storage register!                         */

IP = 40H;                           /* PCA at high level */
```

```
time_count = 0;
/*
long_timeout = 0FFFFH;
short_timeout = 0FFFFH;
*/
enable;                           /* allow interrupts */
$eject
/*
** initialize the speech chip
*/
start_sine = FALSE;
start_square = FALSE;

chg_vol = FALSE;
t1_off = FALSE;
t1_talking = FALSE;
t1_status = FALSE;
external_talking = FALSE;
bit_count = 0;
long_timeout = 0FFFFH;
next_phrase = 0FFFFH;
current_phrase = 0FFFFH;
first_read = TRUE;
first_internal = FALSE;
TI_INIT = 1;
EX1 = TRUE;                       /* allow speech interrupts */ next_t1_data = 0F4H;    /* MALE voice */
do while ( set_port );                      /* hang out till the register is set */
   end;

start_square = TRUE;              /* start the square wave to time the clock */
call kick_talker;

do while ( start_square );                  /* hang out till the register is set */
   end;
$eject
PWM_male = 0H;
current_phrase = 0;
DISABLE;
do while ( current_phrase < 137H AND PWM_male <> 255 );
   /* program PCA.0 for capture on each edge */
   PWM_male = PWM_male + 1;
   CCAP4H = PWM_male;             /* set duty cycle */
   CCAPM0 = 10H;                  /* falling edge */
   CCF0 = 0;
   do while ( CCF0 = 0 );
      /* wait for falling edge */
      end;
```

```
            ROM_pointer_l = CCAP0L;
            ROM_pointer_h = CCAP0H;
            next_phrase = ROM_pointer;

CCF0 = 0;
            do while ( CCF0 = 0 );
                    /* wait next falling edge */
            end;

ROM_pointer_l = CCAP0L;
            ROM_pointer_h = CCAP0H;
            current_phrase = ROM_pointer - next_phrase;
            end;

/*PWM_male = 10H;*/
next_phrase = 0FFFFH;
current_phrase = 0FFFFH;

select
next_tl_data = 0F0H;        /* FEMALE voice */
set_port = TRUE;            /* kick the speech chip to generate an interrupt */
call kick_talker;                 /* note: kick_talker enables interrupts! */ do while ( set_port );            /* hang out till the register is set */
        end;

start_square = TRUE;              /* start the square wave to time the clock */
call kick_talker;

do while ( start_square );        /* hang out till the register is set */
        end;
PWM_female = 1;
current_phrase = 0h;
DISABLE;

do while ( current_phrase < 0F5H AND PWM_female <> 255 );
        /* program PCA.0 for capture on each edge */
        PWM_female = PWM_female + 1;
        CCAP4H = PWM_female;          /* set duty cycle */
        CCAPM0 = 10H;                 /* falling edge */

CCF0 = 0;
        do while ( CCF0 = 0 );
            /* wait for falling edge */
        end;

ROM_pointer_l = CCAP0L;
        ROM_pointer_h = CCAP0H;
        next_phrase = ROM_pointer;
```

```
        CCF0 = 0;
        do while ( CCF0 = 0 );
                        /* wait next falliing edge */
        end;

ROM_pointer_l = CCAP0L;
        ROM_pointer_h = CCAP0H;
        current_phrase = ROM_pointer - next_phrase;
    end;

/* PWM_female = 80H; */

CMOD = 04H;                     /* count timer 0 overflows, about 250kHz */
next_phrase = 0FFFFH;
current_phrase = 0FFFFH;

ENABLE:

next_t1_data = 0F4H;    /* MALE voice */
set port = TRUE;
call kick_talker;               /* kick the speech chip to generate an interrupt */
do while ( set_port );
                                /* hang out till the register is set */
    end;

$eject
/*
** initialize the rest of the system
*/
do module_timer = 0 to 100;
    end;

short_timeout = THREE_MINUTES;
long_timeout  = THREE_MINUTES;
ET1 = true;                     /* enable timer 1 overflow interrupt */
time_count = 0;
module_timer = FIFTYFIVE_SECONDS;     /* check for external module */
no_module = FALSE;                    /* wait for a speech module */

EX0 = FALSE;                    /* do not Turn on the wake-up interrupt */
ET1 = TRUE;                     /* Turn on the timer one overflow interrupt */ call start_reader;

next_phrase = PHRASE_HELLO;
next_t1_data = 0F4H;            /* MALE voice, mid-range volume, sw-1 and sw-2 = 0 */
set port = TRUE;
call kick_talker;

do module_timer = 0 to 100;
```

```
         end;
new_module = TRUE;
if ( not module_absent ) then
     do;
        /* read the module header */
        call read_rom_header;
        new_module = FALSE;
     end;

select          /* end of init code */ do while (1);   /* now enter main loop */ if ( BATTERY_LOW ) then
        do;
           /* we will commandeer the module timer.*/
           if ( module_timer > SIXTY_SECONDS ) then
              do;
                 /* tell user we are low on power */
                 next_phrase = PHRASE_BATTERY_LOW;
                 call kick_talker;
                              /* start the timer again */
                 module_timer = 0;
              end;

end;

if ( module_absent ) then
        do;
           /* read header next time we get a module */
           new_module = TRUE;
           if ( ( module_timer >= FIFTYFIVE_SECONDS ) AND ( NOT BATTERY_LOW ) AND
                ( NOT no_module ) AND ( NOT first_internal ) ) then
              do;
                 next_phrase = PHRASE_INSERT_MODULE;
                 call kick_talker;
                 module_timer = 0;
              end;

end;
     else
        do;
           if ( new_module ) then
              do;
                 /* read module header */
                 read_ROM_delay = 3;
                 new_module = FALSE;
              end;
```

```
                    if ( NOT BATTERY_LOW ) then    /* don't run the timeout clock if we have a module */
                        module_timer = 0;
                end;
seject
            if ( rs.rproc ) then
                do;
                    /* restart the time out counter */
                    time_count = 0;
                    call process_read_data;
                    if ( rs.goodrd ) then              /* N.B. convert_code can alter */
                        call convert_code;              /* rs.xxxx bits. */
                    if ( rs.goodrd ) then
                        do;
                            if ( not rs.forward ) then
                                do;
                                    /* volume command is the only one valid in reverse */
                                    if ( bar_code_data = CHANGE_VOLUME ) then
                                        call dec_volume;
                                end;
                            else if ( read_buffer(0) = '0' ) then
                                do;
                                    /* speak internal phrase */
                                    if ( first_read ) then
                                        first_internal = TRUE;
                                    first_read = FALSE;
                                    next_phrase = bar_code_data;
                                    call kick_talker;
                                end;
                            else if ( read_buffer(0) = 'F' ) then
                                do;
                                    /* command code */
                                    if ( bar_code_data = CHANGE_VOLUME ) then
                                        call inc_volume;
                                    if ( bar_code_data = INCREASE_VOLUME ) then
                                        call inc_volume;
                                    if ( bar_code_data = DECREASE_VOLUME ) then
                                        call dec_volume;
                                    if ( bar_code_data = TURN_OFF ) then
                                        do;
                                            PCON = 2;      /*   shut down osc  */
                                        end;
                                    if ( bar_code_data = NO_MODULE_OPERATION ) then
                                        no_module = TRUE;  /* don't wait for a speech module */
                                    if ( bar_code_data = DIAGNOSTICS ) then
                                        call do_diagnostics;
                                    if ( bar_code_data = SQUARE_WAVE ) then
```

```
              call start_square_wave;
           if ( bar_code_data = MSINE_WAVE ) then
              do;
                 next_ti_data = next_ti_data OR 4H;      /* MALE voice */    /* set duty cycle */
                 CCAP4H = PWM_male;
                 set_port = TRUE;
                 call start_sine_wave;
              end;
           if ( bar_code_data = FSINE_WAVE ) then
              do;
                 next_ti_data = next_ti_data AND 0FBH;   /* FEMALE voice */  /* set duty cycle */
                 CCAP4H = PWM_female;
                 set_port = TRUE;
                 call start_sine_wave;
              end;
         end;
         else if ( read_buffer(0) = '1' ) then
            do;
            /* speak external phrase */
               first_read = FALSE;
               next_phrase = bar_code_data;
               call kick_talker;
            end;
         else /* read_buffer(0) >= '9' and <= 'E' */
            do;
            /* ignore invalid commands */
            end;

call start_reader;

end; /* if ( rs.rproc ) */
end; /* forever loop */ end;
```

```
       COLUMN 240
       PRINTER COMPRESS
       TITLE   AISI 50C4X SPEECH SYNTHESIS PROGRAM, V1.7a
```

================================================================
                    AISI SPEECH SYNTHESIS PROGRAM
================================================================

================================================================
                  NEW & PRESENT VALUE RAM EQUATES
================================================================

```
PNV     EQU     #00             ;PITCH NEW VALUE
PPV     EQU     #01             ;PITCH PRESENT VALUE
ENV     EQU     #02             ;ENERGY NEW VALUE ADDR
EPV     EQU     #03             ;ENERGY PRESENT VALUE
K1NV    EQU     #04             ;K1 NEW VALUE
K1PV    EQU     #05             ;K1 PRESENT VALUE
K2NV    EQU     #06             ;K2 NEW VALUE
K2PV    EQU     #07             ;K2 PRESENT VALUE
K3NV    EQU     #08             ;K3 NEW VALUE
K3PV    EQU     #09             ;K3 PRESENT VALUE
K4NV    EQU     #0A             ;K4 NEW VALUE
K4PV    EQU     #0B             ;K4 PRESENT VALUE
K5NV    EQU     #0C             ;K5 NEW VALUE
K5PV    EQU     #0D             ;K5 PRESENT VALUE
K6NV    EQU     #0E             ;K6 NEW VALUE
K6PV    EQU     #0F             ;K6 PRESENT VALUE
K7NV    EQU     #10             ;K7 NEW VALUE
K7PV    EQU     #11             ;K7 PRESENT VALUE
K8NV    EQU     #12             ;K8 NEW VALUE
K8PV    EQU     #13             ;K8 PRESENT VALUE
K9NV    EQU     #14             ;K9 NEW VALUE
K9PV    EQU     #15             ;K9 PRESENT VALUE
K10NV   EQU     #16             ;K10 NEW VALUE
K10PV   EQU     #17             ;K10 PRESENT VALUE
FPNV    EQU     #00             ;PITCH NEW VALUE
FPPV    EQU     #01             ;PITCH PRESENT VALUE
FENV    EQU     #02             ;ENERGY PRESENT VALUE ADDR
FEPV    EQU     #03             ;ENERGY NEW VALUE
```

================================================================
              NEW & PRESENT FRACTIONAL VALUE RAM EQUATES
================================================================

```
FK1NV   EQU     #84             ;K1 NEW VALUE
FK1PV   EQU     #85             ;K1 PRESENT VALUE
FK2NV   EQU     #86             ;K2 NEW VALUE
FK2PV   EQU     #87             ;K2 PRESENT VALUE
FK3NV   EQU     #88             ;K3 NEW VALUE
FK3PV   EQU     #89             ;K3 PRESENT VALUE
FK4NV   EQU     #8A             ;K4 NEW VALUE
FK4PV   EQU     #8B             ;K4 PRESENT VALUE
FK5NV   EQU     #8C             ;K5 NEW VALUE
FK5PV   EQU     #8D             ;K5 PRESENT VALUE
FK6NV   EQU     #8E             ;K6 NEW VALUE
FK6PV   EQU     #8F             ;K6 PRESENT VALUE
```

```
;========================================================
;|              BUFFER VALUE RAM EQUATES                 |
;========================================================

PBF     EQU     #18             ;PITCH BUFFER
EBF     EQU     #19             ;ENERGY BUFFER
K1BF    EQU     #1A             ;K1 BUFFER
K2BF    EQU     #1B             ;K2 BUFFER
K3BF    EQU     #1C             ;K3 BUFFER
K4BF    EQU     #1D             ;K4 BUFFER
K5BF    EQU     #1E             ;K5 BUFFER
K6BF    EQU     #1F             ;K6 BUFFER
K7BF    EQU     #20             ;K7 BUFFER
K8BF    EQU     #21             ;K8 BUFFER
K9BF    EQU     #22             ;K9 BUFFER
K10BF   EQU     #23             ;K10 BUFFER

;========================================================
;|         FRACTIONAL BUFFER VALUE RAM EQUATES           |
;========================================================

FEBF    EQU     #24             ;FRACTIONAL ENERGY BUFFER
FPBF    EQU     #25             ;FRACTIONAL PITCH BUFFER
FK1BF   EQU     #26             ;FRACTIONAL K1 BUFFER
FK2BF   EQU     #27             ;FRACTIONAL K2 BUFFER
FK3BF   EQU     #28             ;FRACTIONAL K3 BUFFER
FK4BF   EQU     #29             ;FRACTIONAL K4 BUFFER
FK5BF   EQU     #2A             ;FRACTIONAL K5 BUFFER
FK6BF   EQU     #2B             ;FRACTIONAL K6 BUFFER

;========================================================
;|             GENERAL STORAGE RAM EQUATES               |
;========================================================

TEMP    EQU     #2C             ;TEMPORARY STORAGE
FLAGS   EQU     #2D             ;FLAGS FOR SPEECH
PORTB   EQU     #2E             ;PORT B RAM IMAGE
CMD     EQU     #2F             ;LAST COMMAND RECEIVED
PHRASE  EQU     #30             ;INTERNAL PHRASE # TO BE SPOKEN
STATUS  EQU     #31             ;STATUS TO BE RETURNED IN AN ACK
FLAGP   EQU     #32             ;FLAGS FOR SPEECH

;========================================================
;|     BIT DEFINTION EQUATES FOR THE 'STATUS' RAM BYTE   |
;|                                                       |
;| NOTE: FOR SOME REASON, UNKOWN TO EDUCATED MAN, THE 50C4X LABELS
;|       BITS FROM 1 TO 8 INSTEAD OF FROM 0 TO 7         |
;========================================================

SPEAKING        EQU     1       ;CURRENTLY SPEAKING
OVERRUN         EQU     2       ;INTERRUPT OVERRUN

;========================================================
;|     BIT DEFINTION EQUATES FOR THE 'FLAGP' RAM BYTE    |
;|                                                       |
;| NOTE: FOR SOME REASON, UNKOWN TO EDUCATED MAN, THE 50C4X LABELS
;|       BITS FROM 1 TO 8 INSTEAD OF FROM 0 TO 7         |
;========================================================
```

```
EXTERNAL     EQU    1        ;SPEAKING EXTERNAL SPEECH DATA
VOICED       EQU    2        ;VOICED FRAME COMMAND
NOWAIT       EQU    3        ;NO WAIT FOR INTERRUPT FLAG
```

```
;===========================================================
;              BIT DEFINTION EQUATES FOR THE 'FLAGS' RAM BYTE
;===========================================================
;    NOTE: FOR SOME REASON, UNKOWN TO EDUCATED MAN, THE 50C4X LABELS
;          BITS FROM 1 TO 8 INSTEAD OF FROM 0 TO 7
;===========================================================
```

```
STP      EQU    1        ;STOP DETECTED
INT      EQU    2        ;INTERUPT FLAG
NINTP    EQU    3        ;SET FOR NO INTERPOLATION
UNVS     EQU    4        ;SET FOR TARGET FRAME UNVOICED
STRT     EQU    5        ;SET FOR FIRST TWO FRAMES
STRT1    EQU    6        ;SET WHILE SECOND FRAME IS COMING IN
RPT      EQU    7        ;SET IF REPEAT DETECTED
STP1     EQU    8        ;SECOND STOP FRAME
```

```
;===========================================================
;                   PROGRAM CONSTANT EQUATES
;===========================================================
```

```
ESTOP    EQU    #0F      ;ENERGY STOP CODE
ESILE    EQU    #00      ;SILENT CODE
REPT     EQU    #01      ;REPEAT CODE
PUNVO    EQU    #00      ;PITCH UNVOICED CODE
TMVAL    EQU    #1F      ;VALUE FOR TIMER REGISTER
```

```
;===========================================================
;                 BITS PER 5220 CODING TABLE EQUATES
;===========================================================
```

```
NRGNB    EQU    4        ;ENERGY
PITNB    EQU    6        ;PITCH
RPTNB    EQU    1        ;REPEAT
K1NB     EQU    5        ;K1
K2NB     EQU    5        ;K2
K3NB     EQU    4        ;K3
K4NB     EQU    4        ;K4
K5NB     EQU    4        ;K5
K6NB     EQU    4        ;K6
K7NB     EQU    4        ;K7
K8NB     EQU    3        ;K8
K9NB     EQU    3        ;K9
K10NB    EQU    3        ;K10
```

```
;===========================================================
;                      START OF THE PROGRAM
;===========================================================
;    1. UPON POWER UP THE 50C4X JUMPS TO LOCATION 0000H AND BEGINS
;       EXECUTING.
;    2. WHEN AN INTERRUPT OCCURS THE 50C4X JUMPS TO LOCATION 0002H
;       AND BEGINS EXECUTING.
;    3. SHORT BRANCHES ARE USED AND DUPLICATED ONCE SINCE THE STATE
;       OF THE STATUS FLAG IS NOT GUARANTEED AT POWER UP OR INTERRUPT
;       TIME.
;===========================================================
```

```
        AORG    #0000

SBR     INIT            ;POWER UP VECTOR
        SBR     INIT
        SBR     INTERRUPT       ;INTERRUPT VECTOR
        SBR     INTERRUPT

AORG    #0004
INIT
        BR      INIT0           ;GO TO INITIALIZATION ROUTINE

AORG    #0006
INTERRUPT
        BR      INTERRUPT_0     ;GO TO INTERRUPT ROUTINE
```

```
;================================================
;                SINE WAVE TABLE DATA
;================================================
```

```
STBL

BYTE    #27,#4B,#67,#7A
        BYTE    #7F,#7A,#67,#4B
        BYTE    #27,#00,#D9,#B5
        BYTE    #99,#86,#81,#86
        BYTE    #99,#B5,#D9
STBLE
```

```
;================================================
;              5220 SPEECH DECODING TABLE
;================================================
```

```
TABEN   BYTE    #00,#00,#01,#01
        BYTE    #02,#03,#05,#07
        BYTE    #0A,#0E,#14,#1C
        BYTE    #28,#3B,#58,#71

TABPI   BYTE    #0C,#10,#11,#12
        BYTE    #13,#14,#15,#16
        BYTE    #17,#18,#19,#1A
        BYTE    #1B,#1C,#1D,#1E
        BYTE    #1F,#20,#21,#22
        BYTE    #23,#24,#25,#26
        BYTE    #27,#28,#29,#2A
        BYTE    #2B,#2D,#2F,#31
        BYTE    #33,#35,#36,#39
        BYTE    #3B,#3D,#3F,#42
        BYTE    #45,#47,#49,#4D
        BYTE    #4F,#51,#55,#57
        BYTE    #5C,#5F,#63,#66
        BYTE    #6A,#6E,#73,#77
        BYTE    #7B,#80,#85,#8A
        BYTE    #8F,#95,#9A,#A0

TABK1   BYTE    #82,#83,#83,#84
        BYTE    #84,#85,#86,#87
        BYTE    #88,#89,#8A,#8C
        BYTE    #8D,#8F,#90,#92
```

```
        BYTE    #99,#A1,#AB,#B8
        BYTE    #C7,#D8,#EB,#00
        BYTE    #14,#27,#38,#47
        BYTE    #54,#5E,#67,#6D

TASK2   BYTE    #AE,#B4,#BB,#C3
        BYTE    #CB,#D4,#DD,#E7
        BYTE    #F1,#FB,#06,#10
        BYTE    #1A,#24,#2D,#36
        BYTE    #3E,#45,#4C,#53
        BYTE    #58,#5D,#62,#66
        BYTE    #69,#6C,#6F,#71
        BYTE    #73,#75,#77,#7E

TASK3   BYTE    #92,#9F,#AD,#BA
        BYTE    #C8,#D5,#E3,#F0
        BYTE    #FE,#0B,#19,#26
        BYTE    #34,#41,#4F,#5C

TASK4   BYTE    #AE,#BC,#CA,#D8
        BYTE    #E6,#F4,#01,#0F
        BYTE    #1D,#2B,#39,#47
        BYTE    #55,#63,#71,#7E

TASK5   BYTE    #AE,#BA,#C5,#D1
        BYTE    #DD,#E8,#F4,#FF
        BYTE    #0B,#17,#22,#2E
        BYTE    #39,#45,#51,#5C
TASK6   BYTE    #C0,#CB,#D6,#E1
        BYTE    #EC,#F7,#03,#0E
        BYTE    #19,#24,#2F,#3A
        BYTE    #45,#50,#5B,#65

TASK7   BYTE    #B3,#BF,#CB,#D7
        BYTE    #E3,#EF,#FB,#07
        BYTE    #13,#1F,#2B,#37
        BYTE    #43,#4F,#5A,#66

TASK8   BYTE    #C0,#D8,#F0,#07
        BYTE    #1F,#37,#4F,#66

TASK9   BYTE    #C0,#D4,#E8,#FC
        BYTE    #10,#25,#39,#4D

TAK10   BYTE    #CD,#DF,#F1,#04
        BYTE    #16,#28,#3B,#4D

TABEF   BYTE    #00,#0C,#04,#0C
        BYTE    #08,#08,#00,#04
        BYTE    #00,#04,#04,#08
        BYTE    #04,#0C,#04,#04

TAK1F   BYTE    #0C,#08,#0C,#04
        BYTE    #0C,#04,#08,#08
        BYTE    #08,#08,#0C,#08
        BYTE    #08,#00,#0C,#0C
        BYTE    #04,#04,#08,#04
        BYTE    #04,#0C,#0C,#08
        BYTE    #04,#04,#0C,#0C
```

```
        BYTE    #08,#0C,#08,#04

TAK2F   BYTE    #00,#08,#08,#04
        BYTE    #08,#04,#0C,#08
        BYTE    #08,#0C,#08,#04
        BYTE    #04,#00,#04,#00
        BYTE    #04,#0C,#0C,#00
        BYTE    #08,#0C,#04,#04
        BYTE    #0C,#0C,#08,#0C
        BYTE    #0C,#08,#08,#08
```

```
;========================================
;           PHRASE ADDRESS TABLE
;========================================

FTBL
        DW      #246E           ;A0
        DW      #0920           ;A1
        DW      #09A6           ;A2
        DW      #0A06           ;A3
        DW      #0A7E           ;A4
        DW      #0B4C           ;A5
        DW      #0BEA           ;A6
        DW      #0C24           ;A7
        DW      #0C6E           ;A8
        DW      #0C9E           ;A9
        DW      #0CE2           ;A10
        DW      #0D12           ;A11
        DW      #0D44           ;A12
        DW      #0D76           ;A13
        DW      #0DB0           ;A14
        DW      #0DE4           ;A15
        DW      #0E2A           ;A16
        DW      #0E60           ;A17
        DW      #0E90           ;A18
        DW      #0ECC           ;A19
        DW      #0EF6           ;A20
        DW      #0F40           ;A21
        DW      #0F92           ;A22
        DW      #0FC0           ;A23
        DW      #0FF6           ;A24
        DW      #1030           ;A25
        DW      #1070           ;A26
        DW      #10A0           ;A27
        DW      #10E6           ;A28
        DW      #1122           ;A29
        DW      #116E           ;A30
        DW      #11D8           ;A31
        DW      #1208           ;A32
        DW      #124A           ;A33
        DW      #1294           ;A34
        DW      #12E2           ;A35
        DW      #1336           ;A36
        DW      #137A           ;A37
        DW      #13D8           ;A38
        DW      #141A           ;A39
        DW      #1482           ;A40
        DW      #14C8           ;A41
        DW      #1536           ;A42
```

```
DW    #157A      ;A43
DW    #15E8      ;A44
DW    #1632      ;A45
DW    #1688      ;A46
DW    #16E2      ;A47
DW    #1732      ;A48
DW    #179A      ;A49
DW    #17FE      ;A50
DW    #1854      ;A51
DW    #18BE      ;A52
DW    #192A      ;A53
DW    #198E      ;A54
DW    #1A20      ;A55
DW    #1AA6      ;A56
DW    #1B4A      ;A57
DW    #1BDC      ;A58
DW    #1C56      ;A59
DW    #1CF6      ;A60
DW    #1D80      ;A61
DW    #1E52      ;A62
DW    #1F10      ;A63
DW    #1F7E      ;A64
DW    #1FE4      ;A65
DW    #2056      ;A66
DW    #20D6      ;A67
DW    #2162      ;A68
DW    #21D6      ;A69
DW    #2292      ;A70
DW    #231A      ;A71
DW    #23D8      ;A72
                 ;please insert que card
                 ;battery low
                 ;hello
                 ;correct
                 ;well done
                 ;try again
                 ;yes
                 ;no
                 ;A
                 ;B
                 ;C
                 ;D
                 ;E
                 ;F
                 ;G
                 ;H
                 ;I
                 ;J
                 ;K
                 ;L
                 ;M
                 ;N
                 ;O
                 ;P
                 ;Q
                 ;R
                 ;S
                 ;T
                 ;U
```

```
                    ;V
                    ;W
                    ;X
                    ;Y
                    ;Z
                    ;zero
                    ;one
                    ;two
                    ;three
                    ;four
                    ;five
                    ;six
                    ;seven
                    ;eight
                    ;nine
                    ;ten
                    ;red
                    ;blue
                    ;yellow
                    ;orange
                    ;green
                    ;purple
                    ;brown
                    ;black
                    ;white
                    ;monday
                    ;tuesday
                    ;wednesday
                    ;thursday
                    ;friday
                    ;saturday
                    ;sunday
                    ;january
                    ;february
                    ;march
                    ;april
                    ;may
                    ;june
                    ;july
                    ;august
                    ;september
                    ;october
                    ;november
                    ;december

FTZLE
```

| INTIALIZE SPEAK HARDWARE & RAM |
|---|

```
        AORG    #400
INITO
        INTD                    ;DISABLE INTERRUPTS
        STOP                    ;STOP SYNTHESIZER
        INTR
        INTER
        CLA
        TAPF
        TAPD
```

```
        ADAA    49              ;200 SAMPLES/FRAME
        TAPEC                   ;INTO PRESCALE REGISTER
        RSCTI                   ;MAKE TIMER SOURCE INTERNAL
        CLA                     ;CLEAR INTERNAL RAM
        CLX                     ;POINT TO FIRST RAM LOCATION
INIT1
        TAM                     ;CLEAR RAM LOCATION
        IXC                     ;POINT TO NEXT RAM LOCATION
        XBEC    #90             ;AT END OF RAM?
        SBR     LOOP            ;BRANCH IF SO
        SBR     INIT1
LOOP
        CALL    GBYTE           ;GET A COMMAND BYTE FROM THE MASTER
        TCX     CMD
        TAM
        DECMC                   ;DUMMY, TO ADJUST FOR 0 COMMAND
        DECMC
        BR      SLEEP           ;CMD=1, GO TO SLEEP COMMAND
        DECMC
        BR      SPEAK_VOICED    ;CMD=2, VOICED SPEECH DATA FRAME COMMAND
        DECMC
        BR      SPEAK_UNVOICED  ;CMD=3, UNVOICED SPEECH DATA FRAME COMMAND
        DECMC
        BR      SPEAK_PHRASE    ;CMD=4, SPEAK INTERNAL SPEECH DATA
        DECMC
        BR      SBPORT          ;CMD=5, WRITE DATA TO PORT B COMMAND
        DECMC
        BR      SPEAK_STOP      ;CMD=6, STOP SPEAKING COMMAND
        DECMC
        BR      ACK             ;CMD=7, REQUEST FOR STATUS COMMAND
        DECMC
        BR      SINE_WAVE       ;CMD=8, GENERATE SINE WAVE COMMAND
        DECMC
        BR      SQUARE_WAVE     ;CMD=9, GENERATE SQUARE WAVE COMMAND

NAK                             ;UNKNOWN COMMAND, GENERATE AN NAK
        BR      LOOP
ACK
        TCX     STATUS
        TMA
        TAPA
ACK1
        TPCA
        TBITA   2
        BR      LOOP
        BR      ACK1

GBYTE
        RSRDY
GBYTE1
        TPCA
        TBITA   1
        BR      GBYTE2
        BR      GBYTE1
GBYTE2
        TPAA
        RETN
```

```
┌─────────────────────────────────────────────────┐
│              STOP SPEAKING COMMAND              │
└─────────────────────────────────────────────────┘

SPEAK_STOP
        INTD                    ;TURN OFF INTERRUPTS
        STOP                    ;TURN OFF THE SYNTHESIZER
        CLA                     ;CLEAR INTERNAL RAM
        CLX                     ;POINT TO FIRST RAM LOCATION
SPEAK_STOP1
        TAM                     ;CLEAR RAM LOCATION
        IXC                     ;POINT TO NEXT RAM LOCATION
        XGEC    #9B             ;AT END OF RAM?
        BR      ACK             ;YES, GENERATE AN ACK
        SBR     SPEAK_STOP1     ;NO, CONTINUE

┌─────────────────────────────────────────────────┐
│               SET B PORT COMMAND                │
└─────────────────────────────────────────────────┘

SBPORT
        CALL    GBYTE           ;GET THE DATA TO BE WRITTEN TO PORT B
        TCX     PORTB           ;SAVE DATA IN RAM IMAGE
        TAM
        TAPB                    ;WRITE DATA TO PORT B
        BR      ACK             ;GENERATE AN ACK

┌─────────────────────────────────────────────────┐
│               GO TO SLEEP COMMAND               │
└─────────────────────────────────────────────────┘

SLEEP
        STOP                    ;STOP THE SYNTHESIZER
        INTE                    ;DON'T ALLOW OR USE INTERRUPTS
SLEEP1
        SETOFF                  ;GO TO SLEEP
        BR      SLEEP1

┌─────────────────────────────────────────────────┐
│            GENERATE SQUARE WAVE COMMAND         │
└─────────────────────────────────────────────────┘

SQUARE_WAVE
        STOP                    ;STOP THE SYNTHESIZER
        INTE                    ;DON'T ALLOW OR USE INTERRUPTS
        INTRM                   ;INSURE WE ARE IN INTERNAL ROM MODE
        TCX     PORTB           ;POINT TO RAM IMAGE OF PORT B
SQUARE_WAVE1                    ;GENERATE LOW PORTION OF SQUARE WAVE
        RBITM   1               ;RESET MSB
        TMA
        TAPB                    ;REFRESH PORT B
        BR      SQUARE_WAVE2
SQUARE_WAVE2                    ;GENERATE HIGH PORTION OF SQUARE WAVE
        SBITM   1               ;SET MSB
        TMA
        TAPB                    ;REFRESH PORT B
        BR      SQUARE_WAVE1
```

```
====================================================
                GENERATE SINE WAVE COMMAND
====================================================

SINE_WAVE
        STOP                    ;STOP THE SYNTHESIZER
        INTE                    ;DON'T ALLOW OR USE INTERRUPTS
        TMEDA                   ;START DAC MODE
        START
        BR      SINE_WAVE2
SINE_WAVE1
        TBA                     ;GET CURRENT DATA POINTER
        ANEC    STBLE           ;AT END OF TABLE?
        BR      SINE_WAVE3      ;NO, BRANCH
SINE_WAVE2
        TCX     STBL            ;POINT TO START OF SINE TABLE DATA
        XBX                     ;SAVE POINTER
        CLX                     ;POINT TO DAC ADDRESS (RAM 0)
        CLA                     ;SET 1ST DAC VALUE = 0
        TAM
        CLA                     ;DELAY (I.E. NOP)
        BR      SINE_WAVE1
SINE_WAVE3
        LUAA                    ;GET THE NEXT DAC DATA VALUE
        TAM                     ;PUT IT OUT TO THE DAC (RAM 0)
        TAM                     ;DELAY (I.E. NOP)
        IBC                     ;ADJUST DATA POINTER
        LUAA                    ;DELAY (I.E. NOP)
        BR      SINE_WAVE1

====================================================
             SPEAK A VOICED EXTERNAL FRAME COMMAND
====================================================

SPEAK_VOICED
        TCX     FLAGP
        SBITM   VOICED          ;SET VOICED FRAME FLAG
        BR      SPEAK_EXTERNAL

====================================================
           SPEAK AN UNVOICED EXTERNAL FRAME COMMAND
====================================================

SPEAK_UNVOICED
        TCX     FLAGP
        RBITM   VOICED          ;RESET VOICED FRAME FLAG

SPEAK_EXTERNAL
        SBITM   NOWAIT          ;DON'T WAIT FOR INTERRUPTS
        SBITM   EXTERNAL        ;INDICATE SPEAKING EXTERNAL SPEECH
        TCX     STATUS
        RBITM   OVERRUN
        TCX     FLAGS           ;CLEAR ALL SPEECH FLAGS
        CLA
        TAM
        SBITM   STRT            ;NOW SET 'START OF SPEECH' FLAG
        TCX     PEF             ;ASSUME A DEFAULT PITCH FOR STARTERS
        ACAA    #2C
        TAM
```

```
        BR      EXTERNAL_DECODE ;GO FILL BUFFERS
```

```
;==============================================================
;              SPEAK AN INTERNAL 50C4X PHRASE COMMAND
;==============================================================
```

```
SPEAK_PHRASE
        CALL    GBYTE           ;GET THE # OF THE PHRASE
        TCX     PHRASE
        TAM
        SALA
        ACAA    PTBL
        LUAA
        TASH                    ;INTO HIGH BITS OF SAR
        TCX     PHRASE
        TMA
        SALA
        ACAA    PTBL+1
        LUAA
        TASL                    ;INTO LOW BYTE OF SAR
        LUSPS                   ;INITIALIZE PARALLEL TO SERIAL REG
        INTRM                   ;USE INTERNAL ROM
        BR      SPEAK_INTERNAL  ;SPEAK
```

```
;==============================================================
;                 SPEAK INTERNAL ROM SPEECH DATA
;==============================================================
; 1. THIS SUBROUTINE SPEAKS SPEECH DATA FROM THE INTERNAL
;    50C4X ROM.
; 2. PRIOR TO CALLING THE SAR MUST BE LOADED WITH THE STARTING
;    ADDRESS OF THE SPEECH DATA TO BE SPOKEN. THE PARALLEL TO
;    SERIAL REGISTER MUST BE INITIALIZED VIA THE LUSPS
;    INSTRUCTION AND INTERNAL ROM MUST BE SELECTED VIA THE INTRM
;    INSTRUCTION.
; 3. THIS ROUTINE WILL CONTINUE TO SPEAK UNTIL A STOP FRAME IS
;    DECODED, THE ROUTINE WILL THEN RETURN CONTROL TO THE CALLER
;    AFTER TURNING OFF THE SYNTHESIZER AND INTERRUPTS.
; 4. REGISTERS A, B, X, AND THE STATUS FLAG ARE CHANGED BY THIS
;    ROUTINE AND THEIR CONTENTS UPON EXITING ARE INDETERMINATE.
;==============================================================
```

```
SPEAK_INTERNAL
        TCX     FLAGP           ;RESET EXTERNAL SPEECH FLAG
        RBITN   EXTERNAL
        TCX     FLAGS           ;CLEAR ALL SPEECH FLAGS
        CLA
        TAM
        SBITN   STRT            ;NOW SET 'START OF SPEECH' FLAG
        TCX     PBF             ;ASSUME A DEFAULT PITCH FOR STARTERS
        ACAA    #0C
        TAM
        BR      DECODE_ENERGY   ;GO FILL BUFFERS
```

```
;========================================================
;          SPEECH BACKGROUND DECODING ROUTINE
;========================================================
; 1. WAIT TIL A SPEECH INTERRUPT HAS OCCURRED
; 2. THE DECODE ROUTINE TAKES THE ENCODED SPEECH DATA FROM ROM
;    DECODES IT A PLACES THE DECODED VALUE IN THE RAM BUFFERS.
; 3. BEFORE SPEECH IS ACTUALLY STARTED (I.E. THE SYNTHESIZER
;    AND INTERRUPTS ARE TURNED ON), THE PUMP MUST BE PRIMED.
;    THE FIRST FRAME DATA IS MOVED INTO THE PRESENT VALUE RAM
;    AND THE SECOND FRAME DATA IS MOVED INTO THE NEW VALUE RAM,
;    THEN THE SYNTHESIZER AND INTERRUPTS ARE TURNED ON.
; 4. WHEN A STOP FRAME IS DETECTED, TWO MORE INTERRUPTS MUST BE
;    PROCESSED IN ORDER TO INSURE THAT ALL THE SPEECH DATA IS
;    SPOKEN.
;========================================================

INT_WAIT                        ;WAIT FOR SPEECH INTERRUPT TO OCCUR
        TCX     FLAGS
        TBITH   INT
        SBR     DECODE          ;BR IF INTERRUPT HAS OCCURRED
        BP      INT_WAIT        ;OTHERWISE, WAIT

DECODE                          ;NEED TO DECODE NEXT FRAME DATA
        RBITH   INT             ;1ST INIT FLAGS, RESET INTERRUPT FLAG
        RBITH   NINTP           ;ASSUME INTERPOLATION REQUIRED
        TBITH   STP             ;ARE WE IN OUR 2ND INTERRUPT OF STOPPING?
        BR      DECODE_STOPPED  ;YES, THEN WE BE DONE SPEAKING!

TBITH   STP1            ;WAS LAST FRAME A STOP?
        BR      DECODE_STOPPING ;YES, CONTINUE STOPPING

DECODE_ENERGY                   ;COME HERE TO DECODE THE ENERGY DATA FIELD
        TCX     FLAGP
        SBITH   NOWAIT          ;SET NO WAIT FOR INTERRUPT FLAG
        TBITH   EXTERNAL        ;SPEAKING EXTERNAL DATA?
        BR      EINT_WAIT       ;YES, GO GET EXTERNAL DATA
        CLA                     ;NO, GET THE ENCODED ENERGY DATA
        GET     NRGNB

ANEC    ESTOP           ;STOP CODE?
        BR      DECODE_ENERGY1  ;NO, BRANCH

DECODE_STOP
        TCX     FLAGP           ;WHEN STOPPING TREAT EXTERNAL AS INTERNAL
        RBITH   EXTERNAL
        TCX     FLAGS           ;YES, START THE STOP PROCESS
        SBITH   STP1            ;SET THE 'STARTING-TO-STOP' FLAG
        BR      DECODE_CLEAR    ;FILL THE BUFFERS WITH 0'S

DECODE_STOPPING                 ;COME HERE 1 INTERRUPT AFTER STOP CODE
        SBITH   STP             ;SET THE 'FINISHED STOPPING' FLAG
        BR      INT_WAIT        ;GO WAIT FOR THE NEXT INTERRUPT

DECODE_STOPPED                  ;COME HERE 2 INTERRUPTS AFTER STOP CODE
        INTD                    ;TURN OFF INTERRUPTS
        STOP                    ;TURN OFF THE SYNTHESIZER
        TCX     STATUS          ;RESET SPEAKING FLAG
        RBITH   SPEAKING
        BR      ACK             ;WE ARE DONE SPEAKING, GO SEND AN ACK
```

```
DECODE_ENERGY1
        ANEC    ESILE           ;SILENT FRAME?
        BR      DECODE_ENERGY2  ;NO, BRANCH
        BR      DECODE_CLEAR    ;YES, FILL THE BUFFERS WITH 0'S

DECODE_ENERGY2                  ;COME HERE IF NOT STOP OR SILENT FRAME
        ACAA    TABEN           ;LOOK UP DECODED ENERGY IN TABLE
        LUAA
        TCX     EBF             ;PUT DECODED ENERGY IN BUFFER
        TAM

DECODE_REPEAT                   ;COME HERE TO DECODE THE REPEAT DATA FIELD
        CLA                     ;GET THE REPEAT DATA
        GET     RPTNB
        TCX     FLAGS           ;DECODE THE REPEAT DATA
        RBITM   RPT             ;ASSUME THIS IS NOT A REPEAT FRAME, CLEAR FLAG
        ANEC    REPT            ;GOOD ASSUMPTION?
        BR      DECODE_PITCH    ;YES, GO DECODE PITCH DATA
        SBITM   RPT             ;NO, IT IS A REPEAT FRAME, SET FLAG

DECODE_PITCH                    ;COME HERE TO DECODE THE PITCH DATA FIELD
        CLA                     ;GET THE ENCODED PITCH DATA
        GET     PITNB

ANEC    PUNVO           ;IS THIS AN UNVOICED SPEECH FRAME?
        BR      DECODE_PITCH2   ;NO, BRANCH
        TCX     FLAGS           ;YES, WAS THE LAST FRAME UNVOICED?
        TBITM   UNVO
        SBR     DECODE_PITCH1   ;YES, BRANCH, NOT A VOICING TRANSITION
        SBITM   NINTP           ;NO, VOICING TRANSITION, DISABLE INTERPOLATION
DECODE_PITCH1                   ;COME HERE WHEN FRAME IS UNVOICED
        SBITM   UNVO            ;SET UNVOICED FLAG FOR NEXT FRAME

TCX     PBF             ;FOR UNVOICED FRAME SET PITCH BUFFER = $2C
        CLA
        ACAA    $2C
        TAM
        TCX     ENV             ;WAS LAST FRAME A SILENT FRAME?
        TMA
        ANEC    ESILE
        BR      DECODE_K        ;NO, BRANCH
        TCX     FLAGS           ;YES, INHIBIT INTERPOLATION
        SBITM   NINTP
        BR      DECODE_K

DECODE_PITCH2                   ;COME HERE WHEN FRAME IS VOICED
        ACAA    TABPI           ;LOOK UP DECODED PITCH IN TABLE
        LUAA
        TCX     PBF             ;PUT DECODED PITCH IN BUFFER
        TAM
        TCX     FPBF            ;CLEAR FRACTIONAL PITCH BUFFER
        CLA
        TAM
        TCX     FLAGS           ;WAS THE LAST FRAME VOICED?
        TBITM   UNVO
        SBR     DECODE_PITCH3   ;NO, VOICING TRANSITION, BRANCH
        SBR     DECODE_PITCH4   ;YES, NO VOICING TRANSITION

DECODE_PITCH3                   ;COME HERE IF LAST FRAME WAS UNVOICED
```

```
        SBITM   NINTP           ;DISABLE INTERPOLATION

DECODE_PITCH4                   ;COME HERE TO FINISH VOICED FRAME DECODE
        RBITM   UNVO            ;RESET UNVOICED FLAG FOR NEXT FRAME

DECODE_K                        ;COME HERE TO DECODE THE K DATA (K1-K10)
        TCX     FLAGS           ;REPEAT FRAME?
        TBITM   RPT
        BR      DECODE_DONE     ;YES, BRANCH, DON'T NEED TO DECODE K'S

DECODE_K1                       ;COME HERE TO DECODE K1 DATA FIELD
        CLA                     ;GET THE ENCODED K1 DATA
        GET     K1NB
        TCX     TEMP            ;SAVE ENCODED K1 FOR LATER
        TAM
        ACAA    TABK1           ;LOOK UP DECODED K1 IN TABLE
        LUAA
        TCX     K1BF            ;PUT DECODED K1 IN BUFFER
        TAM
        TCX     TEMP            ;RETRIEVE ENCODED K1 DATA
        TMA
        ACAA    TAK1F           ;LOOK UP DECODED FRACTIONAL K1 IN TABLE
        LUAA
        TCX     FK1BF           ;PUT DECODED FRACTIONAL K1 IN BUFFER
        TAM

DECODE_K2                       ;COME HERE TO DECODE K2 DATA FIELD
        CLA                     ;GET THE ENCODED K2 DATA
        GET     K2NB
        TCX     TEMP            ;SAVE ENCODED K2 FOR LATER
        TAM
        ACAA    TABK2           ;LOOK UP DECODED K2 IN TABLE
        LUAA
        TCX     K2BF            ;PUT DECODED K2 IN BUFFER
        TAM
        TCX     TEMP            ;RETRIEVE ENCODED K2 DATA
        TMA
        ACAA    TAK2F           ;LOOK UP DECODED FRACTIONAL K2 IN TABLE
        LUAA
        TCX     FK2BF           ;PUT DECODED FRACTIONAL K2 IN BUFFER
        TAM

DECODE_K3                       ;COME HERE TO DECODE K3 DATA FIELD
        CLA                     ;GET THE ENCODED K3 DATA
        GET     K3NB
        ACAA    TABK3           ;LOOK UP DECODED K3 IN TABLE
        LUAA
        TCX     K3BF            ;PUT DECODED K3 IN BUFFER
        TAM

DECODE_K4                       ;COME HERE TO DECODE K4 DATA FIELD
        CLA                     ;GET THE ENCODED K4 DATA
        GET     K4NB
        ACAA    TABK4           ;LOOK UP DECODED K4 IN TABLE
        LUAA
        TCX     K4BF            ;PUT DECODED K4 IN BUFFER
        TAM

TCX     FLAGS           ;IS THIS AN UNVOICED FRAME?
```

```
        TBITH UNVO
        BR      DECODE_CLEAR1   ;YES, THEN CLEAR K5-K10

DECODE_K5                       ;COME HERE TO DECODE K5 DATA FIELD
        CLA                     ;GET THE ENCODED K5 DATA
        GET     K5NB
        ACAA    TABK5           ;LOOK UP DECODED K5 IN TABLE
        LUAA
        TCX     K5BF            ;PUT DECODED K5 IN BUFFER
        TAM

DECODE_K6                       ;COME HERE TO DECODE K6 DATA FIELD
        CLA                     ;GET THE ENCODED K6 DATA
        GET     K6NB
        ACAA    TABK6           ;LOOK UP DECODED K6 IN TABLE
        LUAA
        TCX     K6BF            ;PUT DECODED K6 IN BUFFER
        TAM

DECODE_K7                       ;COME HERE TO DECODE K7 DATA FIELD
        CLA                     ;GET THE ENCODED K7 DATA
        GET     K7NB
        ACAA    TABK7           ;LOOK UP DECODED K7 IN TABLE
        LUAA
        TCX     K7BF            ;PUT DECODED K7 IN BUFFER
        TAM

DECODE_K8                       ;COME HERE TO DECODE K8 DATA FIELD
        CLA                     ;GET THE ENCODED K8 DATA
        GET     K8NB
        ACAA    TABK8           ;LOOK UP DECODED K8 IN TABLE
        LUAA
        TCX     K8BF            ;PUT DECODED K8 IN BUFFER
        TAM

DECODE_K9                       ;COME HERE TO DECODE K9 DATA FIELD
        CLA                     ;GET THE ENCODED K9 DATA
        GET     K9NB
        ACAA    TABK9           ;LOOK UP DECODED K9 IN TABLE
        LUAA
        TCX     K9BF            ;PUT DECODED K9 IN BUFFER
        TAM
DECODE_K10                      ;COME HERE TO DECODE K10 DATA FIELD
        CLA                     ;GET THE ENCODED K10 DATA
        GET     K10NB
        ACAA    TAK10           ;LOOK UP DECODED K10 IN TABLE
        LUAA
        TCX     K10BF           ;PUT DECODED K10 IN BUFFER
        TAM
        BR      DECODE_DONE

DECODE_CLEAR                    ;COME HERE TO CLEAR BUFFER VALUES:
        CLA
        TCX     EBF             ;ENERGY
        TAM
        TCX     FEBF            ;FRACTIONAL ENERGY
        TAM
        TCX     FPBF            ;FRACTIONAL PITCH
        TAM
```

```
        TCX     FK1BF           ;FRACTIONAL K1
        TAM
        TCX     FK2BF           ;FRACTIONAL K2
        TAM
        TCX     FK3BF           ;FRACTIONAL K3
        TAM
        TCX     FK4BF           ;FRACTIONAL K4
        TAM
        TCX     K1BF            ;K1
        TAM
        TCX     K2BF            ;K2
        TAM
        TCX     K3BF            ;K3
        TAM
        TCX     K4BF            ;K4
        TAM
DECODE_CLEAR1                   ;COME HERE TO CLEAR BUFFER VALUES:
        CLA
        TCX     K5BF            ;K5
        TAM
        TCX     K6BF            ;K6
        TAM
        TCX     K7BF            ;K7
        TAM
        TCX     K8BF            ;K8
        TAM
        TCX     K9BF            ;K9
        TAM
        TCX     K10BF           ;K10
        TAM

DECODE_DONE                     ;COME HERE TO FINISH DECODING A FRAME
        TCX     FLAGS           ;JUST STARTING TO SPEAK (1ST 2 FRAMES)?
        TBITM   STRT
        SBR     DECODE_DONE1    ;YES, BRANCH
        TCX     FLAGP           ;NO, GO DO IT ALL OVER AGAIN
        RBITM   NOWAIT          ;FIRST CLEAR 'NO WAIT FOR INTERRUPT' FLAG
        TBITM   EXTERNAL        ;SPEAKING EXTERNAL DATA?
        BR      EINT_WAIT       ;YES, GO TO EXTERNAL DATA WAIT
        BR      INT_WAIT        ;NO, GO TO INTERNAL DATA WAIT

DECODE_DONE1                    ;COME HERE FOR 1ST 2 FRAMES OF SPEECH
        TBITM   STRT1           ;2ND FRAME?
        BR      MOVE_BUF_NV     ;YES, BRANCH. MOVE BUFFERS TO NEW VALUES
        SBITM   STRT1           ;NO, SET 2ND FRAME FLAG

MOVE_BUF_PV                     ;COME HERE FOR 1ST FRAME, PRIME THE PUMP
                                ;I.E. MOVE BUFFERS TO PRESENT VALUES'S (PV)
        TCX     PPV             ;SET INDICES TO START WITH PITCH. PV POINTER
        XBX                     ;USE B TO STORE 1 POINTER
        TCX     PBF             ;BUFFER POINTER

MOVE_BUF_PV1                    ;COME HERE TO LOOP ON BUFFER TO PV TRANSFER
        TMAIX                   ;GET BUFFER VALUE & POINT AT NEXT BUFFER
        XBX                     ;SAVE BUFFER POINTER, GET PV POINTER
        TAM                     ;SET BUFFER AS PV
        IXC                     ;ADJUST PV POINTER
        IXC
```

```
            XBX                         ;SAVE PV POINTER, GET BUFFER POINTER
            XGEC        FEBF            ;DONE? REACHED FRACTIONAL BUFFERS?
            BR          MOVE_BUF_PV2    ;YES, BRANCH
            BR          MOVE_BUF_PV1    ;GO AGAIN

MOVE_BUF_PV2                            ;COME HERE TO COPY TO FINISH PRIMING THE PUMP
                                        ;I.E. MOVE FRACTIONAL BUFFERS TO PV'S
            TCX         FEBF            ;GET FRACTIONAL ENERGY BUFFER VALUE
            THA
            TCX         FEPV            ;PUT INTO FRACTIONAL ENERGY PV
            TAM
            TCX         FPBF            ;GET FRACTIONAL PITCH BUFFER VALUE
            THA
            TCX         FPPV            ;PUT INTO FRACTIONAL PITCH PV
            TAM
            TCX         FK1BF           ;GET FRACTIONAL K1 BUFFER VALUE
            THA
            TCX         FK1PV           ;PUT INTO FRACTIONAL K1 PV
            TAM
            TCX         FK2BF           ;GET FRACTIONAL K2 BUFFER VALUE
            THA
            TCX         FK2PV           ;PUT INTO FRACTIONAL K2 PV
            TAM
            TCX         FK3BF           ;GET FRACTIONAL K3 BUFFER VALUE
            THA
            TCX         FK3PV           ;PUT INTO FRACTIONAL K3 PV
            TAM
            TCX         FK4BF           ;GET FRACTIONAL K4 BUFFER VALUE
            THA
            TCX         FK4PV           ;PUT INTO FRACTIONAL K4 PV
            TAM
            BR          DECODE_ENERGY   ;GO FILL BUFFER AGAIN
```

---

TIMER INTERRUPT SERVICE ROUTINE

1. INTERRUPT OCCURS ONCE EACH FRAME.
2. THIS ROUTINE SETS A FLAG TO INDICATE THAT AN INTERRUPT HAS OCCURRED. THE BACKGROUND DECODE ROUTINE USES THIS FLAG TO DETERMINE WHEN NEW SPEECH DATA SHOULD BE DECODED INTO THE BUFFERS.
3. MAIN TASK IS TO MOVE THE BUFFER VALUES TO THE NEW VALUES (NV). (THIS ROUTINE IS TIME CRITICAL AND SHOULD BE LEFT ALONE, ANY ATTEMPTS TO SAVE ROM BY LOOPING WILL PROBABLY AFFECT THE SPEECH QUALITY.)
4. AS SECONDARY TASKS THE VOICING LATCH IS SET OR CLEARED AND INTERPOLATION IS ENABLED OR DISABLED AS INDICATED THROUGH FLAGS SET BY THE BACKGROUND DECODE ROUTINE.
5. THE DECODE ROUTINE USES A PORTION OF THIS ROUTINE TO MOVE THE BUFFER VALUES INTO THE NV. THIS WAS DONE TO SAVE ROM.
6. THE 50C4X HARDWARE RESTORES THE A, X, AND STATUS FLAG TO THE PRE-INTERRUPT VALUES UPON EXECUTION OF THE RETI INSTRUCTION. THE B REGISTER IS NOT USED SO IT'S CONTENTS ARE ALSO PRESERVED.

```
INTERRUPT_0                    ;COME HERE WHEN AN INTERRUPT OCCURS
        TCX     FLAGS
        SBITM   INT            ;SET 'INTERRUPT OCCURRED' FLAG
        TBITM   STP            ;ARE WE STOPPING? STOP FRAME?
        BR      INTERRUPT_EXIT ;YES, BRANCH, NO PROCESSING IF STOPPING
        TCX     TMVAL          ;RELOAD TIMER FOR NEXT INTERRUPT
        TXTM
        TCX     FLAGS

MOVE_BUF_NV                    ;COME HERE ON 2ND FRAME, USE THIS TO SAVE ROM
INTERRUPT_1                    ;COME HERE TO MOVE BUFFERS TO NEW VALUES (NV)
        CLA                    ;ASSUME THIS FRAME IS UNVOICED
        TBITM   UNVO           ;IS IT REALLY UNVOICED?
        BR      INTERRUPT_2    ;YES, BRANCH
        ACAA    1              ;NO, THIS IS A VOICED FRAME

INTERRUPT_2                    ;COME HERE TO SET THE VOICING LATCH
        TAV                    ;SET AS DETERMINED ABOVE

TCX     PBF            ;PITCH BUFFER -> NV
        TMA
        TCX     PNV
        TAM

TCX     FPBF           ;FRACTIONAL PITCH BUFFER -> NV
        TMA
        TCX     FPNV
        TAM

TCX     EBF            ;ENERGY BUFFER -> NV
        TMA
        TCX     ENV
        TAM

TCX     FEBF           ;FRACTIONAL ENERGY BUFFER -> NV
        TMA
        TCX     FENV
        TAM

TCX     K1BF           ;K1 BUFFER -> NV
        TMA
        TCX     K1NV
        TAM

TCX     FK1BF          ;FRACTIONAL K1 BUFFER -> NV
        TMA
        TCX     FK1NV
        TAM

TCX     K2BF           ;K2 BUFFER -> NV
        TMA
        TCX     K2NV
        TAM

TCX     FK2BF          ;FRACTIONAL K2 BUFFER -> NV
        TMA
        TCX     FK2NV
        TAM

TCX     K3BF           ;K3 BUFFER -> NV
        TMA
        TCX     K3NV
        TAM
```

```
        TCX     FK3BF           ;FRACTIONAL K3 BUFFER -> NV
        TMA
        TCX     FK3NV
        TAM

TCX     K4BF            ;K4 BUFFER -> NV
        TMA
        TCX     K4NV
        TAM

TCX     FK4BF           ;FRACTIONAL K5 BUFFER -> NV
        TMA
        TCX     FK4NV
        TAM

TCX     K5BF            ;K5 BUFFER -> NV
        TMA
        TCX     K5NV
        TAM

TCX     K6BF            ;K6 BUFFER -> NV
        TMA
        TCX     K6NV
        TAM

TCX     K7BF            ;K7 BUFFER -> NV
        TMA
        TCX     K7NV
        TAM

TCX     K8BF            ;K8 BUFFER -> NV
        TMA
        TCX     K8NV
        TAM

TCX     K9BF            ;K9 BUFFER -> NV
        TMA
        TCX     K9NV
        TAM

TCX     K10BF           ;K10 BUFFER -> NV
        TMA
        TCX     K10NV
        TAM

TCX     FLAGS           ;JUST STARTING?
        TBITN   STRT
        BR      DECODE_DONE2    ;YES, BRANCH
        TBITN   NINTP           ;NO, INTERPOLATION ENABLED FOR THIS FRAME?
        SBR     INTERRUPT_EXIT  ;NO, BRANCH
        INTE                    ;YES, TURN ON INTERPOLATION

INTERRUPT_EXIT                  ;COME HERE TO EXIT INTERRUPT ROUTINE
        RETI

DECODE_DONE2                    ;COME HERE TO START AFTER PV & NV LOADED
        TCX     STATUS          ;SET SPEAKING FLAG
        SBITN   SPEAKING
        TCX     FLAGS           ;CLEAR START FLAGS
        RBITN   STRT
```

```
        RBITM   STRT1
        TCX     PBF             ;GET PITCH INTO A
        TMA
        TCX     TMVAL           ;TIME INTO X
        START                   ;GENTLEMEN, START YOUR SYNTHESIZER ENGINE!
        TXTM                    ;INITIALIZE THE TIMER
        INTE                    ;NOW, LET THE INTERRUPTS BEGIN
        BR      DECODE_ENERGY   ;AND GO FILL BUFFER AGAIN

EINT_WAIT                       ;WAIT FOR SPEECH INTERRUPT TO OCCUR
        CALL    GBYTE           ;GET A COMMAND BYTE FROM THE MASTER
        TCX     CMD
        TAM
        ANEC    5
        BR      EINT_WAIT1
        CALL    GBYTE           ;GET THE DATA TO BE WRITTEN TO PORT B
        TCX     PORTB           ;SAVE DATA IN RAM IMAGE
        TAM
        TAPB                    ;WRITE DATA TO PORT B
        BR      EACK            ;GENERATE AN ACK

EINT_WAIT1
        ANEC    6
        BR      EINT_WAIT2
        TCX     FLAGP
        RBITM   EXTERNAL
        BR      DECODE_STOP

EINT_WAIT2
        ANEC    2
        BR      EINT_WAIT3
        TCX     FLAGP
        SBITM   VOICED
        BR      EINT_WAIT4

EINT_WAIT3
        ANEC    3
        BR      EINT_WAIT
        TCX     FLAGP
        RBITM   VOICED

EINT_WAIT4
        TBITM   NOWAIT          ;SHOULD WE WAIT FOR AN INTERRUPT?
        BR      EXTERNAL_DECODE ;NO, BRANCH AROUND INTERRUPT WAIT

EINT_WAIT5
        TCX     FLAGS
        TBITM   INT
        BR      EINT_WAIT6      ;BR IF INTERRUPT HAS OCCURRED
        BR      EINT_WAIT5      ;OTHERWISE, WAIT

EINT_WAIT6
        RBITM   INT             ;RESET INTERRUPT FLAG

EXTERNAL_DECODE                 ;COME HERE TO GET EXTERNAL FRAME DATA
        TCX     FLAGS           ;ASSUME NO INTERPOLATION
        RBITM   NINTP

CALL    GBYTE
        TCX     PBF
        TAM
```

```
CALL    GBYTE
TCX     EBF
TAM
CALL    GBYTE
TCX     K1BF
TAM
CALL    GBYTE
TCX     K2BF
TAM
CALL    GBYTE
TCX     K3BF
TAM
CALL    GBYTE
TCX     K4BF
TAM
CALL    GBYTE
TCX     K4BF
TAM
CALL    GBYTE
TCX     K5BF
TAM
CALL    GBYTE
TCX     K6BF
TAM
CALL    GBYTE
TCX     K7BF
TAM
CALL    GBYTE
TCX     K8BF
TAM
CALL    GBYTE
TCX     K9BF
TAM
CALL    GBYTE
TCX     K10BF
TAM
CALL    GBYTE
TCX     FEBF
TAM
SARA
SARA
SARA
SARA
TCX     FBBF
TAM
CALL    GBYTE
TCX     FK2BF
TAM
SARA
SARA
SARA
SARA
TCX     FK1BF
TAM
CALL    GBYTE
TCX     FK4BF
TAM
SARA
SARA
SARA
SARA
```

```
            TCX     FK3BF
            TAM
            CALL    GBYTE
            TCX     FK4BF
            TAM
            SARA
            SARA
            SARA
            SARA
            TCX     FK5BF
            TAM

TCX     FLAGP       ;CHECK VOICING
            TBITM   VOICED      ;IS THIS FRAME VOICED?
            BR      EDECODE_PITCH2 ;NO, BRANCH
            TCX     FLAGS       ;YES. WAS THE LAST FRAME UNVOICED?
            TBITM   UNVO
            SBR     EDECODE_PITCH1 ;YES, BRANCH, NOT A VOICING TRANSITION
            SBITM   NINTP       ;NO, VOICING TRANSITION, DISABLE INTERPOLATION
EDECODE_PITCH1                  ;COME HERE WHEN FRAME IS UNVOICED
            SBITM   UNVO        ;SET UNVOICED FLAG FOR NEXT FRAME

TCX     ENV         ;WAS LAST FRAME A SILENT FRAME?
            TMA
            ANEC    ESILE
            BR      EDECODE_PITCH5 ;NO, BRANCH
            TCX     FLAGS       ;YES, INHIBIT INTERPOLATION.
            SBITM   NINTP
            BR      EDECODE_PITCH5

EDECODE_PITCH2                  ;COME HERE WHEN FRAME IS VOICED
            TCX     FLAGS       ;WAS THE LAST FRAME VOICED?
            TBITM   UNVO
            BR      EDECODE_PITCH3 ;NO, VOICING TRANSITION, BRANCH
            BR      EDECODE_PITCH4 ;YES, NO VOICING TRANSITION

EDECODE_PITCH3                  ;COME HERE IF LAST FRAME WAS UNVOICED
            SBITM   NINTP       ;DISABLE INTERPOLATION

EDECODE_PITCH4                  ;COME HERE TO FINISH VOICED FRAME DECODE
            RBITM   UNVO        ;RESET UNVOICED FLAG FOR NEXT FRAME

EDECODE_PITCH5                  ;
            TCX     STATUS
            TMA
            TAPA

EDECODE_PITCH6                  ;
            TPCA
            TBITA   2
            BR      EDECODE_PITCH7
            BR      EDECODE_PITCH6

EDECODE_PITCH7
            TCX     FLAGS
            TBITM   INT
            BR      EDECODE_PITCH8
            BR      DECODE_DONE ;COME HERE TO FINISH DECODING A FRAME
```

```
EDECODE_PITCH8
        TCX     STATUS
        SBITH   OVERRUN
        BR      DECODE_DONE    ;COME HERE TO FINISH DECODING A FRAME

EACK
        TCX     STATUS
        THA
        TAPA
EACK1
        TPCA
        TBITA   2
        BR      EINT_WAIT
        BR      EACK1

END
``` tv,15/999

What is claimed is:

1. A speech synthesizer device comprising:
   speech synthesis means having a data input, said speech synthesis means producing a synthesized speech in response to data supplied to said data input;
   code reading means for reading a code and producing a locator code signal;
   computer means connected to said code reading means and said speech synthesis means, said computer means including internal ROM (Read Only Memory), RAM (Random Access Memory) and an external ROM connector including address bus, data bus, and control lines signal connections;
   an external ROM module removably connected to said external ROM connector and containing a lesson plan identifier code, a plurality of first mode data sets and a plurality of second mode data sets wherein each of said first mode data sets contains a predetermined sequence of data for producing synthesized speech and each of said plurality of second mode data sets containers predetermined alphanumeric speech synthesis data;
   said computer means responding to said locator code signal in a first mode of operation by reading one of said plurality of first mode data sets from said external ROM at a memory location defined by said locator code signal and supplying said data set at said memory location to said speech synthesis means data input so that specific words corresponding with said locator code signal are audibly produced by said speech synthesis means; and
   said computer means responding to said locator code in a second mode of operation by reading one of said plurality of second mode data sets from a memory location in said external ROM module at a memory location defined by said locator code signal, said second mode data set including internal memory locator codes identifying locations in internal ROM wherein predefined speech data is stored, said computer means supplying said predetermined speech data to said speech synthesis means data input for each internal memory locator code of said one of said second mode data sets wherein said speech synthesis means audibly spells the letters of the synthesized words produced by said speech synthesizer device in said first mode of operation in response to said locator code signal.

2. The speech synthesizer device of claim 1 wherein said means for inputting a memory locator code is a bar code wand.

3. The device of claim 2 wherein said speech synthesis means includes an oscillator, a linear predictive coding speech synthesis circuit connected to said oscillator and having a speech output, an audio amplifier connected to said speech output, and an audio speaker connected to an output of said audio amplifier circuit.

4. The device of claim 3 wherein said computer means is a single-chip microprocessor.

5. The device of claim 4 including means for incrementally increasing or decreasing the volume of audio reproduced by said audio speakers in response to the direction of wanding of a predetermined volume-control bar code.

6. The device of claim 5 wherein said computer means responds to wanding of a predetermined diagnostics bar code by entering a diagnostics mode and performing software controlled tests on said speech synthesis means, said computer means, said RAM, said ROM, and said external ROM.

7. The device of claim 6 including automatic power down means for controlling a power supply signal to said computer means and said speech synthesis means and said external ROM means when a predetermined time period elapses before a subsequent locator code signal is received from said bar code wand.

8. The device of claim 7 including rechargeable batteries and recharge circuit means for maintaining the voltage at the output of the batteries at a predetermined voltage thereby supplying recharge power to said batteries and said speech synthesis device as needed.

9. The device of claim 8 wherein said oscillator includes means controlled by said computer means for switching the output frequency of said oscillator between at least two different frequencies.

10. The speech synthesizer device of claim 1 wherein said means for inputting a memory locator code is an optical character reader.

11. A battery powered speech synthesizer device adapted for use with lesson plans including a plurality of visual material segments and a bar code associated with each segment, said device comprising:
    speech synthesis means for synthesizing audible human speech, said speech synthesis means having a data input and producing synthesized speech in response to data supplied to said data input;

bar code reading means for reading a bar code and producing a locator code signal at an output of said code reading means;

computer means for controlling functions of said speech synthesizer device, said computer means having an input connected to said code reading means output, a speech data output connected to said speech synthesis means data input, said computer means also including ROM (Read Only Memory), RAM (Random Access Memory), nonvolatile memory, and an external data interface;

wherein a plurality of speech synthesis data sets are supplied to said external data interface and stored in said nonvolatile memory for subsequent recall by said computer means in response to receiving a locator code signal from said bar code reading means wherein said locator code signal corresponds to one of said plurality of speech synthesis data sets.

12. The device of claim 11 wherein said speech synthesis means includes a linear predictive coding speech synthesis circuit, an oscillator connected to said linear predictive coding speech synthesis circuit, an audio amplifier connected to an output of said speech synthesis circuit, and a speaker connected to an output of said audio amplifier.

13. The device of claim 11 including means for incrementally increasing or decreasing the volume of speech reproduced by said speech synthesis means in response to the direction of wanding of a predetermined volume-control bar mode.

14. The device of claim 11 wherein said nonvolatile memory is NVRAM (Non-Volatile Random Access Memory).

15. The device of claim 11 wherein said nonvolatile memory is EEPROM (Electrically Eraseable Programmable Read Only Memory).

16. A speech synthesizer device adapted for use with a predefined printed lesson plan wherein the lesson plan includes a plurality of bar codes, said speech synthesizer device comprising:

speech synthesis means having a data input, said speech synthesis means producing synthesized speech in response to data supplied to said data input;

code reading means for reading a code from said lesson plan and producing a locator code signal at an output of said code reading means;

computer means connected to said code reading means output and said speech synthesis means data input, said computer means including internal ROM (Read Only Memory), RAM (Random Access Memory) and an external ROM connector including address bus, data bus, and memory control signal connections;

an external ROM module removably connected to said external ROM connector and containing a plurality of word data sets wherein each of said word data sets includes a predetermined sequence of data for producing synthesized speech corresponding to words printed in a lesson plan and associated with said code; and wherein said computer means responds to said locator code signal by reading one of said plurality of word data sets from said external ROM at a memory location defined by said locator code signal and supplies said word data set to said speech synthesis means data input.

17. The device of claim 16 wherein the lesson plan materials include only Braille characters and bar codes.

18. The device of claim 17 wherein said external ROM also includes a plurality of spelling data sets which directly correspond to the alphanumeric characters n Braille of the lesson plan, said computer means operating in a first mode to supply word data sets from said external ROM module corresponding to said locator code signal to said speech synthesis means to audibly synthesize words corresponding to the Braille words of said lesson plan, and in a second mode said computer means supplies character data from said internal ROM to said speech synthesis means, said character data corresponding to each character of said spelling data set recalled from external memory in response to said locator code signal.

19. The device of claim 18 including means for incrementally increasing or decreasing the volume of speech reproduced by said speech synthesis means in response to the direction of wanding of a predetermined volume-controlled bar code.

20. The device of claim 19 wherein said first and second mode of operation are selected from a predetermined mode locator code signal is received from said code reading means by said computer means.

* * * * *